US009799235B2

(12) United States Patent
Carvajal et al.

(10) Patent No.: US 9,799,235 B2
(45) Date of Patent: Oct. 24, 2017

(54) COMBAT MEDICAL SIMULATORS AND ASSOCIATED SYSTEMS AND METHODS

(71) Applicant: Gaumard Scientific Company, Inc., Miami, FL (US)

(72) Inventors: Miguel Carvajal, Miami Springs, FL (US); Alberto Perez, Miami, FL (US); Alberto Rodriguez, Miami, FL (US); Senyon Romero, Miami, FL (US)

(73) Assignee: GAUMARD SCIENTIFIC COMPANY, INC., Miami, FL (US)

( * ) Notice: Subject to any disclaimer, the term of this patent is extended or adjusted under 35 U.S.C. 154(b) by 0 days.

(21) Appl. No.: 14/996,454

(22) Filed: Jan. 15, 2016

(65) Prior Publication Data

US 2016/0133161 A1 May 12, 2016

Related U.S. Application Data

(63) Continuation of application No. 13/752,256, filed on Jan. 28, 2013, now Pat. No. 9,240,130.

(60) Provisional application No. 61/591,851, filed on Jan. 27, 2012.

(51) Int. Cl.
*G09B 23/32* (2006.01)
*G09B 23/30* (2006.01)
*G09B 23/28* (2006.01)

(52) U.S. Cl.
CPC ........... *G09B 23/32* (2013.01); *G09B 23/288* (2013.01); *G09B 23/30* (2013.01); *G09B 23/303* (2013.01)

(58) Field of Classification Search
CPC ........ G09B 23/28; G09B 23/30; G09B 23/32; G09B 23/281; G09B 23/283; G09B 23/286; G09B 23/288; G09B 23/303
See application file for complete search history.

(56) References Cited

U.S. PATENT DOCUMENTS

| | | |
|---|---|---|
| 5,472,345 A | 12/1995 | Eggert et al. |
| 5,721,715 A | 2/1998 | Mitani et al. |
| 5,853,292 A | 12/1998 | Eggert et al. |
| 6,193,519 B1 | 2/2001 | Eggert et al. |
| 6,443,735 B1 | 9/2002 | Eggert et al. |
| 6,503,087 B1 | 1/2003 | Eggert et al. |
| 6,527,558 B1 | 3/2003 | Eggert et al. |
| 6,758,676 B2 | 7/2004 | Eggert et al. |
| 7,114,954 B2 | 10/2006 | Eggert et al. |
| 7,192,284 B2 | 3/2007 | Eggert et al. |
| 7,811,090 B2 | 10/2010 | Eggert et al. |
| 7,866,983 B2 | 1/2011 | Hemphill et al. |
| 7,976,312 B2 | 7/2011 | Eggert et al. |
| 7,976,313 B2 | 7/2011 | Eggert et al. |
| 8,016,598 B2 | 9/2011 | Eggert et al. |
| 8,152,532 B2 | 4/2012 | Eggert et al. |
| 8,419,438 B2 | 4/2013 | Eggert et al. |
| 8,500,452 B2 | 8/2013 | Trotta et al. |

(Continued)

*Primary Examiner* — Timothy A Musselman
(74) *Attorney, Agent, or Firm* — Haynes and Boone, LLP

(57) ABSTRACT

Devices, systems, and methods appropriate for use in combat medical training are provided. In some instances, the combat medical simulators facilitate training of common field medical techniques including tracheostomy, wound care, tourniquet use, pneumothorax, cardiopulmonary resuscitation, and/or other medical treatments. Further, the combat medical simulators have joints that provide realistic ranges of motions to enhance the realism of the training experience.

23 Claims, 65 Drawing Sheets

(56) References Cited

U.S. PATENT DOCUMENTS

| | | |
|---|---|---|
| 8,517,740 B2 | 8/2013 | Trotta et al. |
| 8,556,635 B2 | 10/2013 | Toly |
| 8,608,483 B2 | 12/2013 | Trotta et al. |
| 8,678,831 B2 | 3/2014 | Trotta et al. |
| 8,696,362 B2 | 4/2014 | Eggert et al. |
| 8,740,624 B2 | 6/2014 | Eggert et al. |
| 2004/0121294 A1* | 6/2004 | Lord ............... G09B 23/28 434/262 |
| 2007/0243512 A1* | 10/2007 | King ............... G09B 23/28 434/268 |
| 2008/0138780 A1* | 6/2008 | Eggert ............ G06F 19/3437 434/266 |
| 2009/0011394 A1* | 1/2009 | Meglan ............ G09B 23/28 434/268 |
| 2009/0148822 A1 | 6/2009 | Eggert et al. |
| 2009/0226867 A1* | 9/2009 | Kalafut ............ G09B 23/32 434/268 |
| 2009/0298034 A1* | 12/2009 | Parry .............. G09B 9/003 434/272 |
| 2011/0008760 A1* | 1/2011 | Bevan ............. G09B 23/28 434/268 |
| 2012/0214144 A1* | 8/2012 | Trotta ............. G09B 23/281 434/267 |
| 2014/0212862 A1 | 7/2014 | Rodriguez et al. |

\* cited by examiner

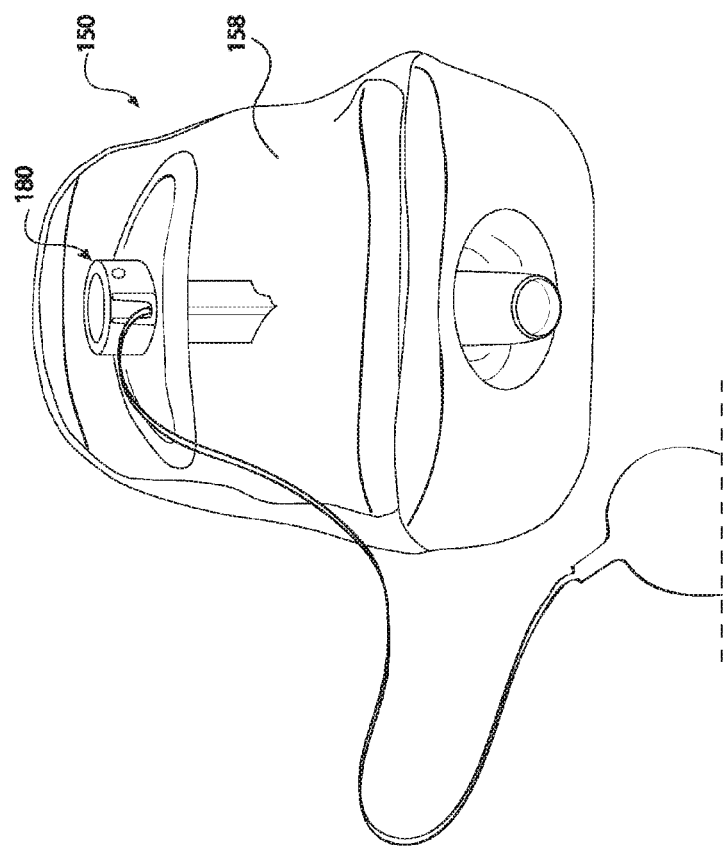
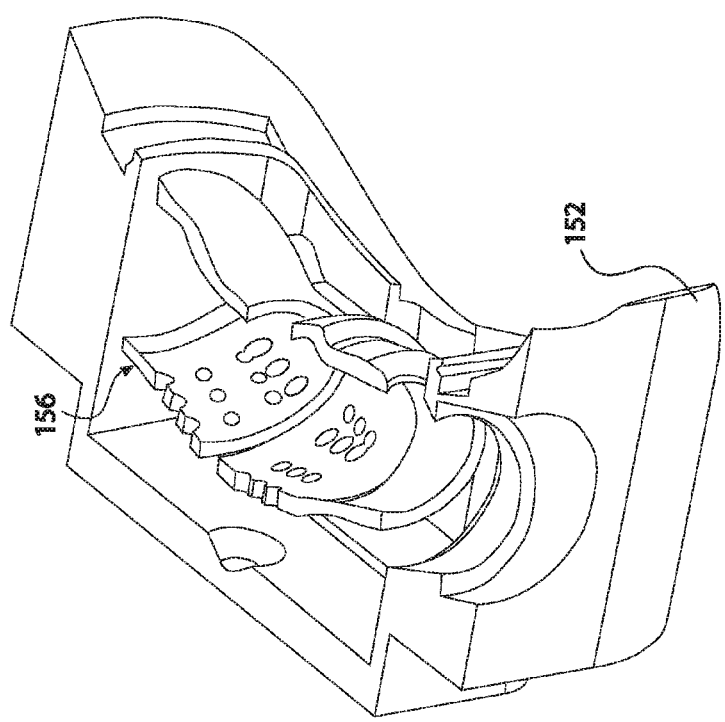
Fig.24b
Fig.24a

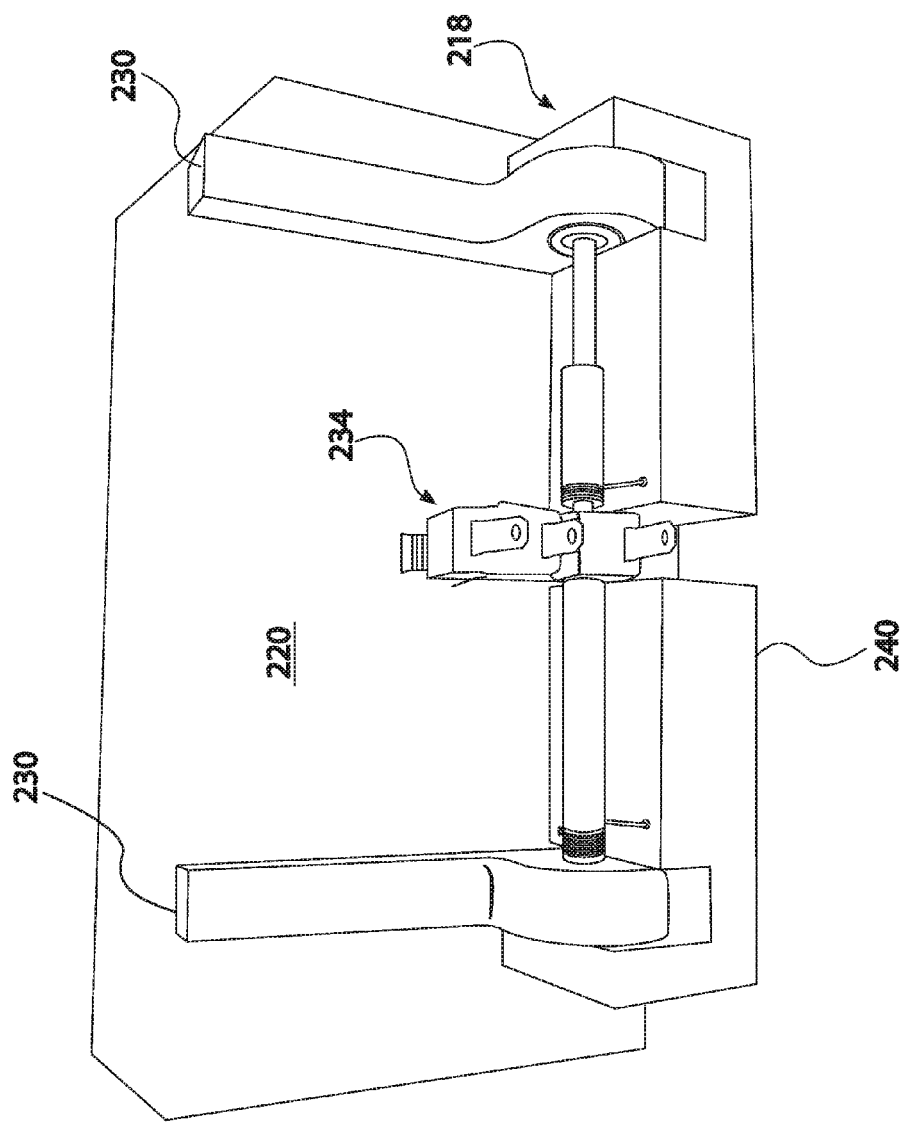

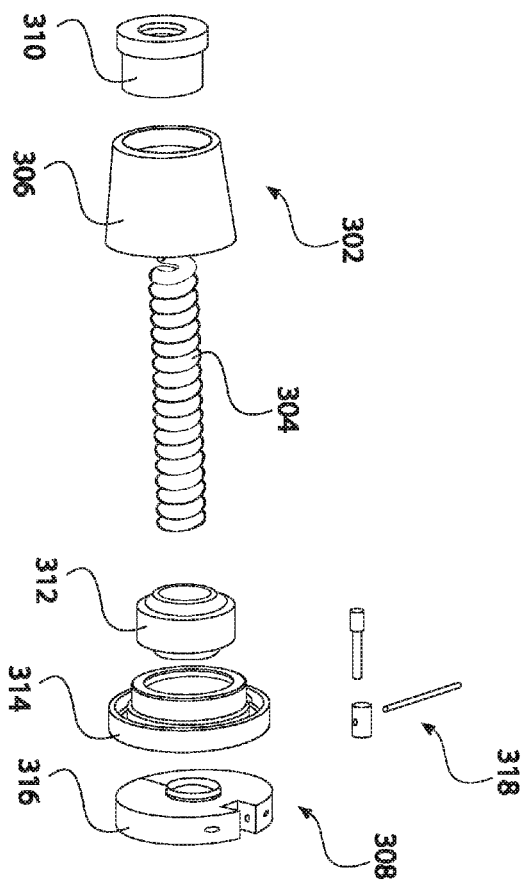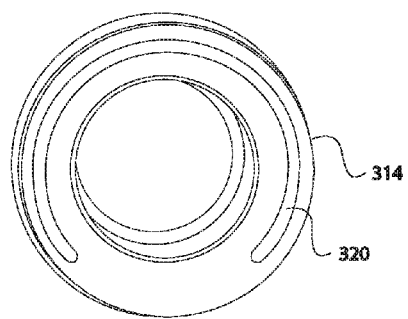
Fig.41                    Fig.42

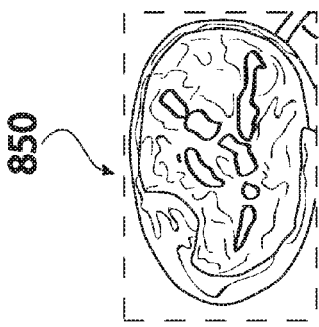
Fig.102
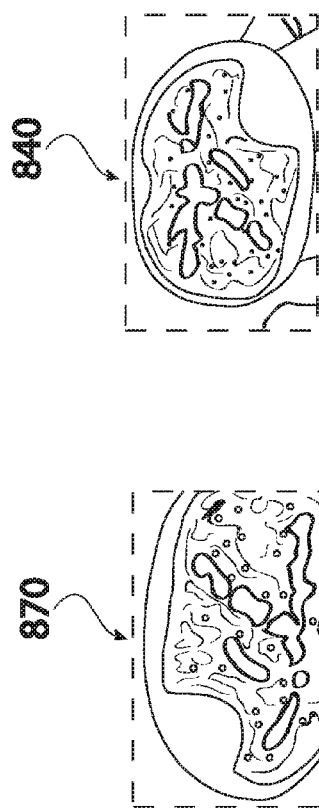
Fig.101
Fig.100
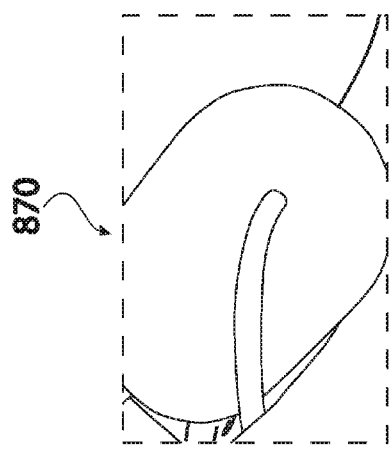
Fig.104
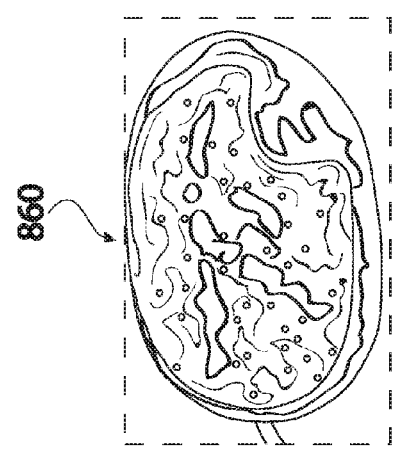
Fig.103

COMBAT MEDICAL SIMULATORS AND ASSOCIATED SYSTEMS AND METHODS

CROSS-REFERENCE TO RELATED APPLICATIONS

This application is a continuation of U.S. Ser. No. 13/752,256 filed on Jan. 28, 2013, now U.S. Pat. No. 9,240,130, which claims priority to and the benefit of U.S. Provisional Patent Application No. 61/591,851, filed on Jan. 27, 2012, each of which is hereby incorporated by reference in its entirety.

BACKGROUND

As medical science has progressed, it has become increasingly important to provide non-human interactive formats for teaching patient care. Non-human interactive devices and systems can be used to teach the skills needed to successfully identify and treat various patient conditions without putting actual patients at risk. Such training devices and systems can be used by medical personnel and medical students to learn the techniques required for proper patient care, including those techniques used in war or combat zones where time is often of the essence in successful to both patient and medical personnel survival. In that regard, the training of medical personnel and patients is greatly enhanced through the use of realistic hands-on training with devices and systems, such as those of the present disclosure, that mimic characteristics of natural human and, in particular, allow training of procedures commonly performed in war and/or combat zones.

In view of the foregoing, there remains a need for devices, systems, and methods appropriate for use in combat medical training.

BRIEF DESCRIPTION OF THE DRAWINGS

The present disclosure can be better understood from the following detailed description when read with the accompanying figures.

FIG. 24a is a perspective, cross-sectional view of the trachea insert of FIG. 14 positioned within the trachea box of FIG. 12 positioned within the trachea housing of FIG. 10.

FIG. 24b is a perspective view of trachea tube positioned through an opening created in the trachea device.

FIG. 31 is a bottom view of a portion of a pneumothorax simulation system according to an embodiment of the present disclosure.

FIG. 41 is a perspective, exploded view of the shoulder joint assembly of FIGS. 39 and 40.

FIG. 42 is an end view of a component of the shoulder joint assembly of FIGS. 39-41 according to an embodiment of the present disclosure.

FIGS. 98-103 illustrate a series of steps to enhance the realism of the wound structure of FIGS. 87 and 97 according to an embodiment of the present disclosure.

FIG. 104 illustrates the attachment of tubing to the wound structure of FIGS. 87-103 according to an embodiment of the present disclosure.

DETAILED DESCRIPTION OF PREFERRED EMBODIMENTS

Figure 1:
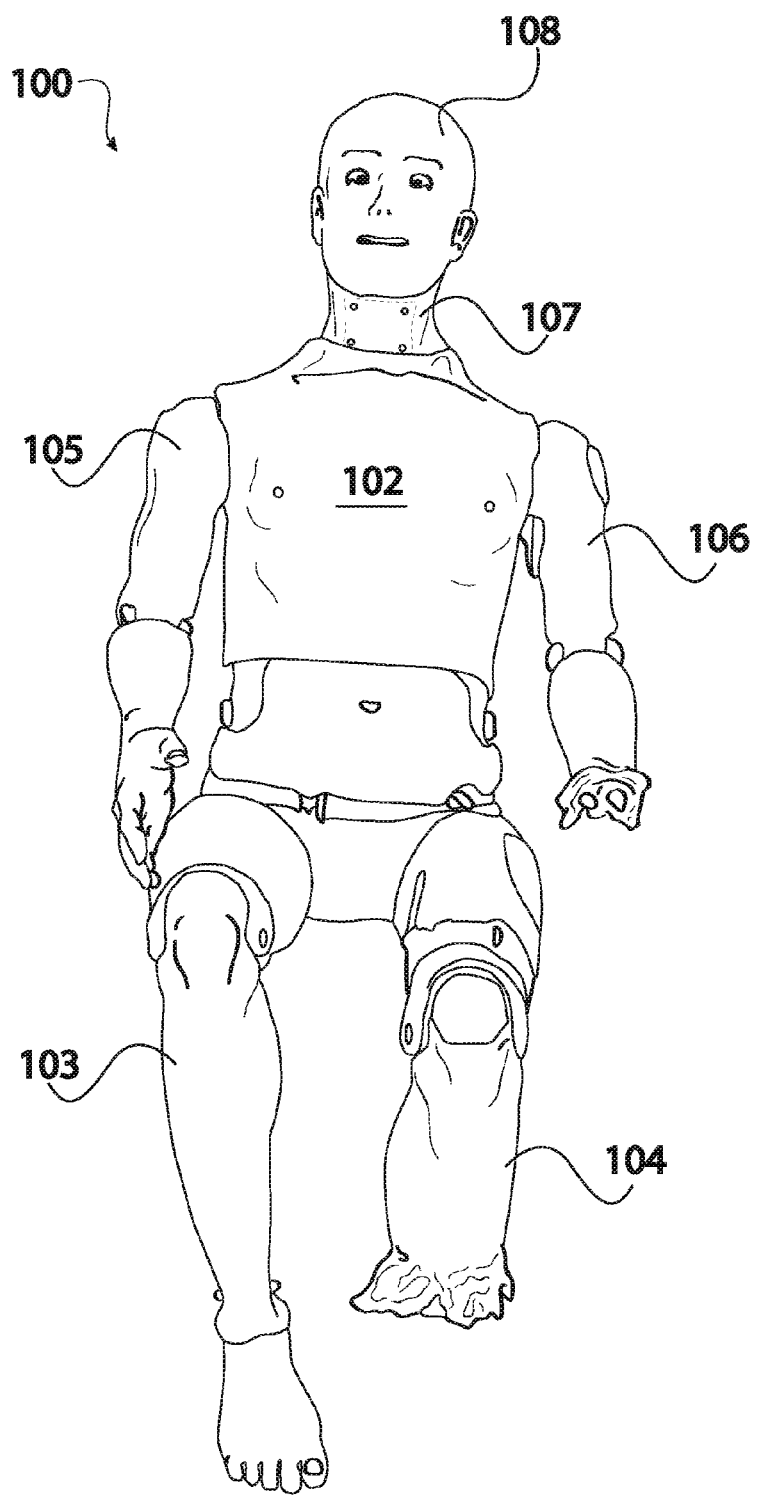
FIG. 1 is a perspective view of a patient simulator according to one embodiment of the present disclosure.

For the purposes of promoting an understanding of the principles of the present disclosure, reference will now be made to the embodiments illustrated in the drawings, and specific language will be used to describe the same. It is nevertheless understood that no limitation to the scope of the disclosure is intended. Any alterations and further modifications to the described devices, systems, and methods, and any further application of the principles of the present disclosure are fully contemplated and included within the present disclosure as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. For the sake of brevity, however, the numerous iterations of these combinations will not be described separately.

Referring initially to FIG. 1, shown therein is a patient simulator 100. In the illustrated embodiment, the patient simulator 100 is a full body patient simulator. To that end, the patient simulator 100 includes a torso 102, legs 103 and 104, arms 105 and 106, a neck 107, and a head 108. The various anatomical portions of the patient simulator 100 are sized, shaped, and formed of a suitable material to mimic natural human anatomy. The patient simulator 100 can be either a male simulator or a female simulator and will include appropriate anatomical features based on the simulated gender. Further, in some instances, the patient simulator 100 includes a simulated circulatory system, a simulated respiratory system, and/or other simulated aspects. In that regard, the patient simulator 100 is in communication with a control system configured to control the circulatory system, respiratory system, and/or other aspects of the patient simulator. For example, in some instances, the control system is configured to adjust parameters associated with the circulatory system, respiratory system, and/or other aspects of the patient simulator 100 in accordance with a simulation scenario and/or a user's application of treatment to the patient simulator 100 based on the simulation scenario.

Accordingly, in some instances, the patient simulator 100 includes one or more features as described in In some instances, aspects of the present disclosure are configured for use with the simulators and the related features disclosed in U.S. patent application Ser. No. 13/223,020, now U.S. Pat. No. 8,419,438, issued Apr. 16, 2013, U.S. patent application Ser. No. 13/031,116, now U.S. Pat. No. 8,517,740, issued Aug. 27, 2013, U.S. patent application Ser. No. 13/031,087, now U.S. Pat. No. 8,678,831, issued Mar. 25, 2014, U.S. patent application Ser. No. 13/031,102, now U.S. Pat. No. 8,608,483, issued Dec. 17, 2013, U.S. patent application Ser. No. 12/856,903, now U.S. Pat. No. 8,152,532, issued Apr. 10, 2012, U.S. patent application Ser. No. 12/708,682, now U.S. Pat. No. 8,740,624, issued Jun. 3, 2014, U.S. patent application Ser. No. 12/708,659, now U.S. Pat. No. 8,500,452, issued Aug. 6, 2013, U.S. patent application Ser. No. 11/952,606, now U.S. Pat. No. 8,696,362, issued Apr. 15, 2014, U.S. patent application Ser. No. 11/952,669, published as U.S. Patent Application Publication No. 2009/0148822 A1 on Jun. 11, 2009, U.S. Pat. Nos. 8,016,598, 7,976,313, 7,976,312, 7,866,983, 7,114,954, 7,192,284, 7,811,090, 6,758,676, 6,503,087, 6,527,558, 6,443,735, 6,193,519, and 5,853,292, and 5,472,345, each of which is hereby incorporated by reference in its entirety.

Further, in some instances, the patient simulator 100 includes one or more features as provided in medical simulators provided by Gaumard Scientific Company, Inc. based out of Miami, Fla., including but not limited to the following models: S1000 Hal®, S1020 Hal®, S1030 Hal®, S3000 Hal®, S2000 Susie®, S221 Clinical Chloe, S222 Clinical Chloe, S222.100 Super Chloe, S303 Code Blue®, S304 Code Blue®, S100 Susie®, S100 Simon®, S200 Susie®, S200 Simon®, S201 Susie®, S201 Simon®, S203 Susie®, S204 Simon®, S205 Simple Simon®, S206 Simple Susie®, S3004 Pediatric Hal®, S3005 Pediatric Hal®, S3009 Premie Hal®, S3010 Newborn Hal®, S110 Mike®, S110 Michelle®, S150 Mike®, S150 Michelle®, S107 Multipurpose Patient Care and CPR Infant Simulator, S117 Multipurpose Patient Care and CPR Pediatric Simulator, S157 Multipurpose Patient Care and CPR Pediatric Simulator, S575 Noelle®, S565 Noelle®, S560 Noelle®, S555 Noelle®, S550 Noelle®, S550.100 Noelle, and/or other patient simulators.

Figure 2:
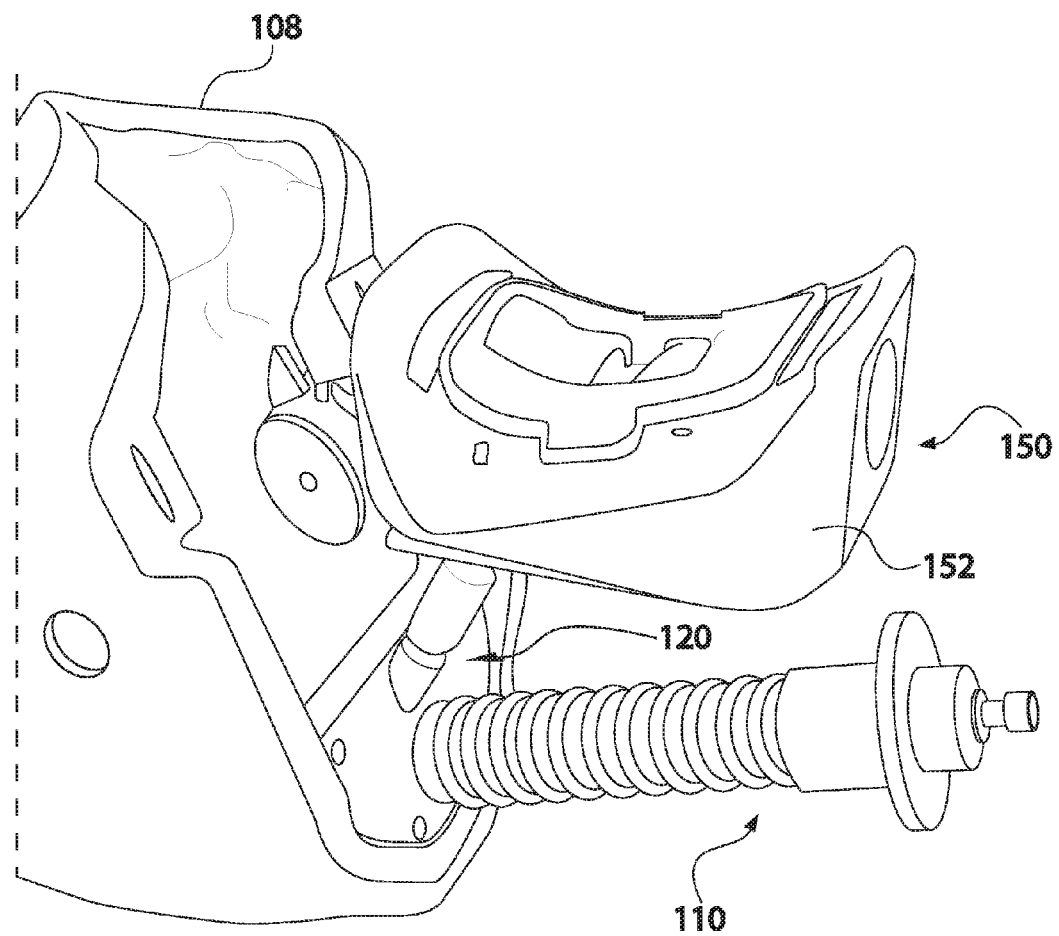
FIG. 2 is a perspective view of a neck mechanism of the patient simulator of FIG. 1 according to an embodiment of the present disclosure.
Figure 3:
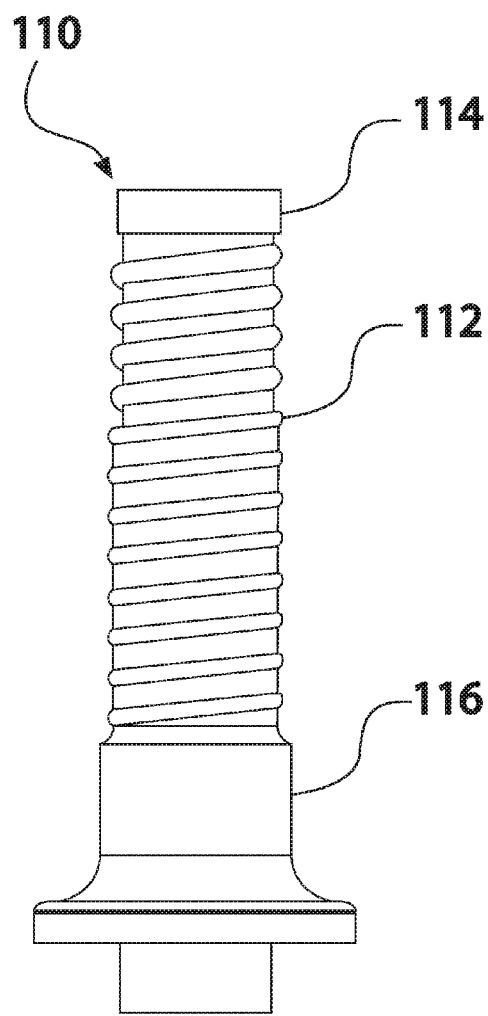
FIG. 3 is a front view of a neck support of the neck mechanism of FIG. 2 according to one embodiment of the present disclosure.
Figure 4:
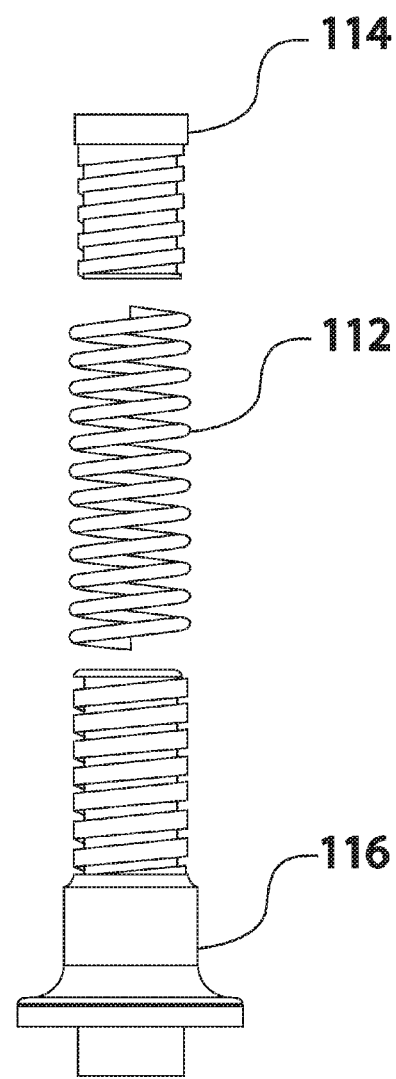
FIG. 4 is a front, exploded view of the neck support of FIG. 3.

Referring now to FIGS. 2-4, shown therein are aspects of a neck mechanism having a neck support structure 110 according to an embodiment of the present disclosure. In that regard, FIG. 2 is a perspective view of the neck mechanism illustrating the support structure; FIG. 3 is a front view of a neck support structure 110 according to one embodiment of the present disclosure; and FIG. 4 is a front, exploded view of the neck support structure 110. As shown the neck support structure 110 comprises a spring 112 that threadedly mates with two threaded tubular structures 114 and 116. In that regard, the ends of the tubular structures 114 and 116 that are not threadingly engaged with the spring 112 are configured to be fixedly secured to a mount within a portion of the head 108 of the patient simulator 100 and a mount within a portion of the torso 102 of the patient simulator, respectively. The resulting neck support structure 100 provides realistic range of motion to the patient simulator's neck 107 and head 108, while also acting as a shock absorber to prevent unwanted damage to the patient simulator's head and inner components during rough handling.

Figure 6:
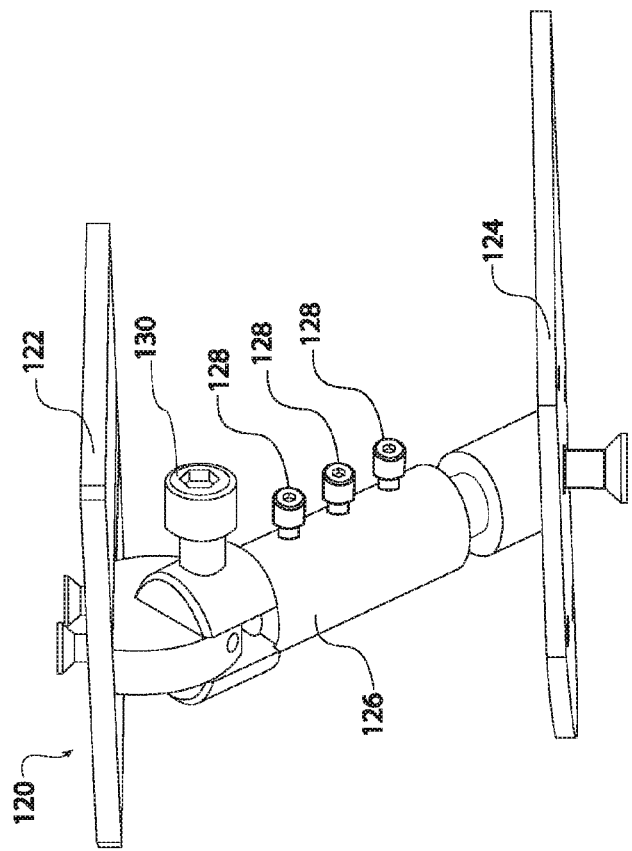
FIG. 6 is a perspective rear view of the mounting structure of FIG. 5.
Figure 5:
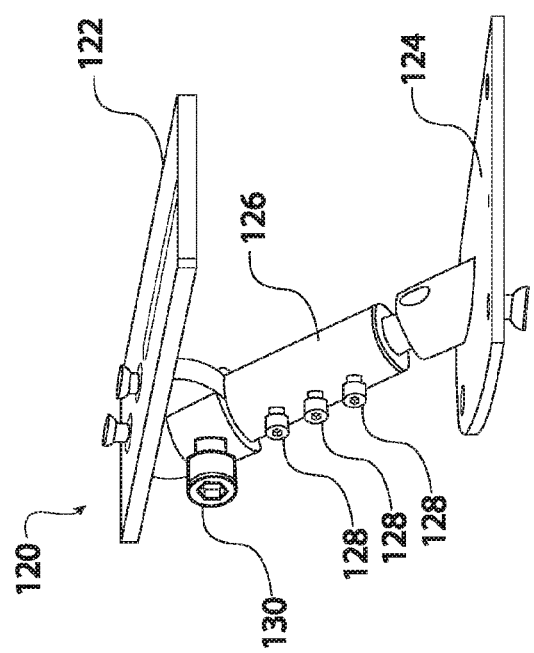
FIG. 5 is a perspective front view of a mounting structure of the neck mechanism of FIG. 2 according to one embodiment of the present disclosure.
Figure 7:
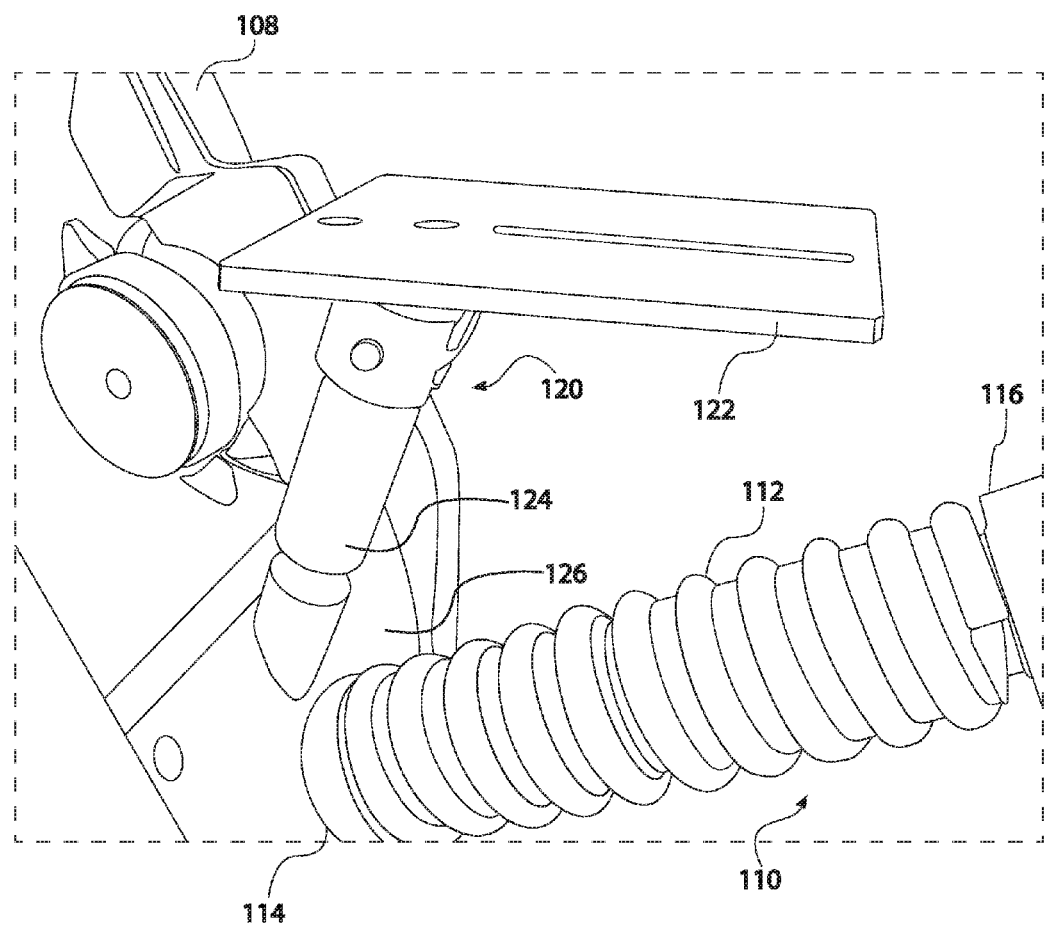
FIG. 7 is a perspective view of the mounting structure of FIGS. 5 and 6 attached to a head portion of the patient simulator of FIG. 1.

Referring now to FIGS. 2 and 5-7, shown therein are aspects of a neck mechanism having a mounting structure 120 according to an embodiment of the present disclosure. In that regard, FIG. 2 is a perspective view of the neck mechanism illustrating the mounting structure 120; FIG. 5 is a perspective front view of the mounting structure 120; FIG. 6 is a perspective rear view of the mounting structure 120; and FIG. 7 is a perspective view of the mounting structure 120 attached to a head portion 108 of the patient simulator. Generally, the mounting structure 120 includes two platforms 122 and 124 connected by a variable length support 126. The platform 124 is configured to be fixedly secured to the head 108 of the patient simulator 100. In some instances, the platform 124 also interfaces with the end of the tubular structure 114 connected to the spring 112 of the neck support structure 110 that is to be fixedly secured to the head 108. The platform 122 is configured to allow a trachea device 150 (discussed in greater detail below) to be mounted thereto, as shown in FIG. 2, for example. In that regard, the mounting structure 120 is adjustable such that the position of the platform 122 can be adjusted longitudinally and rotationally (see series of locking screws 128 along length of tube extending between platforms that allow such movement when loosened and prevent such movement when tightened) as well as pivotally (see locking screw 130 at pivot point of platform 122). Accordingly, a specifically desired orientation and/or position of the platform 122 can be selected and achieved for any number of reasons (e.g., simulate a specific condition, simulator manufacturing tolerance, different size trachea devices, etc.).

Figure 8:
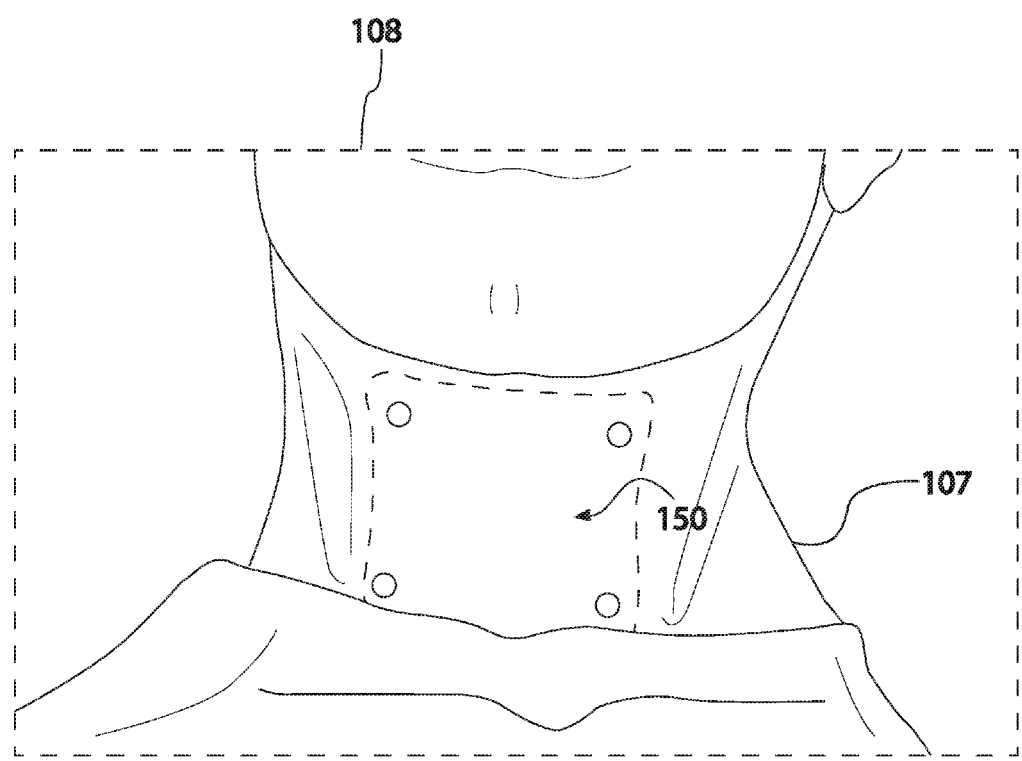
FIG. 8 is a front view of a neck portion of the patient simulator of FIG. 1 according to an embodiment of the present disclosure.
Figure 9:
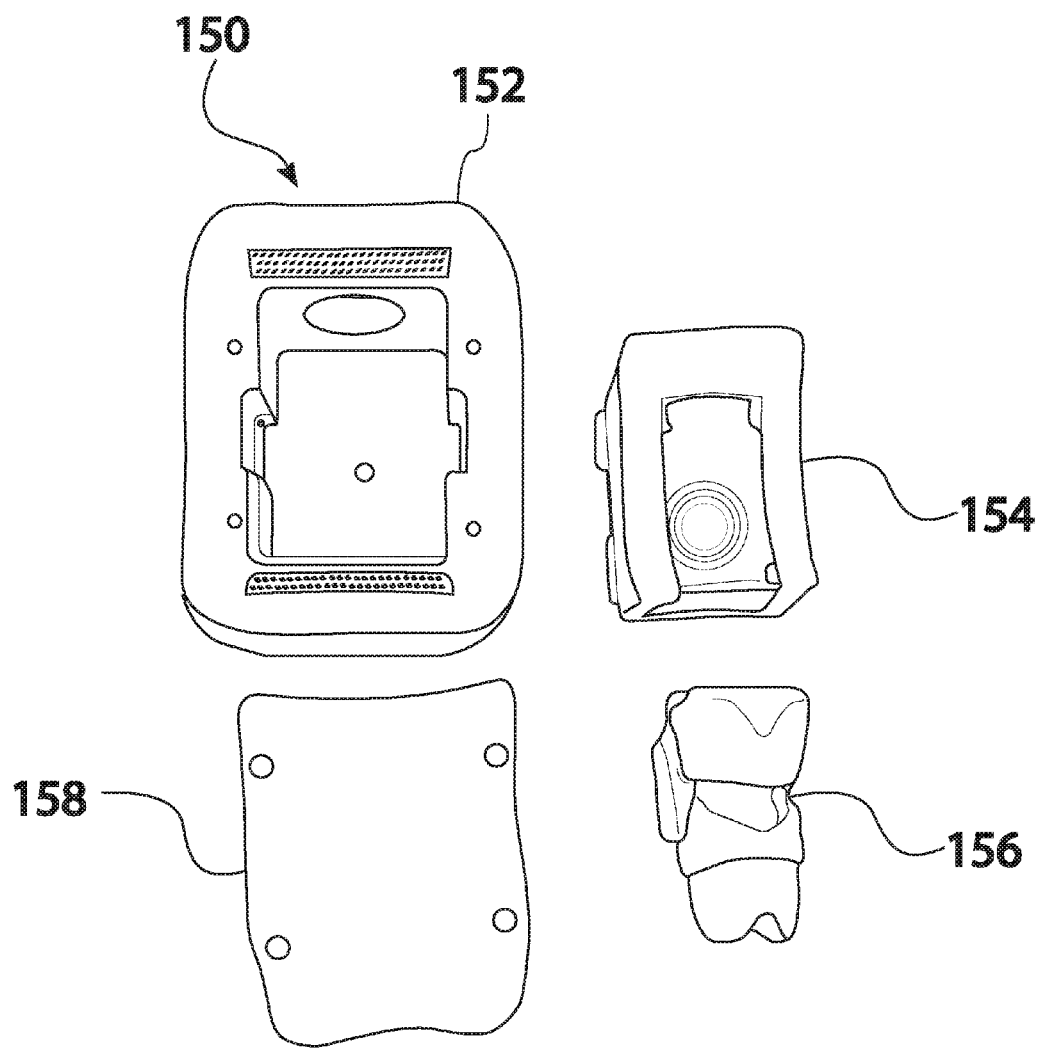
FIG. 9 is a top view of components of a trachea device of the neck portion of the patient simulator of FIG. 1 according to an embodiment of the present disclosure.
Figure 10:
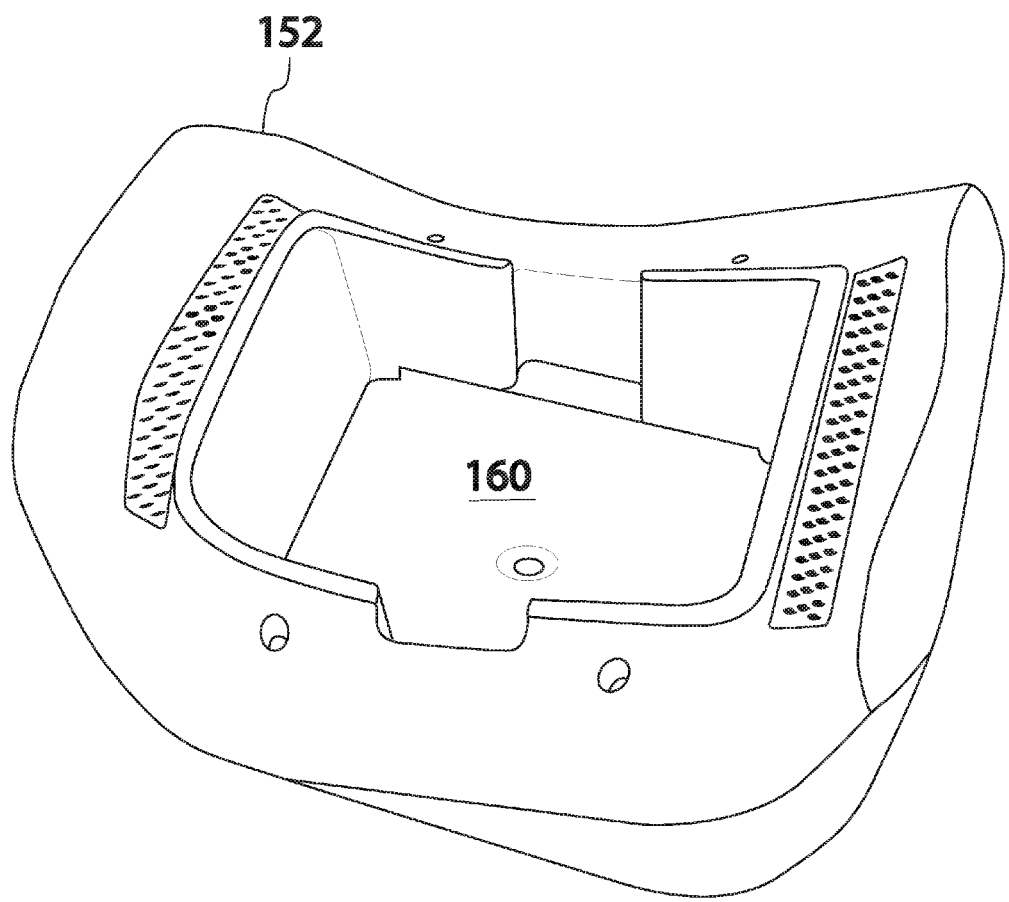
FIG. 10 is a perspective view of a trachea housing according to an embodiment of the present disclosure.
Figure 11:
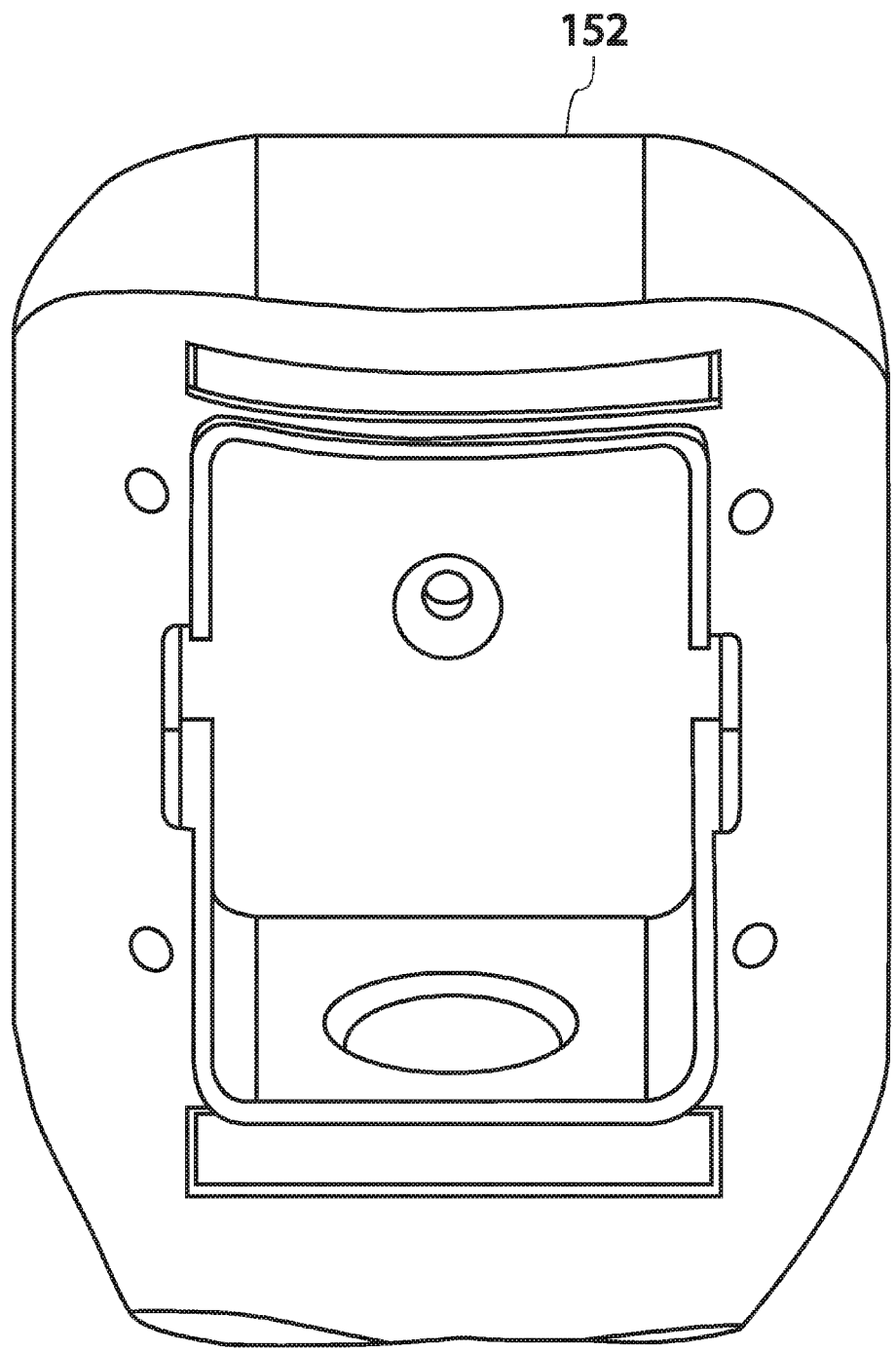
FIG. 11 is a top view of the trachea housing of FIG. 10.
Figure 12:
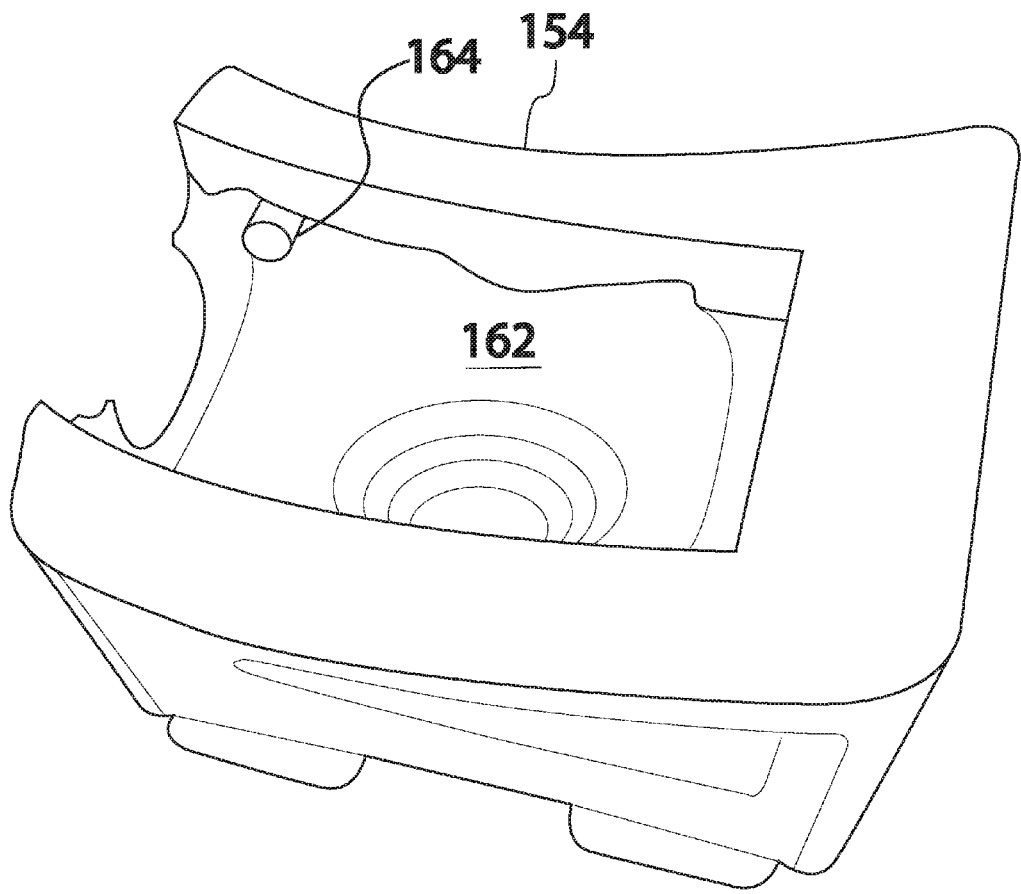
FIG. 12 is a perspective view of a trachea box according to an embodiment of the present disclosure.
Figure 13:
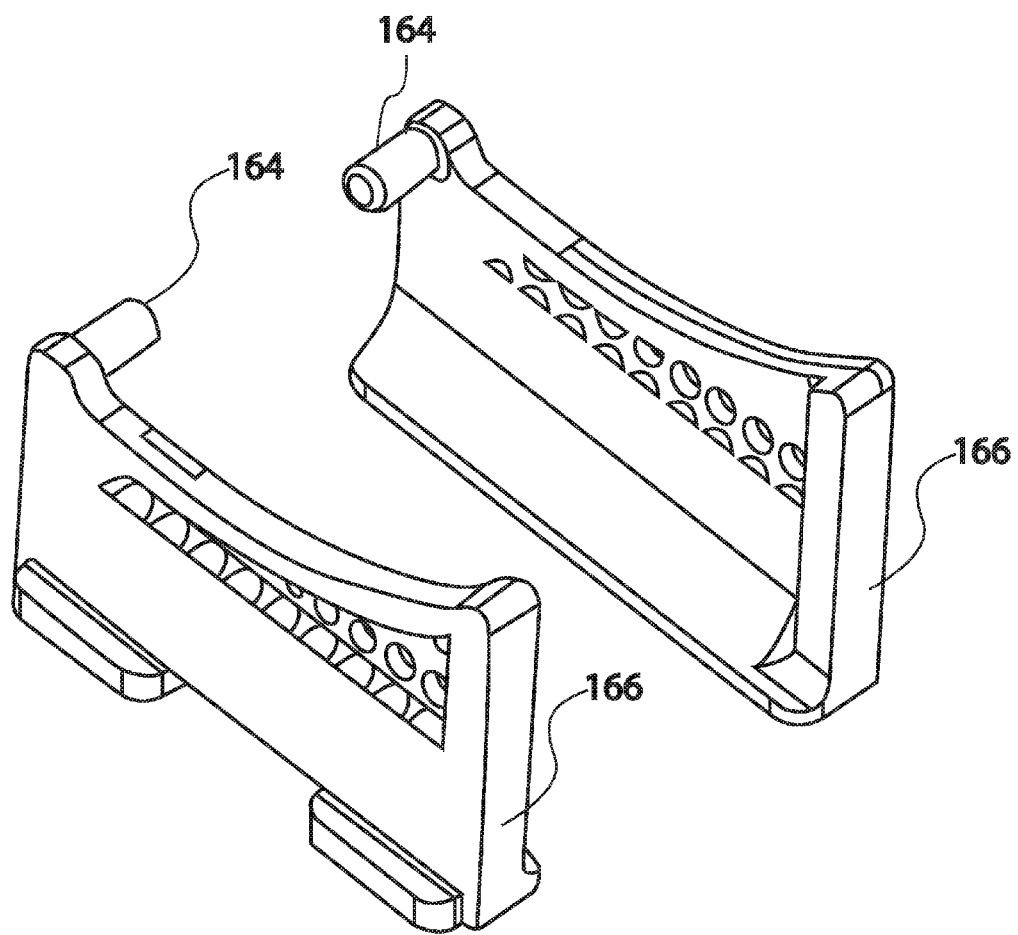
FIG. 13 is a perspective view of supports of the trachea box of FIG. 12 according to an embodiment of the present disclosure.
Figure 14:
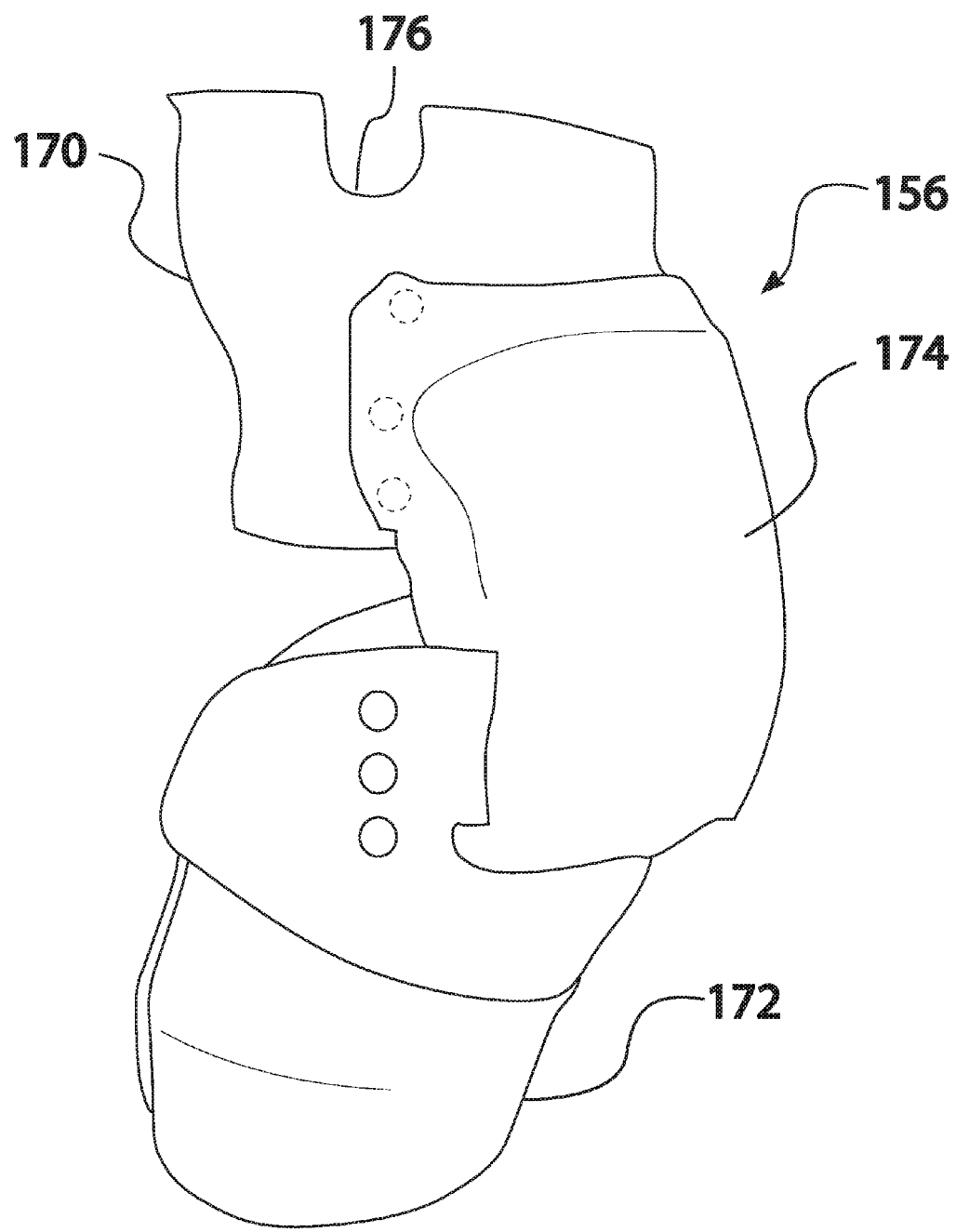
FIG. 14 is a side view of a trachea insert according to an embodiment the present disclosure.
Figure 15:
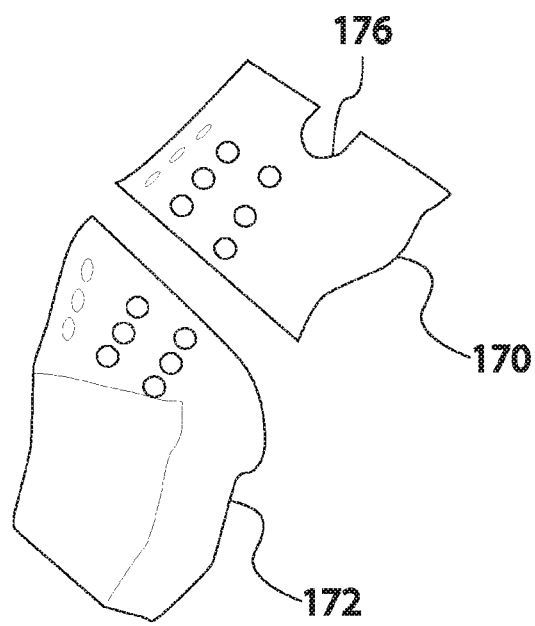
FIG. 15 is a side view of components of the trachea insert of FIG. 14 according to an embodiment the present disclosure.
Figure 16:
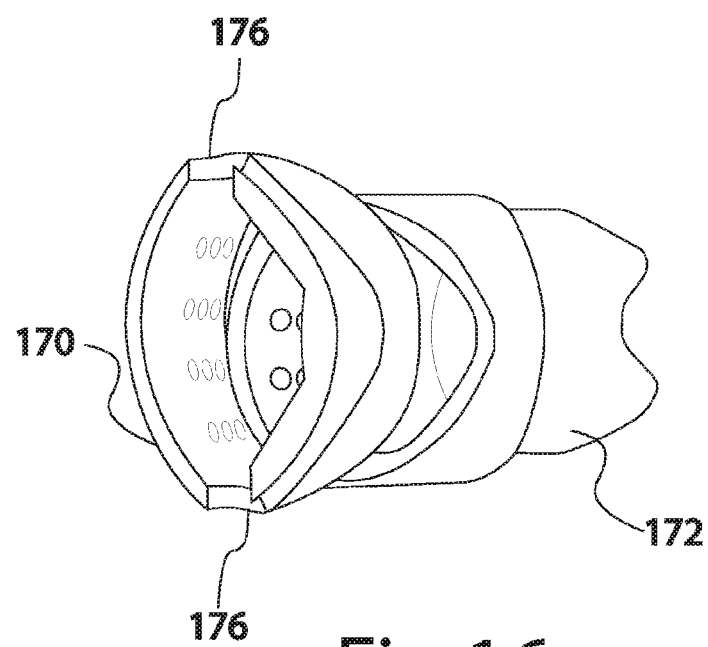
FIG. 16 is an end view of the components of the trachea insert shown in FIG. 15.
Figure 17:
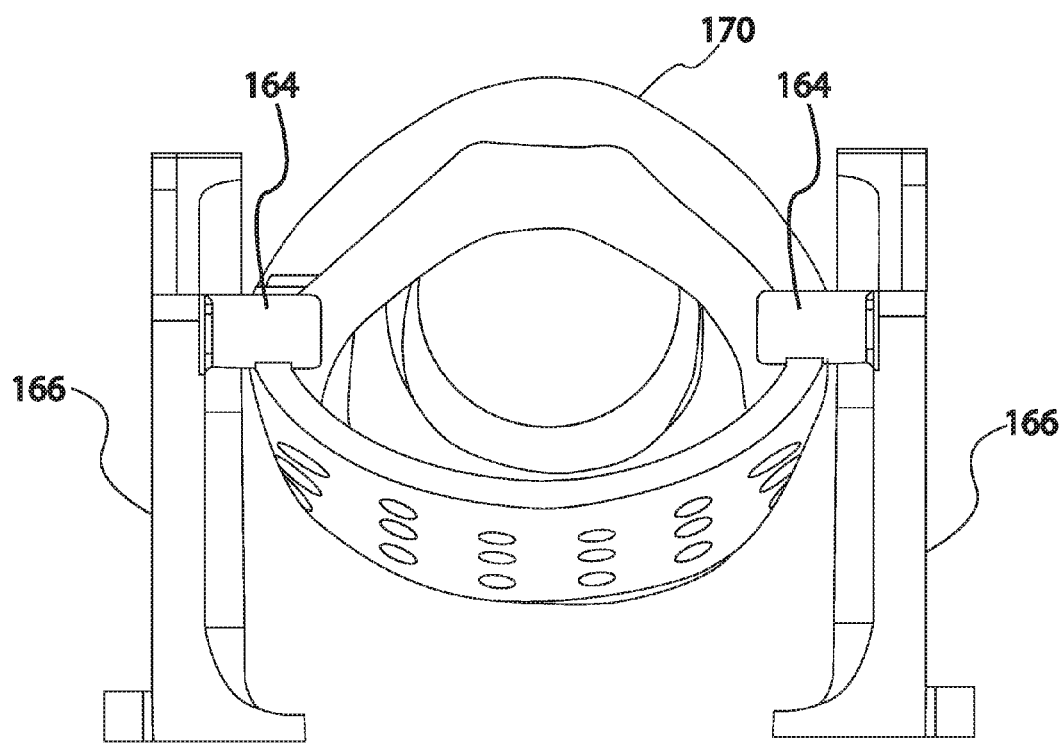
FIG. 17 is an end view of the components of the trachea insert similar to that of FIG. 16, but showing the trachea insert mated with the supports of the trachea box shown in FIG. 13.
Figure 18:
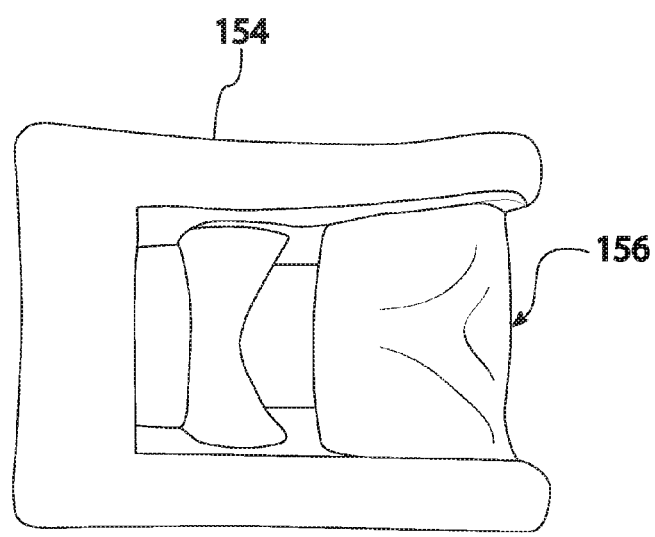
FIG. 18 is a top view of the trachea insert of FIG. 14 positioned within the trachea box of FIG. 12.
Figure 19:
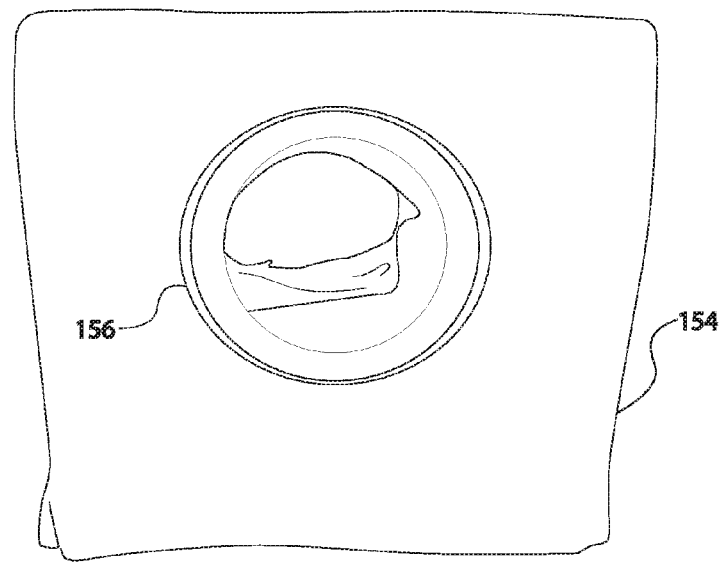
FIG. 19 is an end view of the trachea insert of FIG. 14 positioned within the trachea box of FIG. 12.
Figure 20:
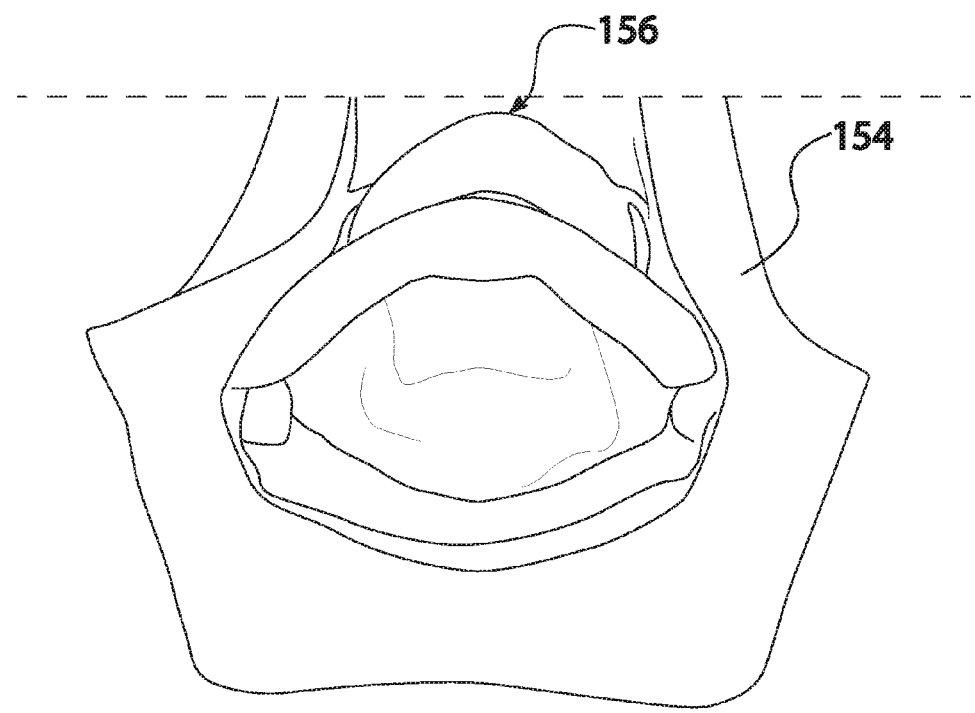
FIG. 20 is an end view of the trachea insert of FIG. 14 positioned within the trachea box of FIG. 12 similar to that of FIG. 19, but from an opposing end.
Figure 22:
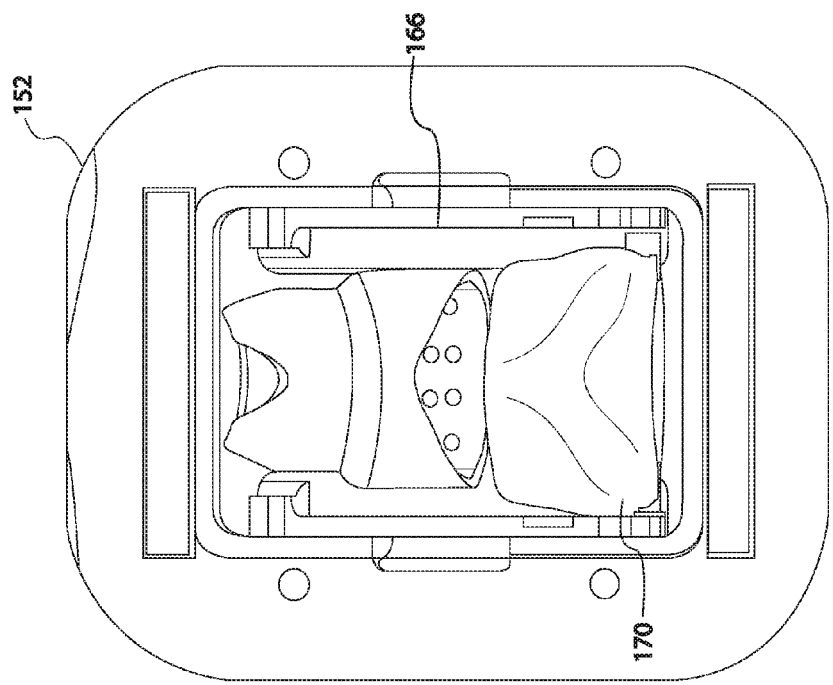
FIG. 22 is a top view of the trachea insert of FIG. 14 positioned within the trachea box of FIG. 12 positioned within the trachea housing of FIG. 10.
Figure 21:
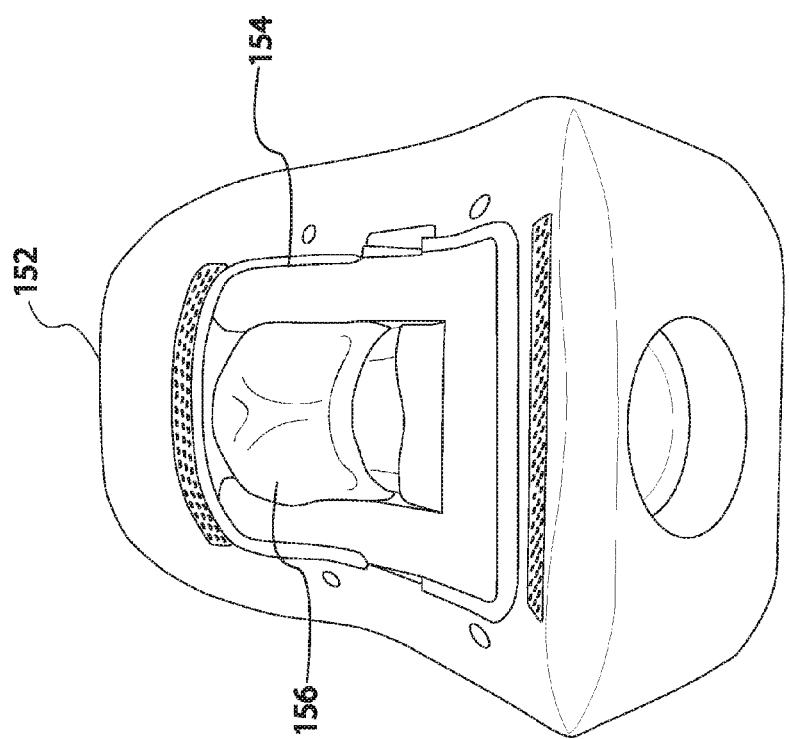
FIG. 21 is a perspective view of the trachea insert of FIG. 14 positioned within the trachea box of FIG. 12 positioned within the trachea housing of FIG. 10.
Figure 23:
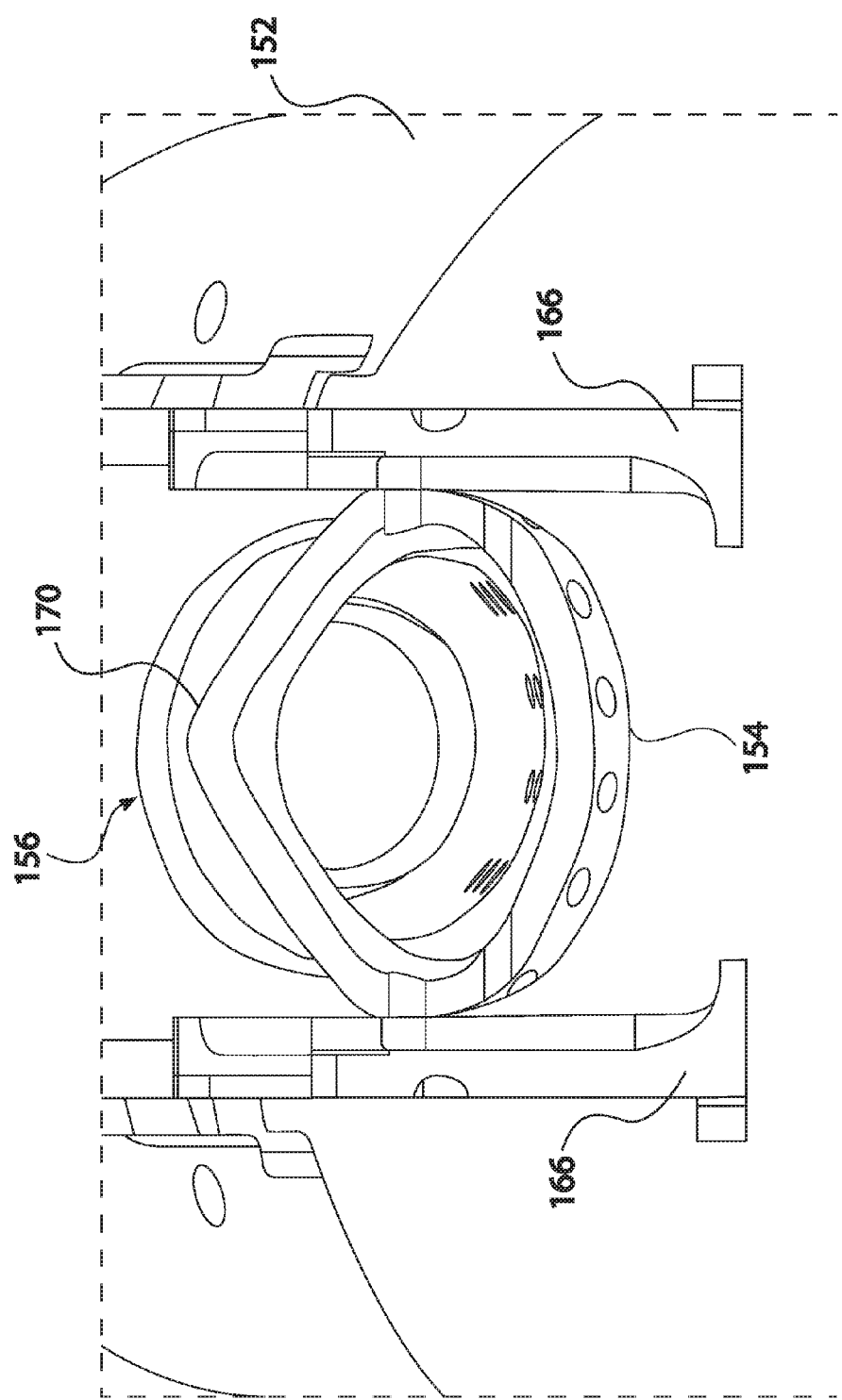
FIG. 23 is an end view of the trachea insert of FIG. 14 positioned within the trachea box of FIG. 12 positioned within the trachea housing of FIG. 10, where only portions of the trachea box and trachea housing are illustrated.

Referring now to FIGS. 8-24b, shown therein are aspects of a trachea device 150 according to an embodiment of the present disclosure. In that regard, FIG. 8 is a front view of a neck portion 107 of the patient simulator 100 containing the trachea device 150; FIG. 9 is a top view of components of the trachea insert; FIG. 10 is a perspective view of a trachea housing according to an embodiment of the present disclosure. FIG. 11 is a top view of the trachea housing; FIG. 12 is a perspective view of a trachea box according to an embodiment of the present disclosure; FIG. 13 is a perspective view of supports of the trachea box according to an embodiment of the present disclosure; FIG. 14 is a side view of a trachea insert according to an embodiment the present disclosure; FIG. 15 is a side view of components of the trachea insert; FIG. 16 is an end view of the components of the trachea insert; FIG. 17 is an end view of the components of the trachea insert similar to that of FIG. 16, but showing the trachea insert mated with the supports of the trachea box; FIG. 18 is a top view of the trachea insert positioned within the trachea box; FIG. 19 is an end view of the trachea insert positioned within the trachea box; FIG. 20 is an end view of the trachea insert positioned within the trachea box similar to that of FIG. 19, but from an opposing end; FIG. 21 is a perspective view of the trachea insert positioned within the trachea box, which is positioned within the trachea housing; FIG. 22 is a top view of the trachea insert of positioned within the trachea box, which is positioned within the trachea housing; FIG. 23 is an end view of the trachea insert positioned within the trachea box, which is positioned within the trachea housing; FIG. 24a is a perspective, cross-sectional view of the trachea insert positioned within the trachea box, which is positioned within the trachea housing; and FIG. 24b is a perspective view of trachea tube positioned through an opening created in the trachea device.

The trachea device allows training of combat medics on proper tracheostomy procedures, including insertion of a trachea tube. In that regard, the trachea device includes a trachea housing 152, a trachea box 154, a surgical cricoid insert 156 with anatomical landmarks, and a skin cover 158. As shown in FIGS. 10 and 11, the housing 152 includes a recess 160 sized and shaped to receive the trachea box 154. As shown in FIG. 12, the trachea box 154 includes a recess 162 sized and shaped to receive the cricoid insert 156. In that regard, the trachea box 154 includes projections 164 that are configured to mate with corresponding recesses in the cricoid insert 156. To this end, the trachea box 154 includes support structures 166 each having a projection 164 over which a suitable flexible material is overmolded/injected around to form the trachea box 154. In that regard, the support structures 166 are formed of a more rigid material than the overmolded/injected material. As shown in FIG. 14, two pieces 170 and 172 of the cricoid insert are connected by a silicon layer 174 that simulates human cartilage. Piece 170 of the cricoid insert 156 includes recesses 176 for engaging with the projections 164 of the trachea box 154 when positioned within the recess 162 of the trachea box. The surgical cricoid insert 156 is formed of sufficiently durable materials to be repeatedly subjected to a tracheostomy hook. In that regard, in typical use the combat medic will make two incisions (one medial, one lateral) through the trachea skin cover 158 over the surgical cricoid 156. Then the medic will insert the tracheostomy hook into the cricoid cartilage at the intersection of the incisions and lift upward towards a 45 degree position. The tracheostomy hook is utilized to hold the trachea steady during the tracheostomy procedure. As shown in FIG. 24b, once the opening has been created, the combat medic inserts a tracheostomy tube 180 thru the cricoid cartilage such that oxygen can be provided to the wounded soldier. As shown, each of the components of the trachea device are replaceable and easily assembled.

Figure 25:
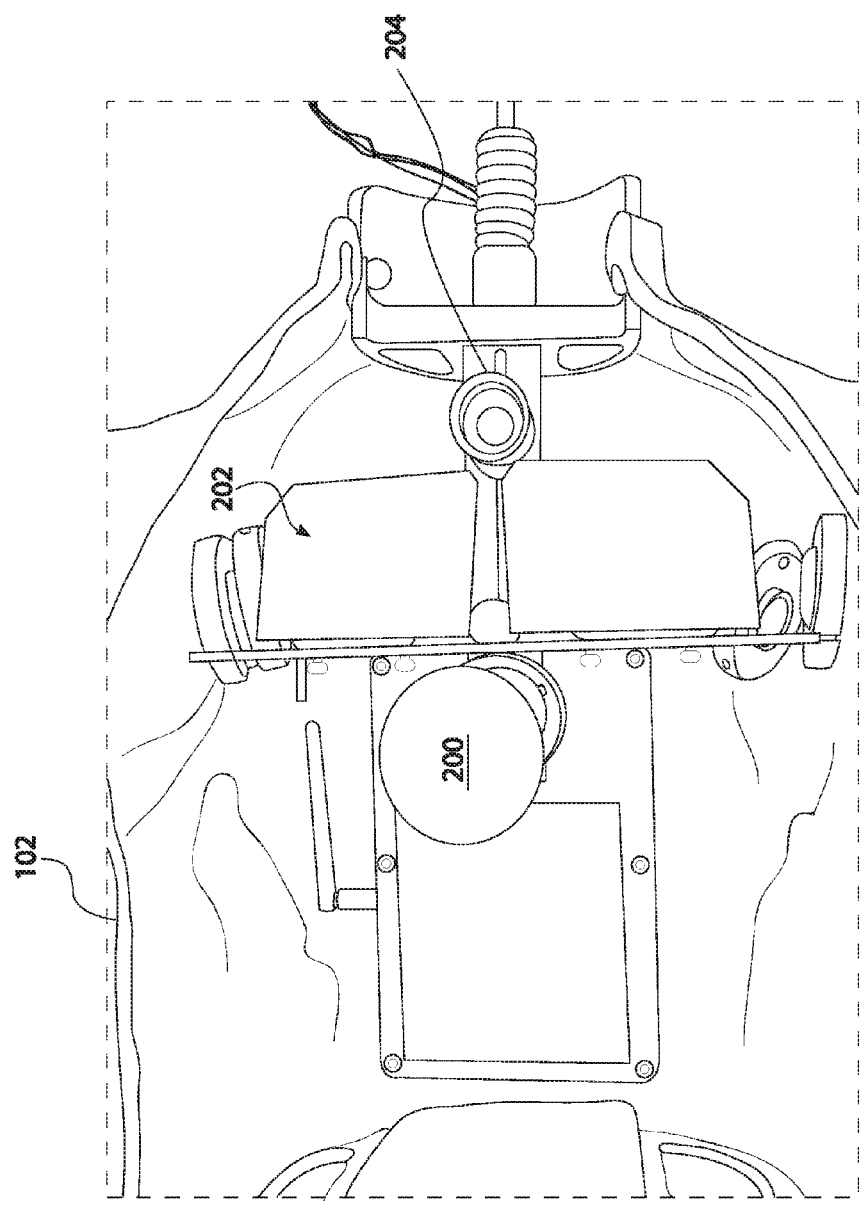
FIG. 25 is a top view of a chest cavity of the patient simulator of FIG. 1 illustrating support structures and a pneumothorax simulation system according to an embodiment of the present disclosure.
Figure 26:
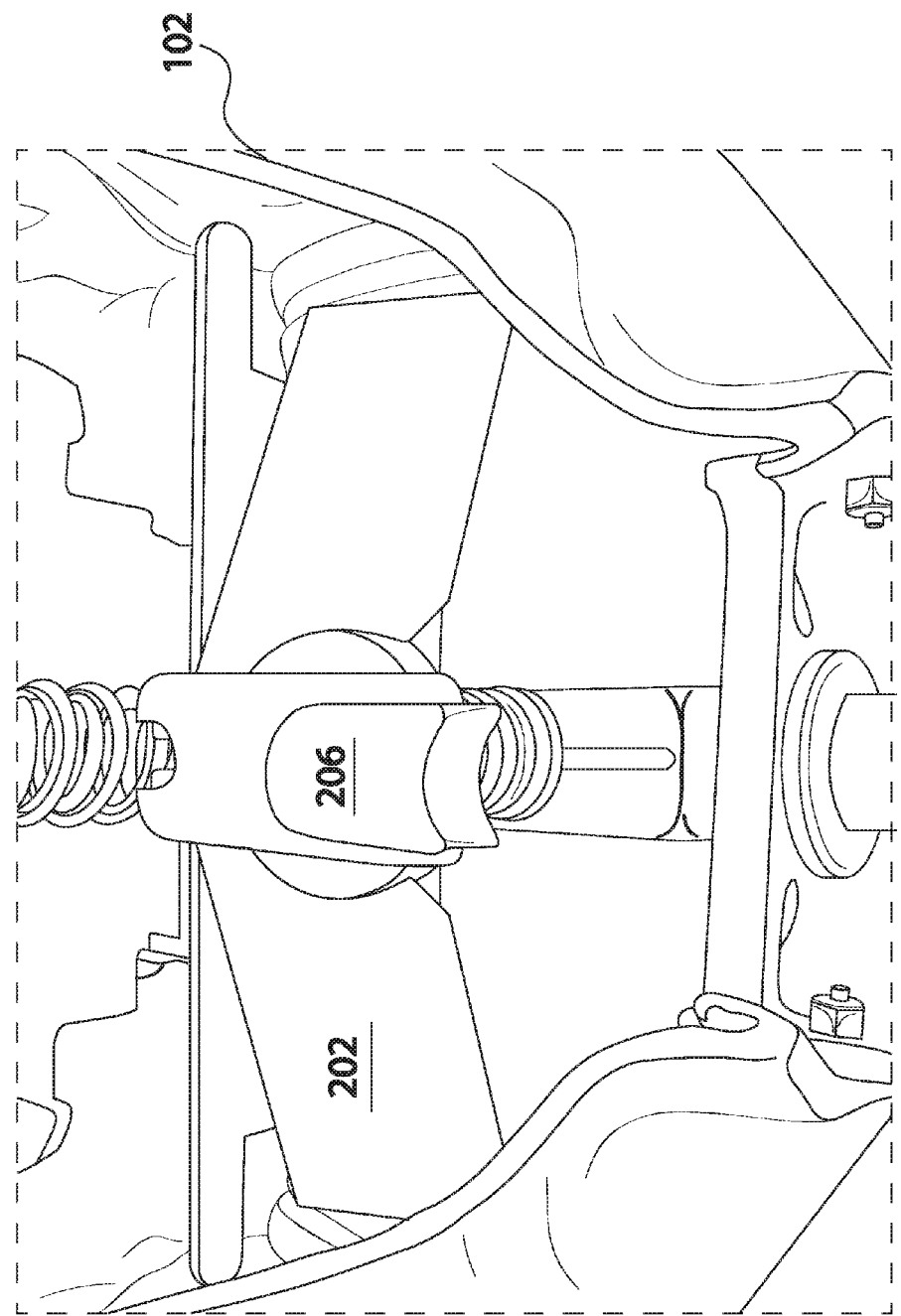
FIG. 26 is a perspective view of the chest cavity of FIG. 25, but illustrating an intraosseus simulation component mounted on a support structure along with the pneumothorax simulation system.
Figure 27:
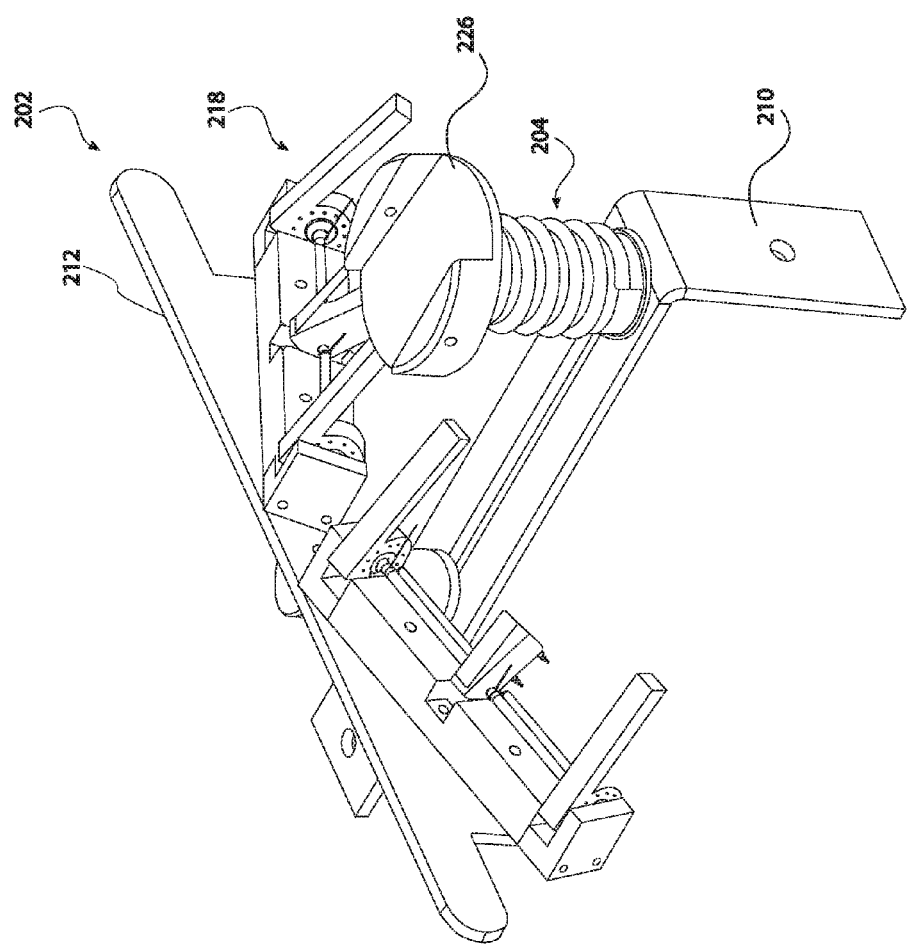
FIG. 27 is a perspective view of the support structures and portions of the pneumothorax simulation system of FIGS. 25 and 26.
Figure 28:
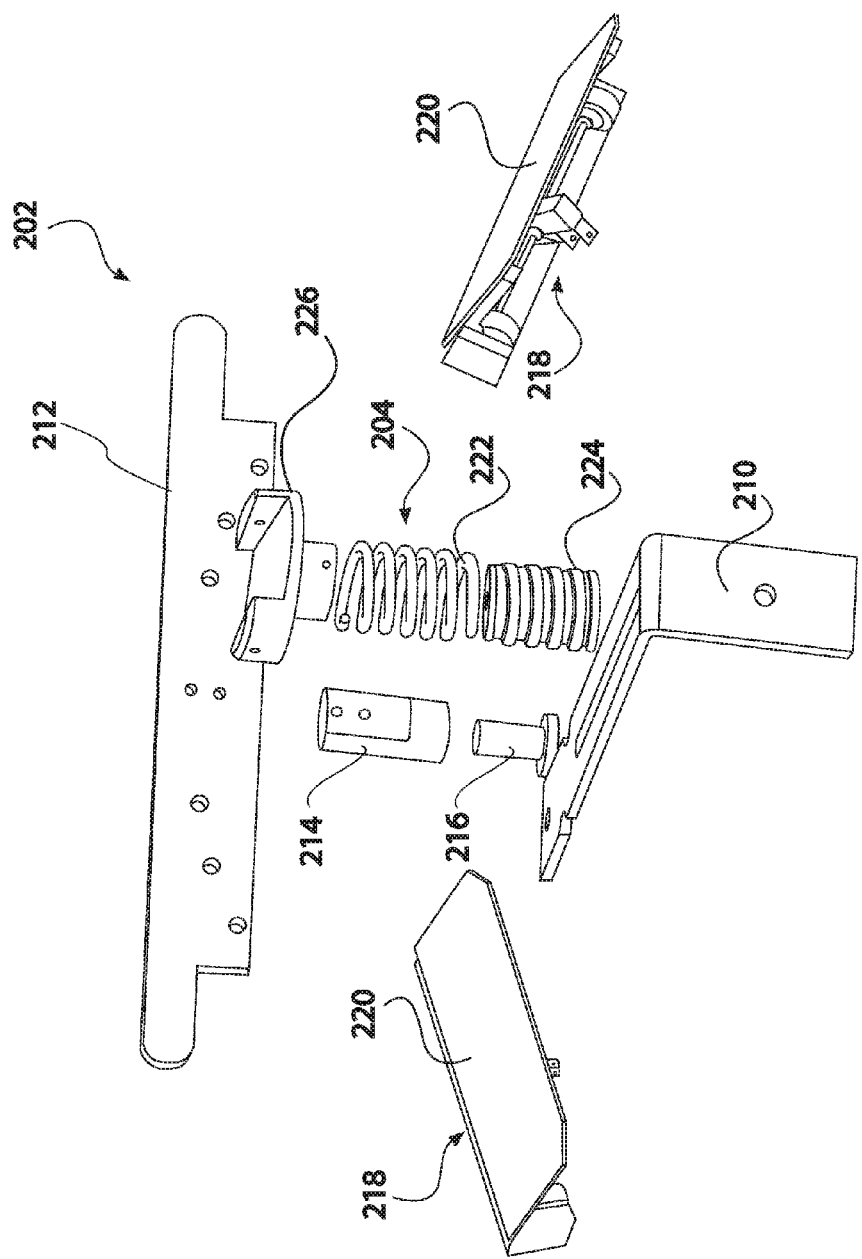
FIG. 28 is a perspective, exploded view of the support structures and portions of the pneumothorax simulation system of FIG. 27.
Figure 29:
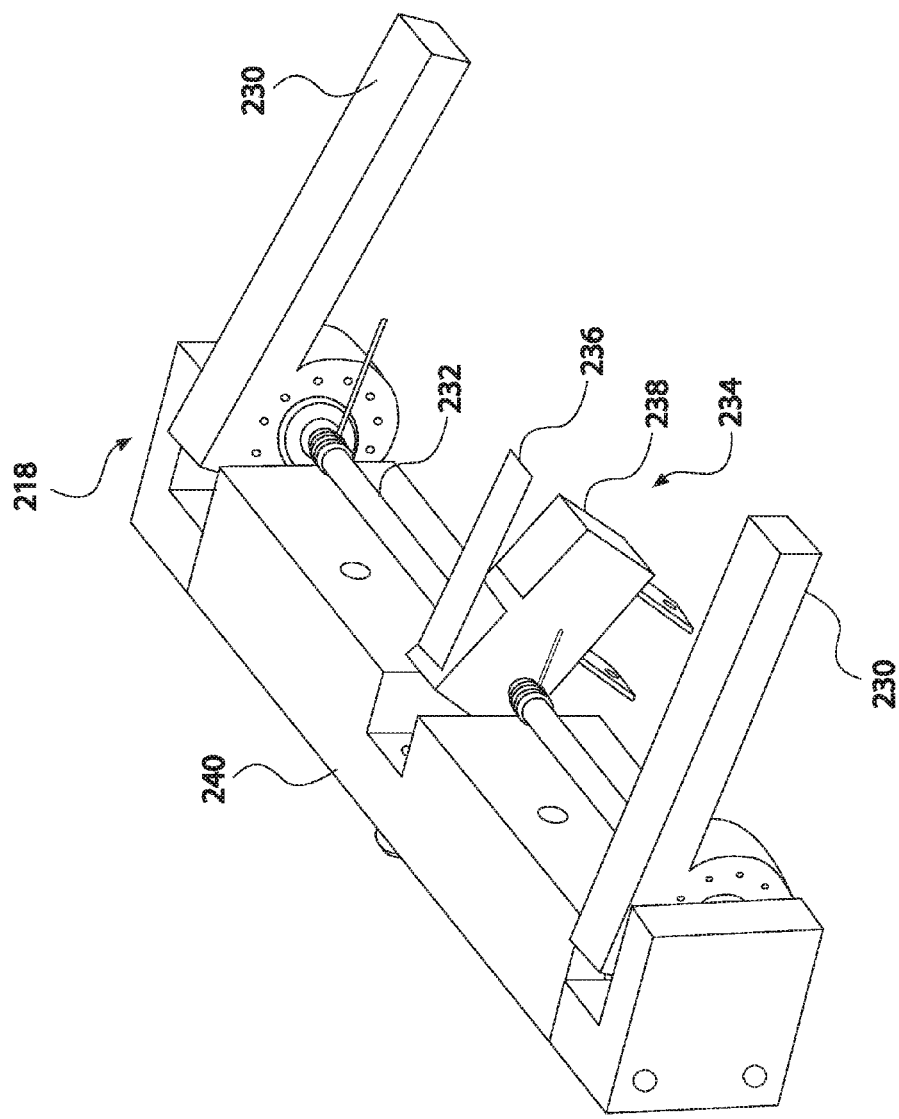
FIG. 29 is a perspective view of a portion of the pneumothorax simulation system according to an embodiment of the present disclosure.
Figure 30:
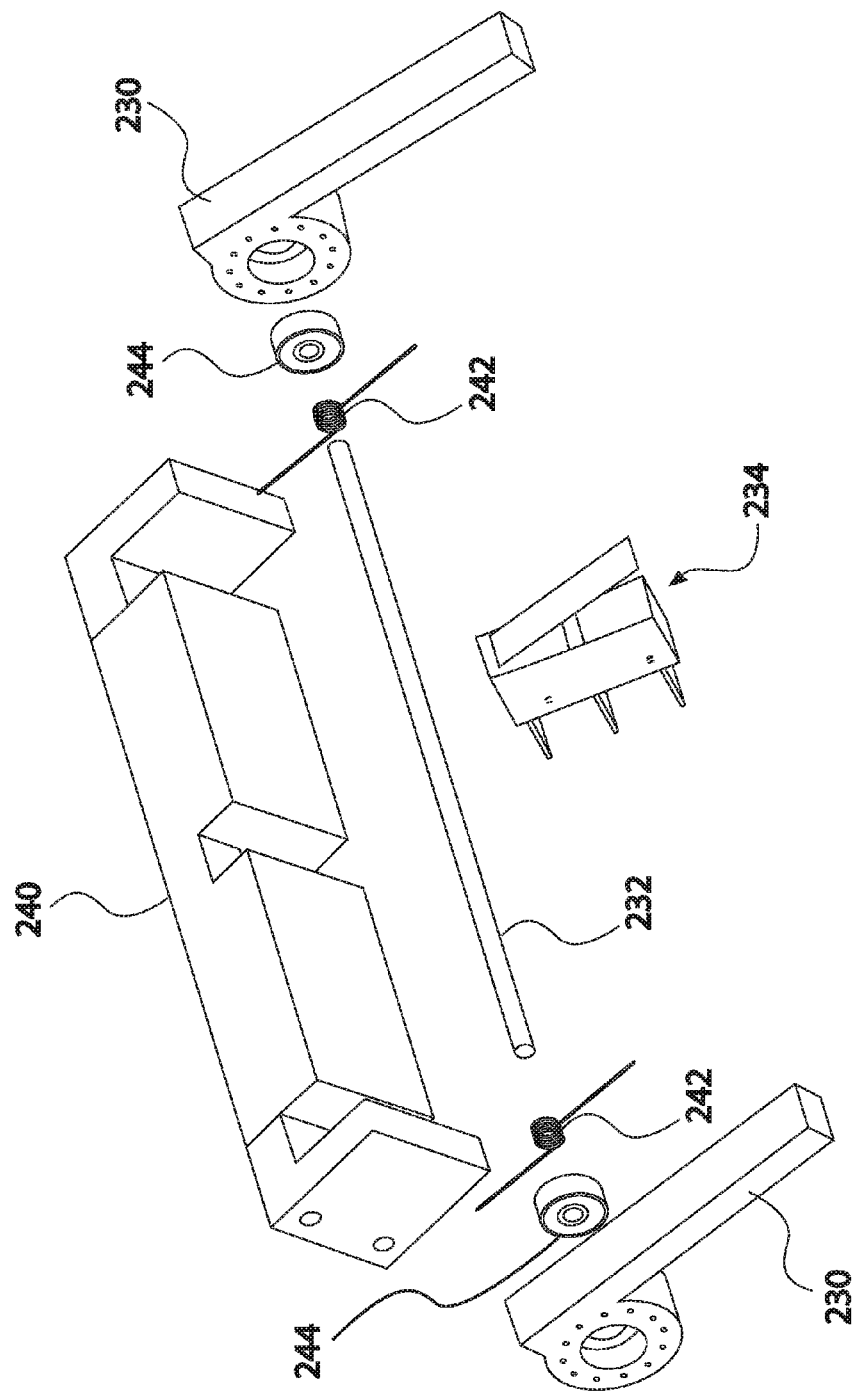
FIG. 30 is a perspective, exploded view of the portion of the pneumothorax simulation system of FIG. 29.
Figure 33:
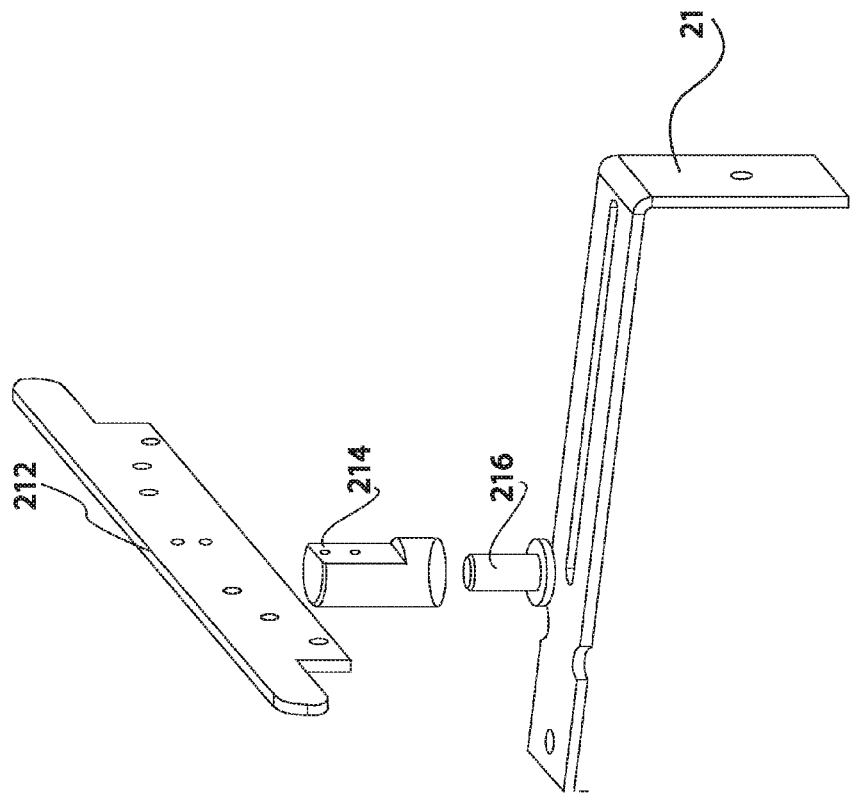
FIG. 33 is a perspective, exploded view of the mounting support structure of FIG. 32.
Figure 32:
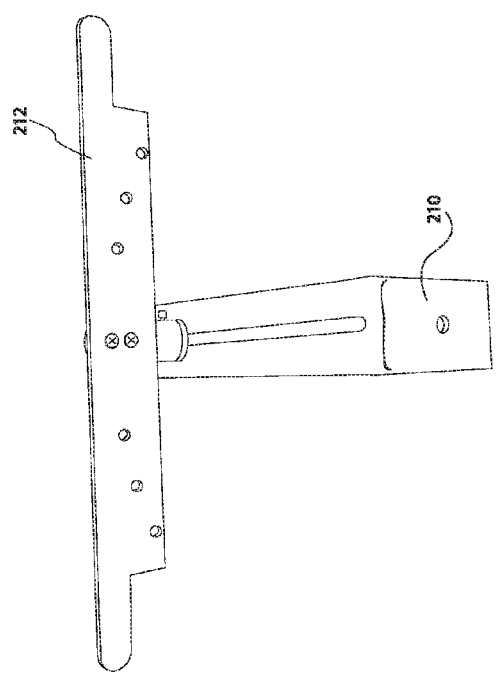
FIG. 32 is a perspective view of a mounting support structure according to an embodiment of the present disclosure.
Figure 35:
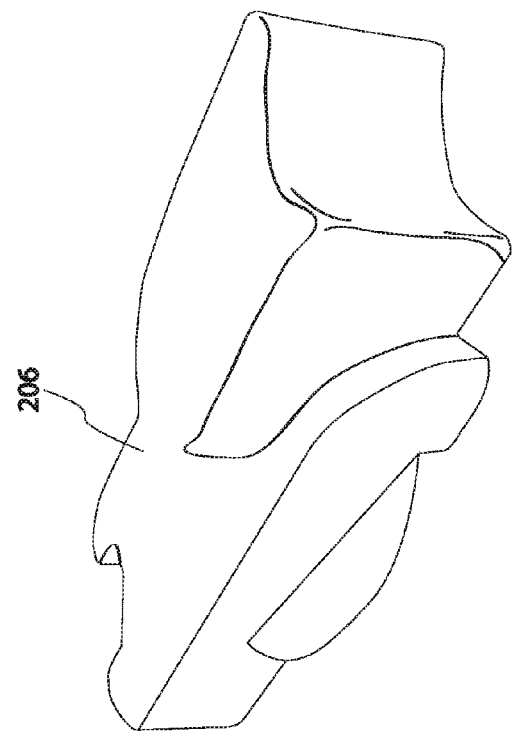
FIG. 35 is a perspective view of an intraosseus device according to an embodiment of the present disclosure.
Figure 34:
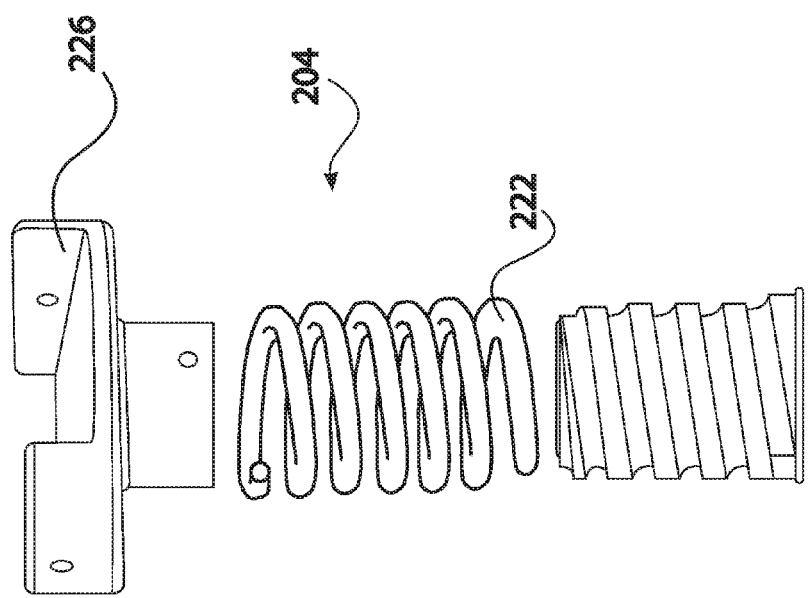
FIG. 34 is a perspective view of a mounting support structure for an intraosseus device according to an embodiment of the present disclosure.
Figure 36:
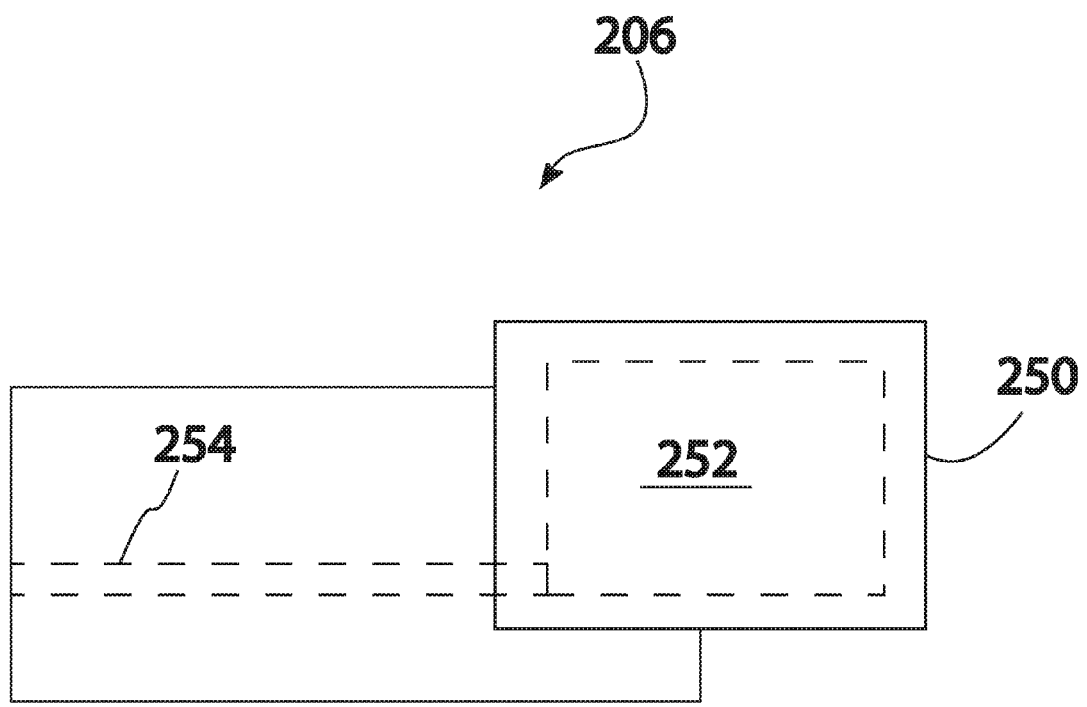
FIG. 36 is a cross-sectional side view of an intraosseus device according to an embodiment of the present disclosure.

Referring now to FIGS. 25-36, shown therein are various aspects of a chest cavity of a patient simulator according to embodiments of the present disclosure. In that regard, FIG. 25 is a top view of a chest cavity of the patient simulator illustrating support structures and a pneumothorax simulation system according to an embodiment of the present disclosure; FIG. 26 is a perspective view of the chest cavity of FIG. 25 illustrating an intraosseus simulation component mounted on a support structure; FIG. 27 is a perspective view of the support structures and portions of the pneumothorax simulation system; FIG. 28 is a perspective, exploded view of the support structures and portions of the pneumothorax simulation system; FIG. 29 is a perspective view of a portion of the pneumothorax simulation system according to an embodiment of the present disclosure; FIG. 30 is a perspective, exploded view of the portion of the pneumothorax simulation system of FIG. 29; FIG. 31 is a bottom view of a portion of a pneumothorax simulation system according to an embodiment of the present disclosure; FIG. 32 is a perspective view of a mounting support structure according to an embodiment of the present disclosure; FIG. 33 is a perspective, exploded view of the mounting support structure; FIG. 34 is a perspective view of a mounting support structure for an intraosseus device according to an embodiment of the present disclosure; FIG. 35 is a perspective view of an intraosseus device according to an embodiment of the present disclosure; and FIG. 36 is a cross-sectional side view of an intraosseus device according to an embodiment of the present disclosure.

As shown in FIG. 25, the chest cavity includes a spring system 200 to facilitate the performance of chest compression on the patient simulator. In some implementations, the spring system 200 is an energy and/or air harvesting system as disclosed in U.S. Provisional Patent Application No. 61/757,137, filed on Jan. 26, 2013, titled "MEDICAL SIMULATORS WITH ENERGY HARVESTING POWER SUPPLIES," published as U.S. Patent Application Publication No. 2014/0212862 which is hereby incorporated by reference in its entirety. The chest cavity also includes a pneumothorax simulation system 202. The chest cavity of the patient simulator also includes a mounting structure 204 for a device 206 (see FIG. 26, for example) that is positioned where the sternum would be located.

Further, the patient simulator breathes in accordance with a respiratory pattern. In that regard, the patient simulator has chest rise and fall corresponding to the respiratory pattern. To simulate some scenarios, one or both of the left and right lungs can be disabled to simulate pneumothorax. To that end, the patient simulator includes the pneumothorax simulation system 202 in some instances that allows training of pneumothorax procedures. In particular, in some instances the patient simulator facilitates training of needle chest decompressions using a 3¼ inch long and 14 gauge needle, or other suitable needles, at the 2nd intercostal space bilaterally. In that regard, proper insertion of the needle is detectable by the pneumothorax system such that the respiratory pattern of the patient simulator can be adjusted accordingly. In this regard, FIGS. 27-33 illustrate aspects of the pneumothorax system and associated mounting components. As shown, mounting brackets 210 and 212 are coupled together by components 214 and 216. Each side of the patient simulator includes switch mechanisms 218 to which plates 220 are mounted. As described below, depression of the plate 220 in response to a proper needle puncture actuates the associated switch mechanism 218 such that the controller or processing system is alerted and the corresponding respiratory pattern of the patient simulator can be adjusted. As shown, the mounting structure 204 for device 206 is also coupled to the mounting bracket 210. The mounting structure 204 includes a spring 222, a threaded tubular member 224, and a mount 226. The mount 226 is sized and shaped to mate with the device 206 such that the device 206 is fixedly secured to the mounting structure 204 via mount 226.

FIGS. 29-31 illustrate additional aspects of the switch mechanism 218. As shown, the switch mechanism 218 includes support arms 230 to which the plate 220 are secured. The supports arms 230 (and plate 220) pivot about rod 232 such that when the plate 220 is depressed a switch 234 is activated. More specifically, as the plate 220 is depressed a movable contact piece 236 of the switch 234 comes into contact with a base portion 238 of the switch 234, thereby activating (or deactivating) the switch. The rotational orientation of the switch relative to the plate 220 is adjustable in some instances such that the amount of travel of the plate necessary to activate/deactivate the switch 234 is selectable. The support members 230, rod 232, and switch 234 are mounted to a support structure 240. Springs 242 and washers 244 are utilized in some embodiments to couple the components together. Springs 242 are utilized in some instances to bias the plate 220 back to the original starting position (non-depressed position). The skin of the patient positioned over the pneumothorax locations is durable with respect to needle punctures such that these procedures can be performed multiple times without needing to change the skin of the patient simulator. Sensors detect the needle insertion and communicate the action to the controller or control system that controls the respiratory pattern of the patient simulator. Accordingly, the controller or control system adjusts the respiratory pattern based on the treatment administered to the patient simulator in some instances.

The device 206, shown in FIGS. 26, 35, and 36, is configured to accept fluids and can be used multiple times without needing to replace the device such that the device 206 can be utilized for the infusion of medication. In that regard, referring to FIG. 36, in some instances the device 206 has a housing 250 with a reservoir 252 that is configured to accept fluids. Further, the reservoir 252 is in communication with tubing 254 that allows drainage of the received fluids from the reservoir 252 of the device 206. In some instances, the device 206 is configured to be used with the FAST-1 intraosseous device. In some instances, the device 206 is positioned on a mounting structure, such as mounting structure 204 that includes a spring 222, threaded tubular member 224, and mount 226. The mount 226 is sized and shaped to mate with the device 206 such that the device 206 is fixedly secured to the mounting structure 204 via mount 226.

Figure 38:
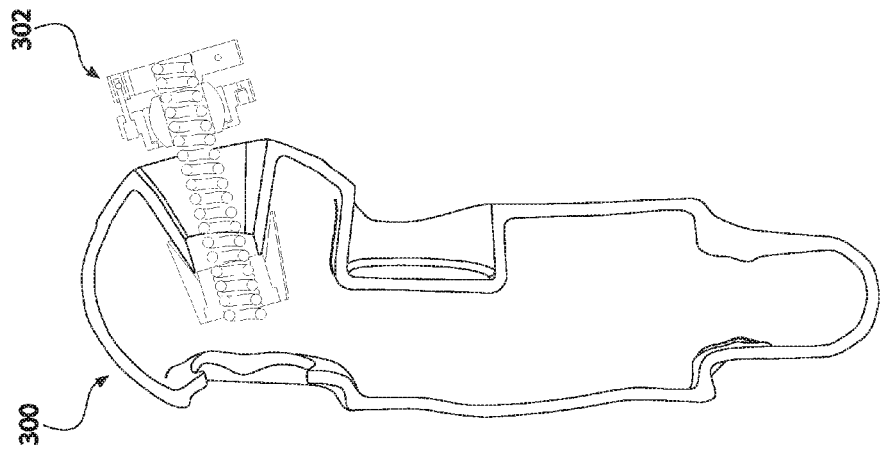
FIG. 38 is a front cross-sectional view of the upper arm assembly of FIG. 37.
Figure 37:
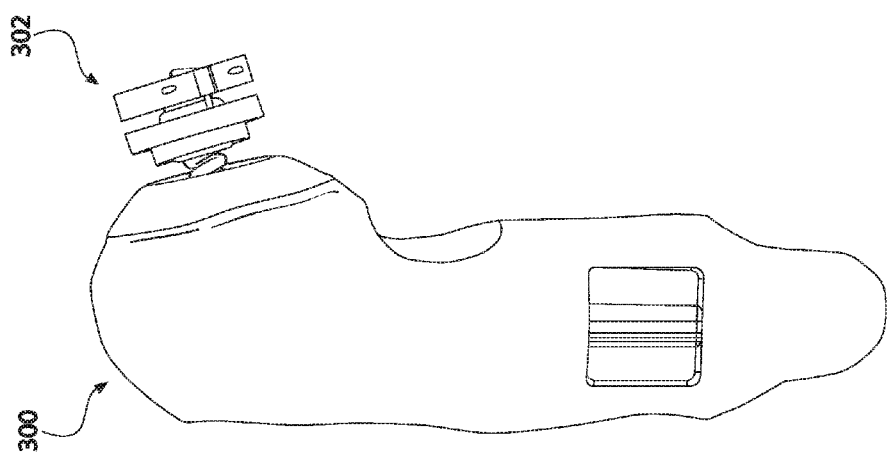
FIG. 37 is a front view of an upper arm assembly according to an embodiment of the present disclosure.
Figure 39:
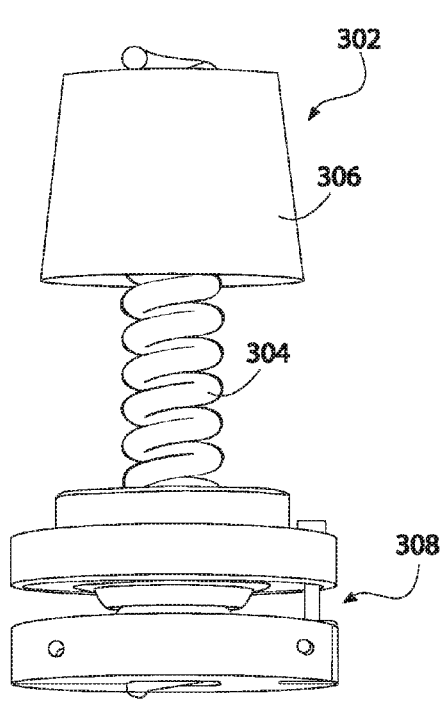
FIG. 39 is a side view of a shoulder joint assembly of the upper arm assembly of FIGS. 37 and 38 according to an embodiment of the present disclosure.
Figure 40:
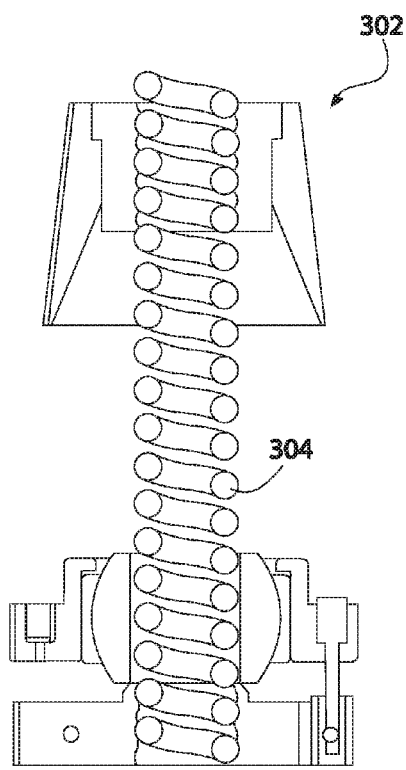
FIG. 40 is a side cross-sectional view of the shoulder joint assembly of FIG. 39.

Referring now to FIGS. 37-42, shown therein are aspects of an upper arm assembly 300 according to an embodiment of the present disclosure. In that regard, FIG. 37 is a front view of an upper arm assembly 300 according to an embodiment of the present disclosure; FIG. 38 is a front cross-sectional view of the upper arm assembly 300; FIG. 39 is a side view of a shoulder joint assembly 302 of the upper arm assembly 300 according to an embodiment of the present disclosure; FIG. 40 is a side cross-sectional view of the shoulder joint assembly 302; FIG. 41 is a perspective, exploded view of the shoulder joint assembly 302; and FIG. 42 is an end view of a component of the shoulder joint assembly according to an embodiment of the present disclosure.

As shown, in some instances the shoulder connections of the arms are configured to provide natural motion/flexibility, yet provide strength and durability sufficient to allow the simulator to be dragged by the arms. In some embodiments, the shoulder connections include openings extending therethrough to allow passage of communication cables and/or tubing for introduction of fluids (e.g., simulated blood). Further, still, in some instances the shoulder connections allows arm range of motion to a natural range (e.g., approximately 270 degrees), but prevents full rotation of the arm to prevent unwanted kinking and/or damage to the communication cables and/or tubing going through the shoulder connection and into the arm.

To this end, in some implementations the arm assembly 300 includes a shoulder joint 302 that includes a spring 304 and mounting structures 306 and 308 for securing the shoulder joint 302 to the arm assembly 300 and torso 102 of the patient simulator 100, respectively. As shown, mounting structure 306 includes a component 306 having tapered outer surfaces and an internal passage that receives a portion of the spring 304. The spring 304 threadingly engages an end piece 310 that mechanically secures the spring 304 to the component 306. The mounting structure 308 includes components 312, 314, and 316 along with a pin system 318. In that regard, the pin system 318 extends through an opening 320 in component 314 such that the rotation of the pin system 318 along the length of the opening 320 allows rotation of the shoulder joint in a manner that simulates the natural rotation of a human shoulder, including limiting total range of motion to approximate 270 degrees. Component 312 provides pivoting motion to the shoulder joint 302. The spring 304 engages a threaded opening within component 316 as shown in FIG. 40.

Figure 44:
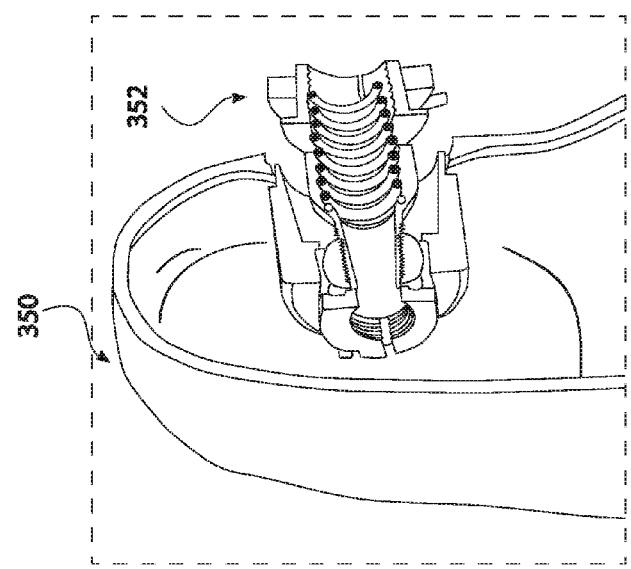
FIG. 44 is a perspective cross-sectional view of the upper leg assembly of FIG. 43.
Figure 43:
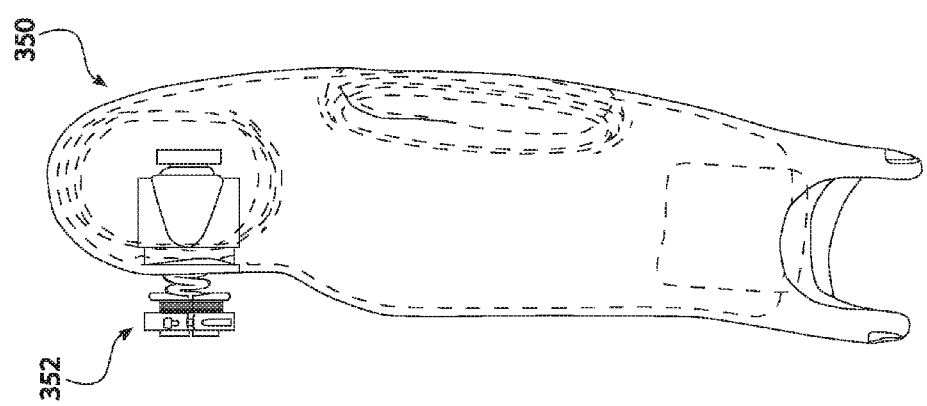
FIG. 43 is a front view of an upper leg assembly according to an embodiment of the present disclosure.
Figure 45:
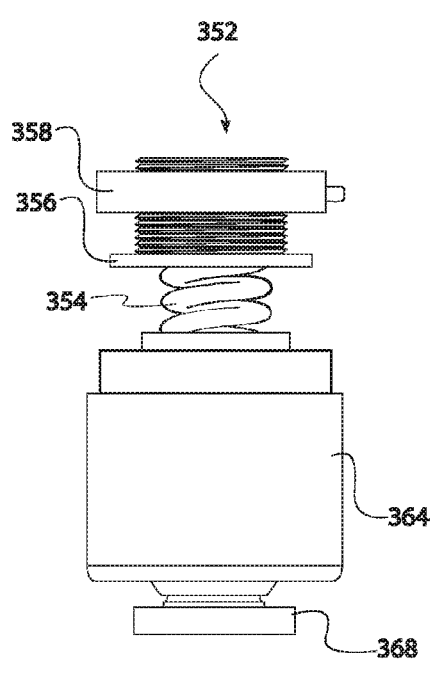
FIG. 45 is a side view of a hip joint assembly of the upper leg assembly of FIGS. 43 and 44 according to an embodiment of the present disclosure.
Figure 46:
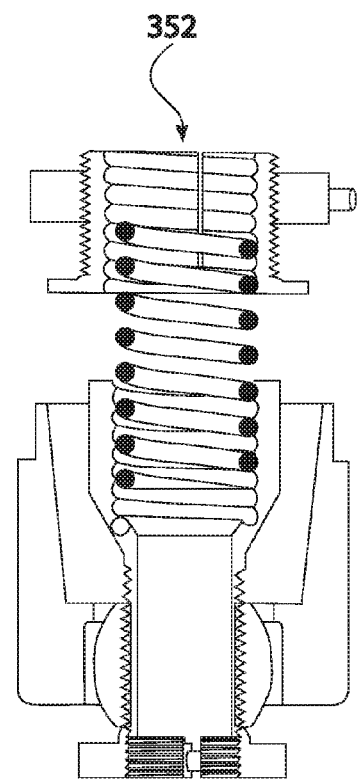
FIG. 46 is a side cross-sectional view of the hip joint assembly of FIG. 45.
Figure 47:
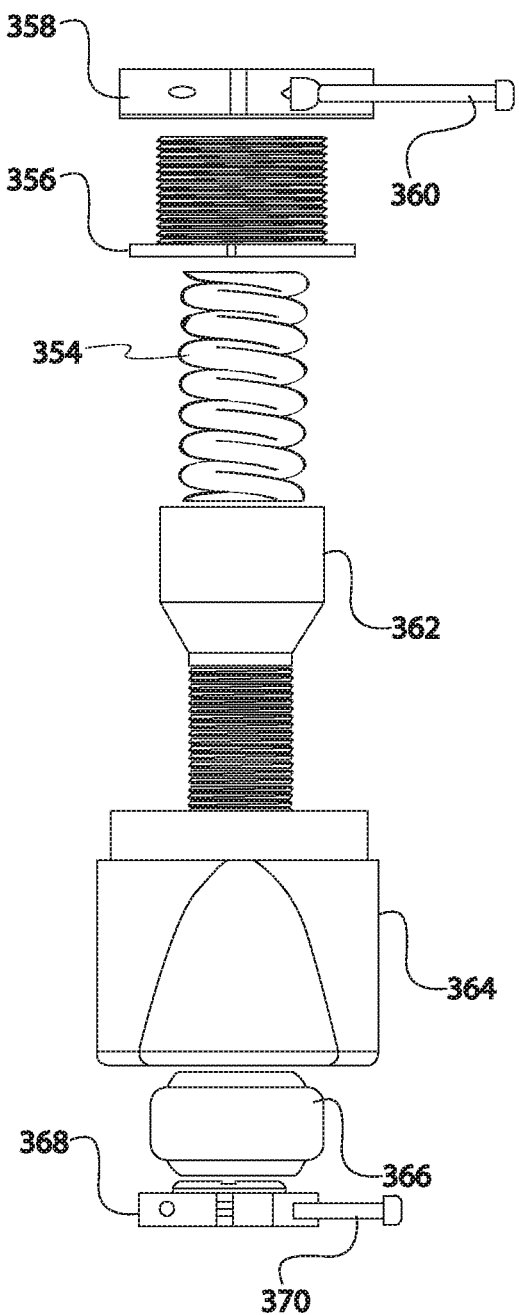
FIG. 47 is a perspective, exploded view of the hip joint assembly of FIGS. 45 and 46.
Figure 48:
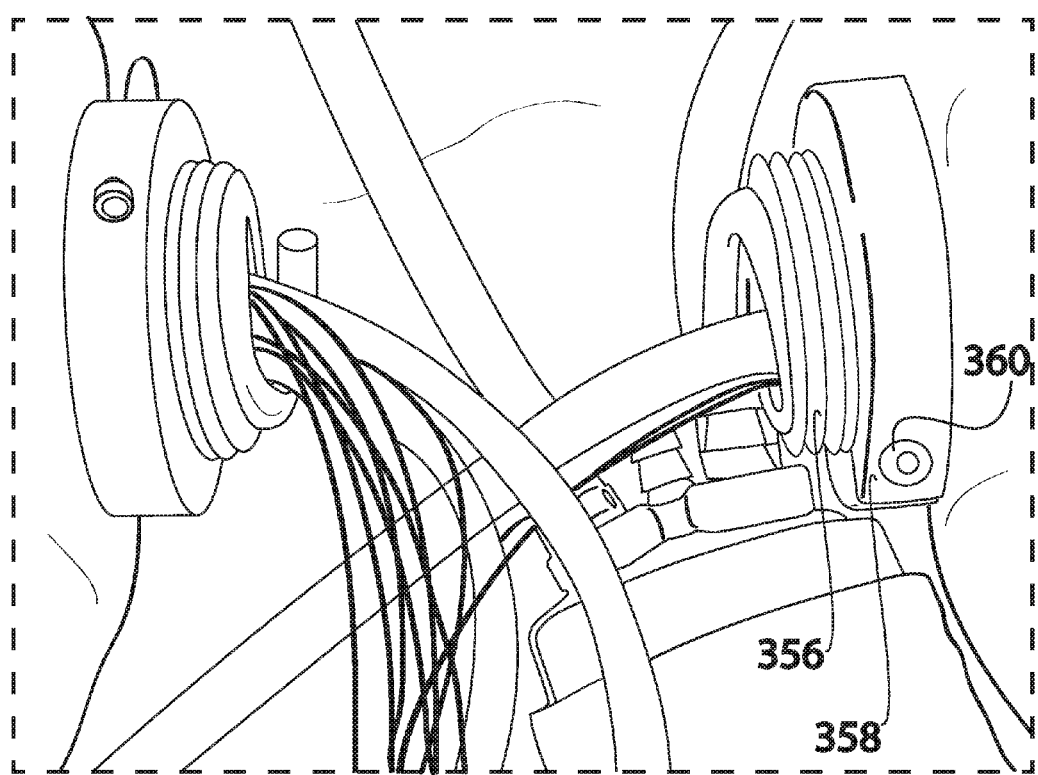
FIG. 48 is a top view of a portion of the patient simulator of FIG. 1 illustrating portions of the hip joint assembly of FIGS. 45-47 assembled with a torso of the patient simulator.

Referring now to FIGS. 43-48, shown therein are aspects of an upper leg assembly 350 according to an embodiment of the present disclosure. In that regard, FIG. 43 is a front view of an upper leg assembly 350 according to an embodiment of the present disclosure; FIG. 44 is a perspective cross-sectional view of the upper leg assembly 350; FIG. 45 is a side view of a hip joint assembly 352 of the upper leg assembly according to an embodiment of the present disclosure; FIG. 46 is a side cross-sectional view of the hip joint assembly 352; FIG. 47 is a perspective, exploded view of the hip joint assembly 352; and FIG. 48 is a top view of a portion of the patient simulator illustrating portions of the hip joint assembly 352 assembled with a torso 102 of the patient simulator 100.

As shown, in some instances the hip connections of the legs 103 and 104 of the patient simulator 100 are configured to provide natural motion/flexibility, yet provide strength and durability sufficient to allow the simulator to be dragged by the legs. In some embodiments, the hip connections include openings extending therethrough to allow passage of communication cables and/or tubing for introduction of fluids (e.g., simulated blood). Further, still, in some instances the connections limit range of motion to a natural range, but prevents full rotation of the legs to prevent unwanted kinking and/or damage to the communication cables and/or tubing going through the shoulder connection and into the arm. As shown in FIGS. 45-47, the hip joint assembly 352 includes a spring 354 that is threadingly engaged with an inner portion of a component 356. A locking ring 358 having locking pin 360 clamps onto an outer portion of the component 356. Collectively, the component 356 and locking ring 358 are utilized to secure the spring 354 to the torso 102 of the patient simulator. The hip joint assembly 352 also includes a threaded member 362 that extends through components 364 and 366 and engages a locking ring 368 having locking pin 360. The locking ring 368 clamps onto an outer portion of the member 362. The spring 354 threadingly engages an inner portion of the member 362. Component 366 provides pivoting motion to the hip joint 302 in some instances.

Figure 49:
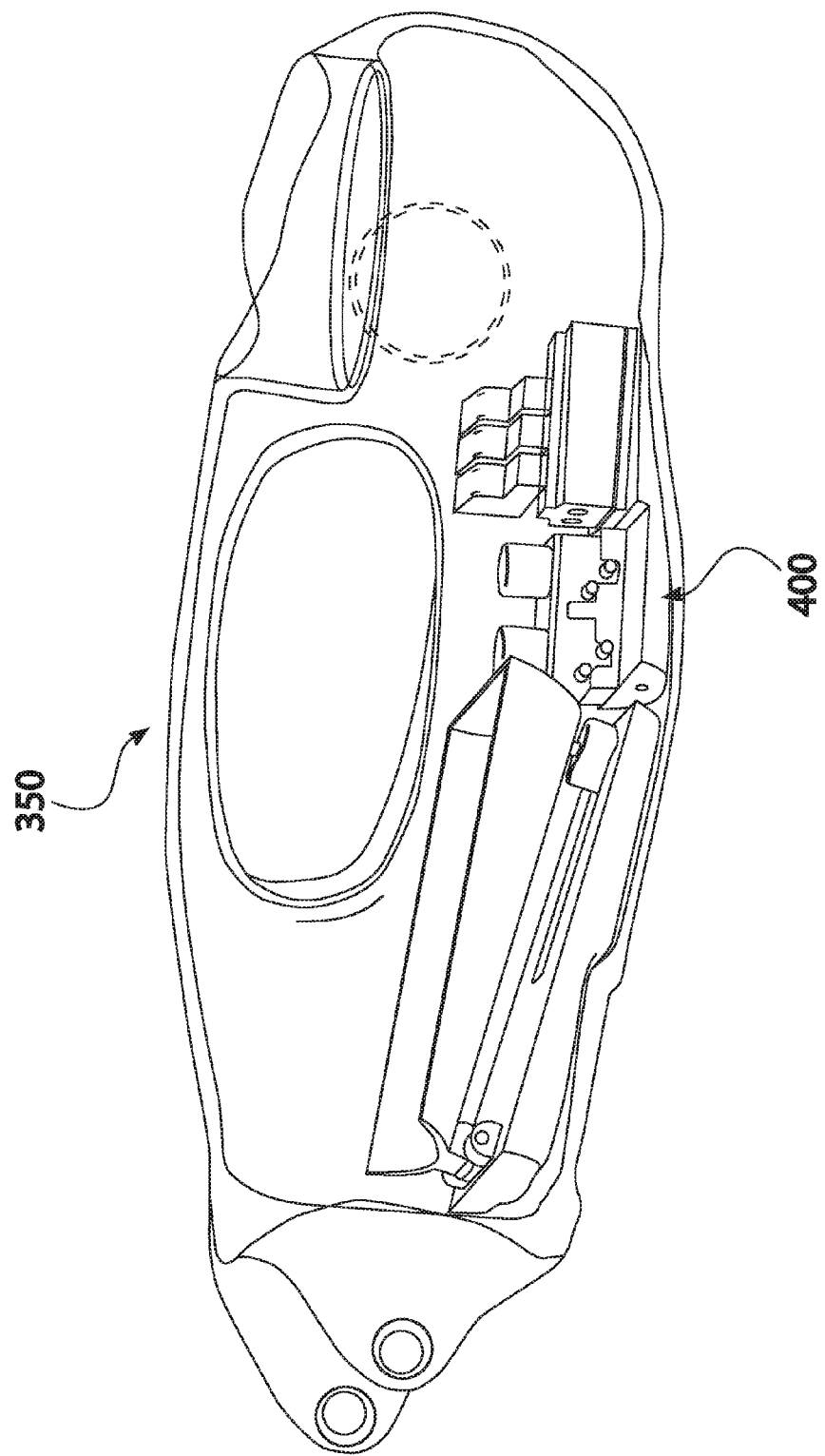
FIG. 49 is a perspective side view of the upper leg assembly of FIG. 43, but illustrating inner components received within the upper leg assembly according to an embodiment of the present disclosure.
Figure 50:
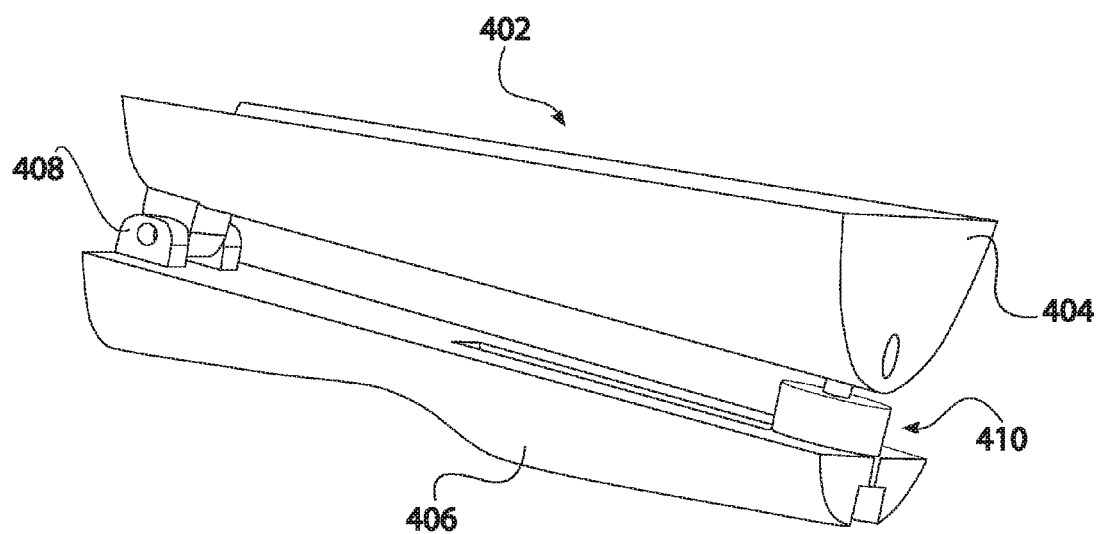
FIG. 50 is a perspective view of a reservoir holder of the upper leg assembly of FIG. 43 according to an embodiment of the present disclosure.
Figure 51:
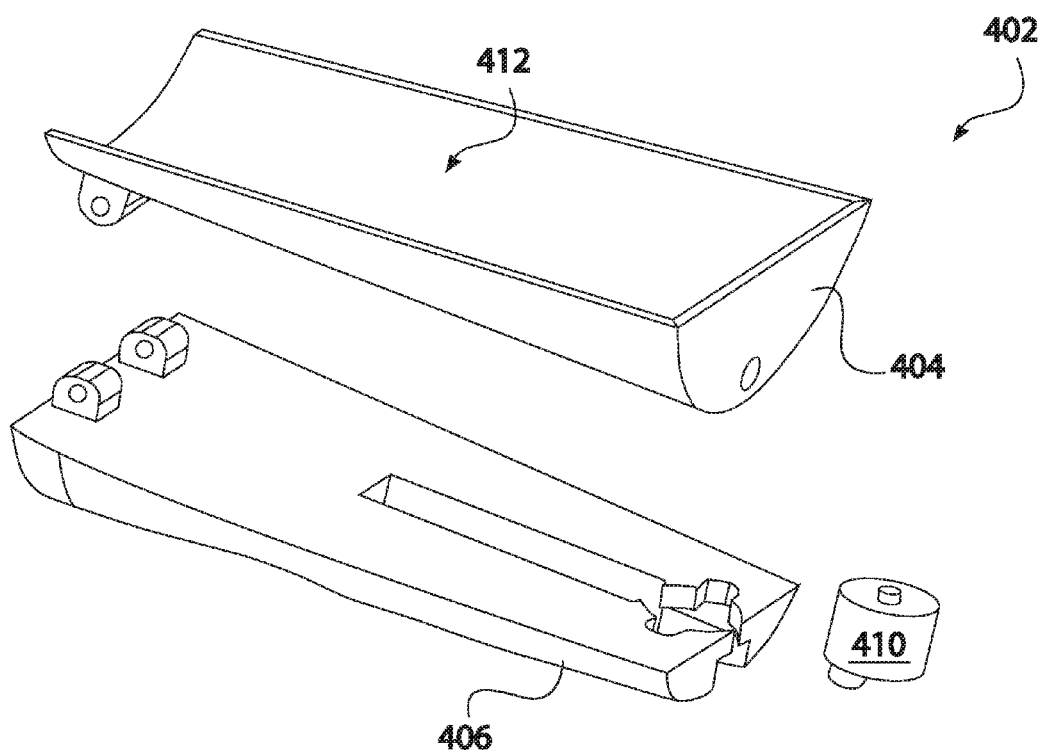
FIG. 51 is a perspective, exploded view of the reservoir holder of FIG. 50.
Figure 52:
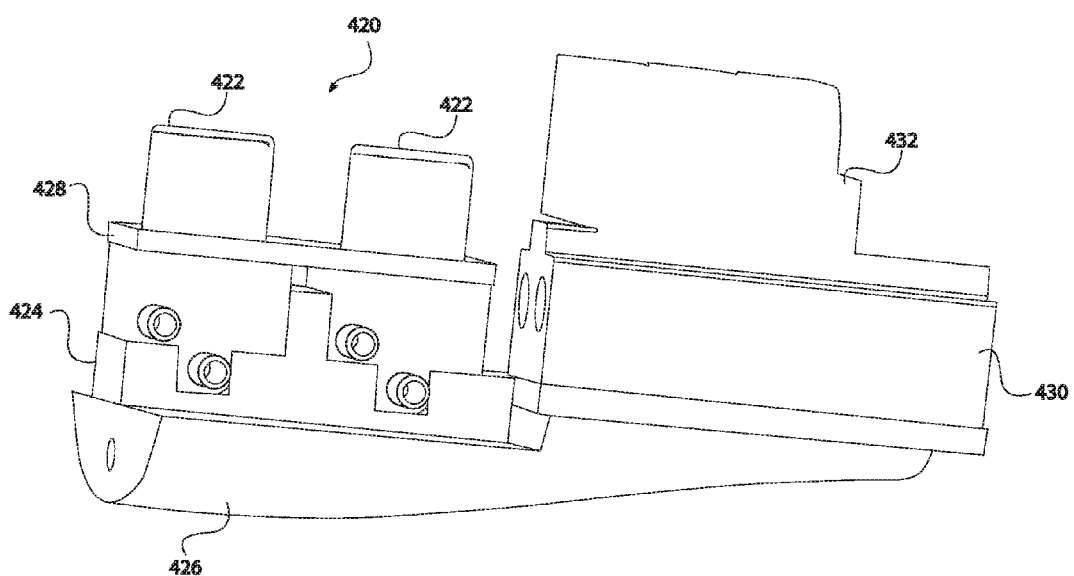
FIG. 52 is a perspective view of a pump and valve system of the upper leg assembly of FIG. 43 according to an embodiment of the present disclosure.
Figure 53:
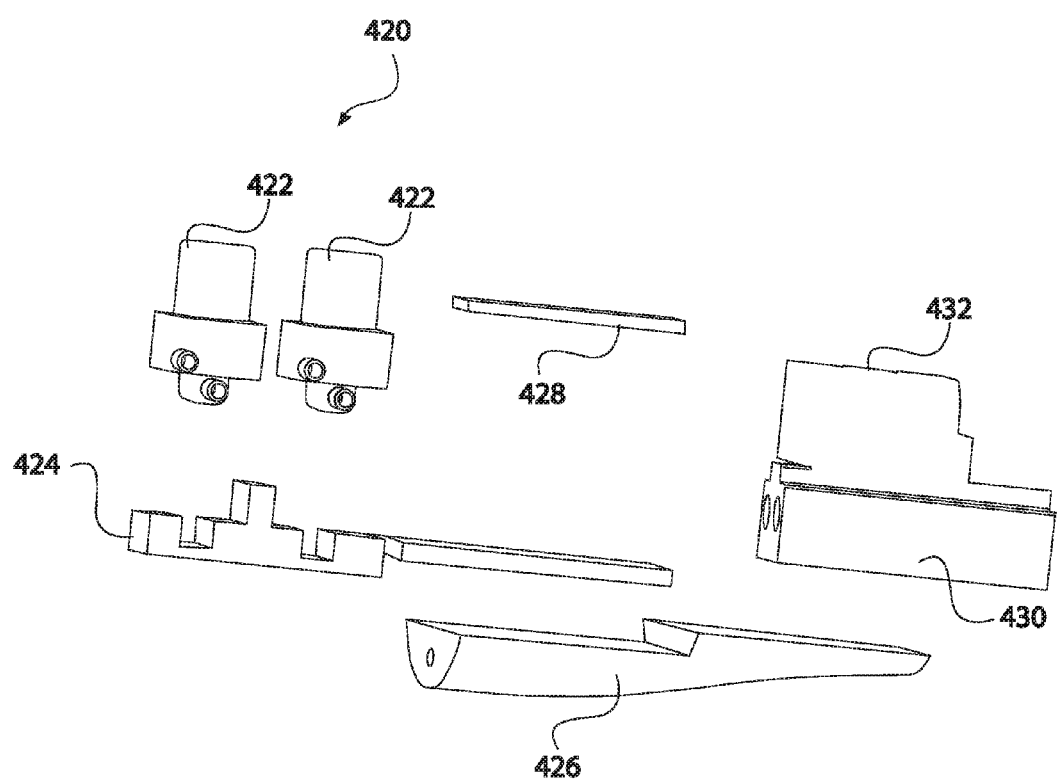
FIG. 53 is a perspective, exploded view of the pump and valve system of FIG. 52.
Figure 54:
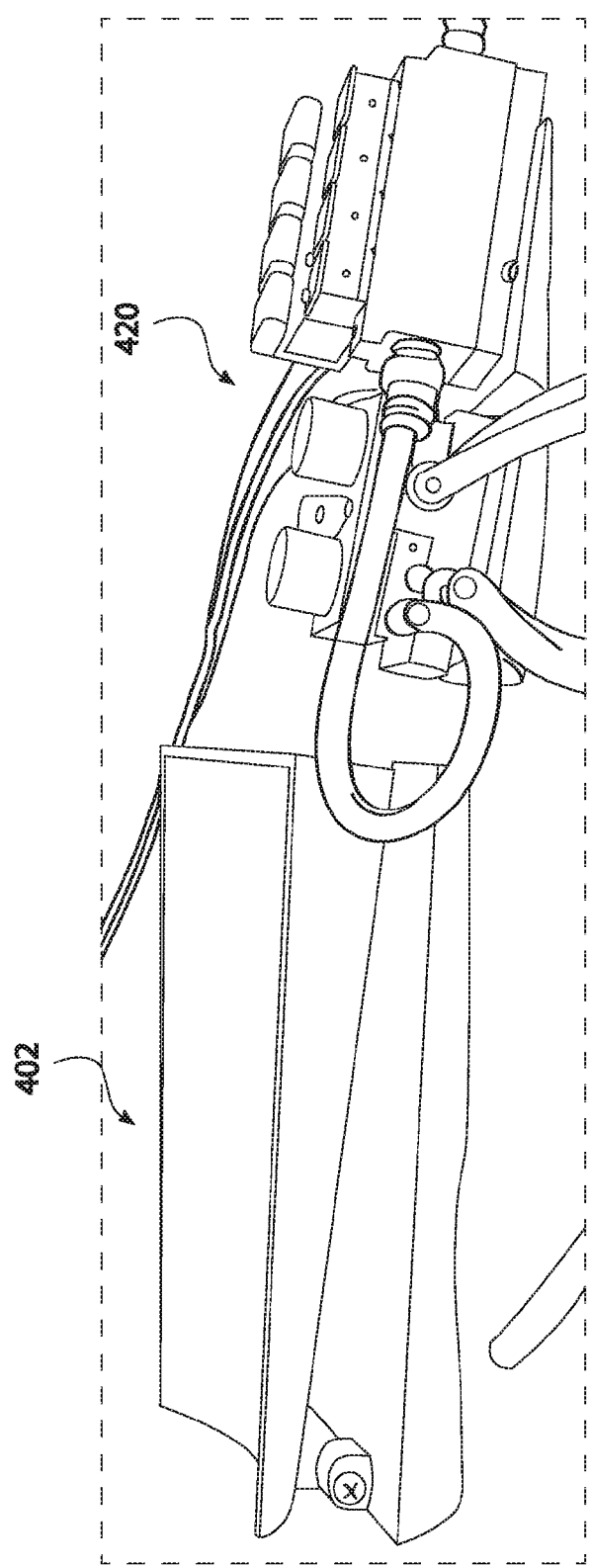
FIG. 54 is a perspective view of the reservoir holder and the pump and valve system of the upper leg assembly, connected to corresponding tubing and electrical connections outside of the upper leg assembly.
Figure 55:
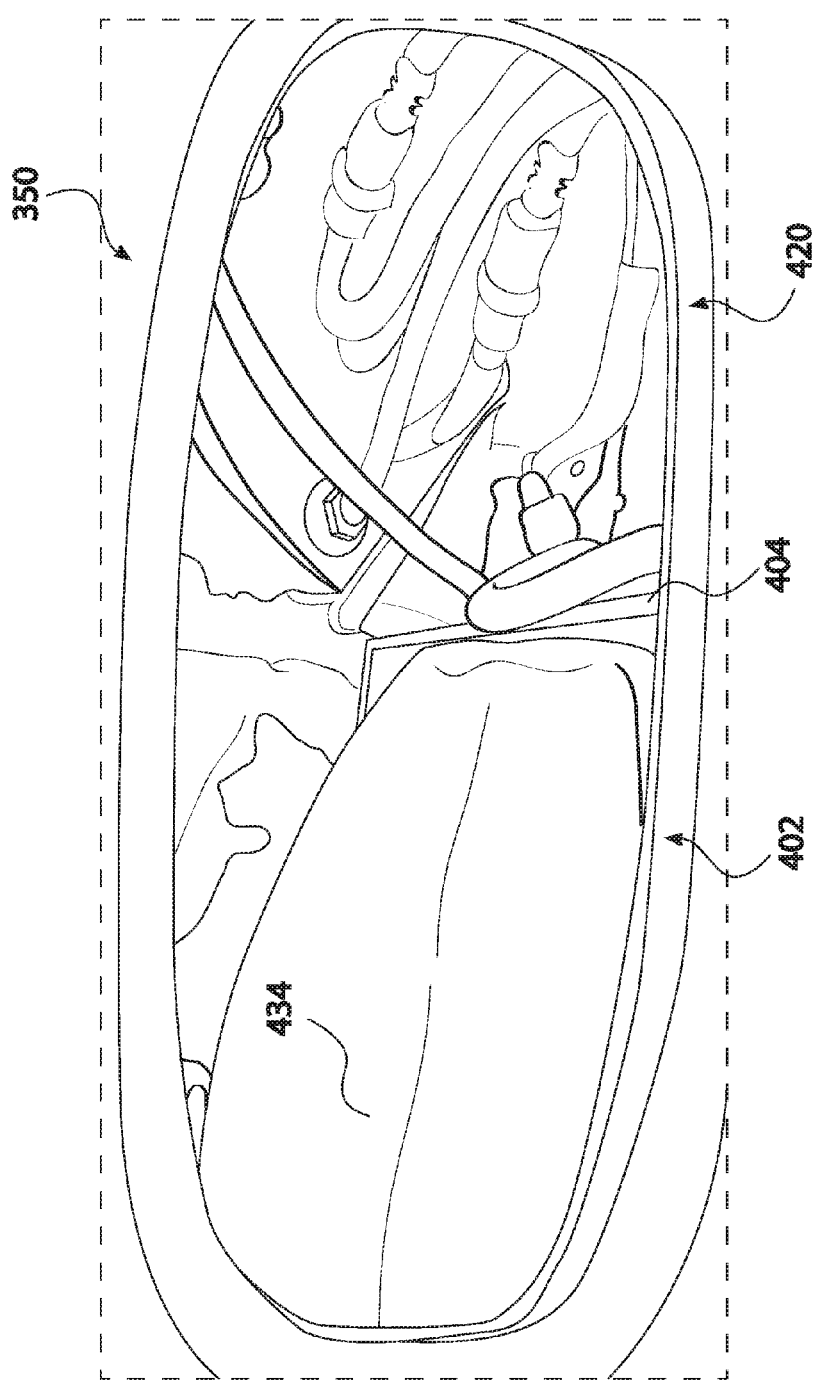
FIG. 55 is a perspective view of the upper leg assembly of FIG. 43 with the reservoir holder and the pump and valve system positioned therein

Referring now to FIGS. 49-55, shown therein are aspects of inner components of the upper leg assembly 350 according to an embodiment of the present disclosure. In that regard, FIG. 49 is a perspective side view of the upper leg assembly 350 illustrating components received within the upper leg assembly according to an embodiment of the present disclosure; FIG. 50 is a perspective view of a reservoir holder of the upper leg assembly according to an embodiment of the present disclosure; FIG. 51 is a perspective, exploded view of the reservoir holder; FIG. 52 is a perspective view of a pump and valve system of the upper leg assembly according to an embodiment of the present disclosure; FIG. 53 is a perspective, exploded view of the pump and valve system; FIG. 54 is a perspective view of the reservoir holder and the pump and valve system of the upper leg assembly connected to corresponding tubing and electrical connections outside of the upper leg assembly; and FIG. 55 is a perspective view of the upper leg assembly with the reservoir holder and the pump and valve system positioned therein.

A fluid reservoir houses the blood that is utilized to simulate the bleeding of the wounds is contained in one or both of the legs in some instances. In some instances, the reservoir contains 1.5 liters or more of simulated blood that is utilized to cause simulated bleeding of axilla wound, groin wound, amputation arm, and/amputation leg. In that regard, in some instances the patient simulator bleeds at a rate of approximately 0.25 liters per minute. Accordingly, in some instances the reservoir holder includes a sensor to monitor the amount of blood within the reservoir so that a user or instructor can be aware when the simulator is running low on blood and replenish the reservoir as needed. The valves and pumps are configured to supply blood to the appropriate wound(s) in response to control system and/or actions by the user.

As shown in FIG. 49, the upper leg assembly 350 includes a collection of components 400 configured to facilitate operation of these bleeding features. For example, FIGS. 50 and 51 show a reservoir mounting system 402 according to an embodiment of the present disclosure. The reservoir mounting system 402 includes a tray 404 configured to receive the fluid reservoir (such as rigid or flexible fluid container) that is pivotally mounted to a mounting support 406 by pivot joint 408. A sensor 410 is provided to monitor the amount of the fluid present in the reservoir (e.g., by monitoring changes in weight/pressure imparted on the sensor 410 by the fluid reservoir and the tray 404). FIGS. 52 and 53 show a pump and valve system 420 configured to interface with the fluid reservoir held by the reservoir mounting system 402. The pump and valve system 420 includes pumps 422 and associated mounts 424, 426, and 428. The pump and valve system 420 also includes one or more valves 432 and an associated mount 430. The pumps 422, valves, 432, and fluid reservoir(s) are connected via a plurality of tubes or other fluid passageways as necessary to facilitate the desired bleeding functionalities of the patient. In that regard, the controller or processing system controls operation of the pumps 422 and/or valves 432 in some instances to simulate desired bleeding scenarios (including the user's responses thereto in some implementations). FIG. 55 shows the reservoir mounting system 402 and the pump and valve system 420 mounted within the upper leg assembly 350 with a reservoir 434 according to an implementation of the present disclosure.

Figure 56:
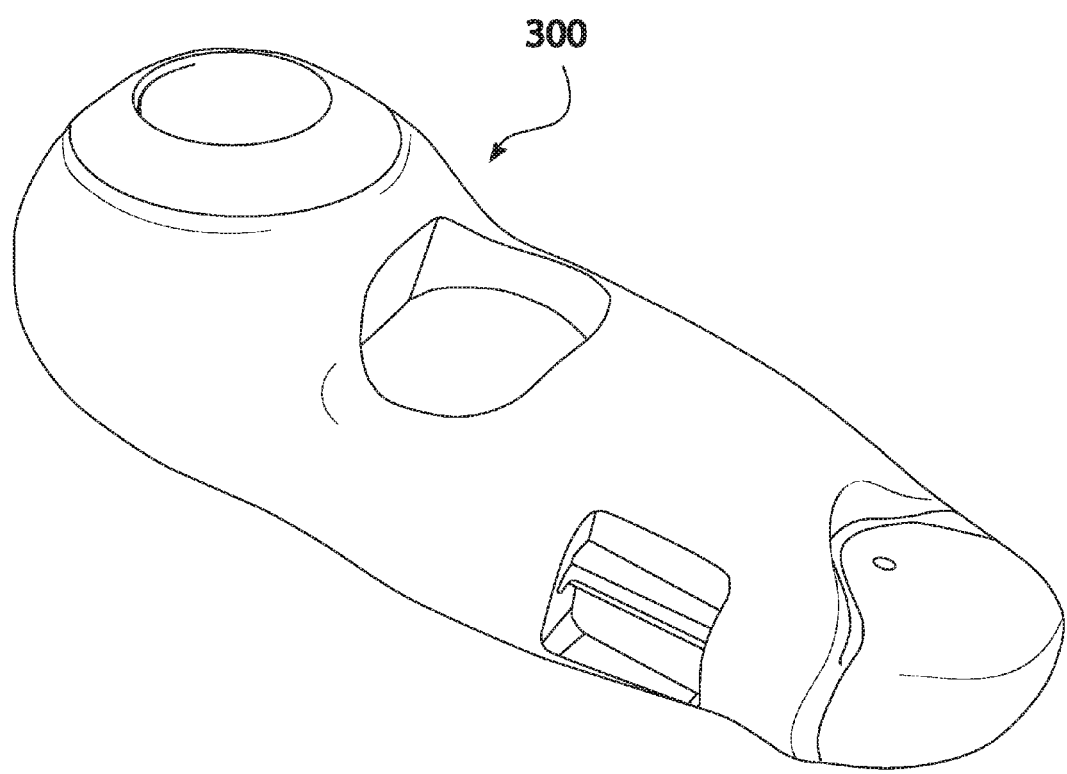
FIG. 56 is a perspective view of an upper arm assembly according to an embodiment of the present disclosure.
Figure 58:
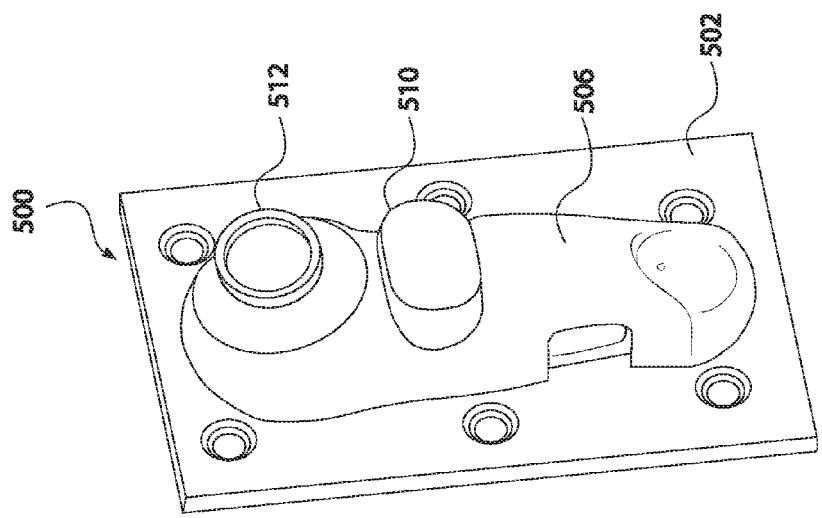
FIG. 58 is a perspective, assembled view of the mold system of FIG. 57.
Figure 57:
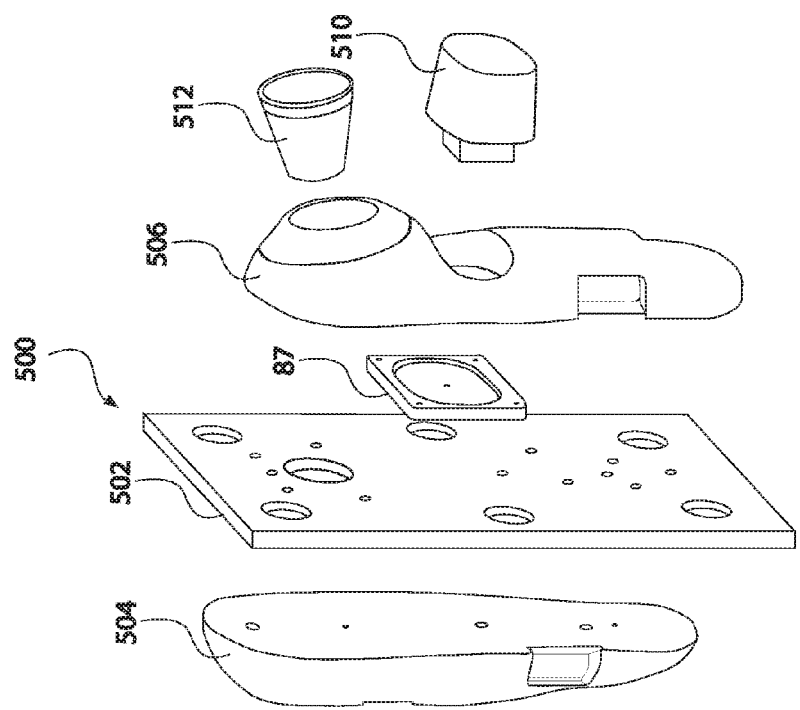
FIG. 57 is a perspective, exploded view of a mold system for forming the upper arm assembly of FIG. 56 according to an embodiment of the present disclosure.

Referring now to FIGS. 56-74, shown therein are aspects of an upper arm assembly 300 and corresponding manufacturing components and techniques according to embodiments of the present disclosure. In that regard, FIG. 56 is a perspective view of an upper arm assembly 300 according to an embodiment of the present disclosure. FIG. 57 is a perspective, exploded view of a mold system 500 for forming the upper arm assembly according to an embodiment of the present disclosure, while FIG. 58 is a perspective, assembled view of the mold system. As shown, the mold system 500 includes a plate 502, portion 504, and portion 506 that are to be assembled together. To that end, a spacer 508 is utilized to separate a section of portion 506 from the plate 502. The mold system 500 also includes plugs 510 and 512 that are positioned within openings in the portion 506, as shown.

Figure 59:
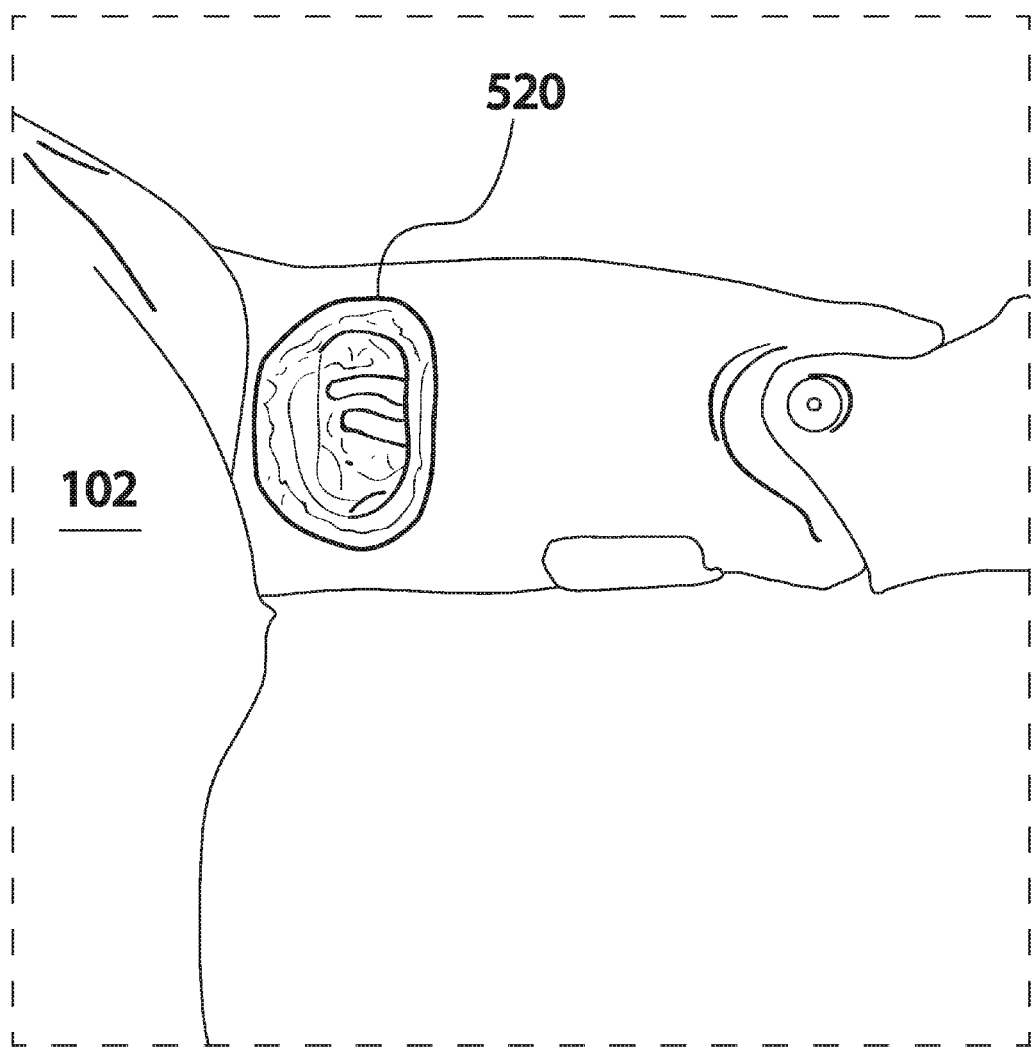
FIG. 59 is a side view of the upper arm assembly of FIG. 56 attached to a torso of the patient simulator of FIG. 1 having a wound according to an embodiment of the present disclosure.
Figure 60:
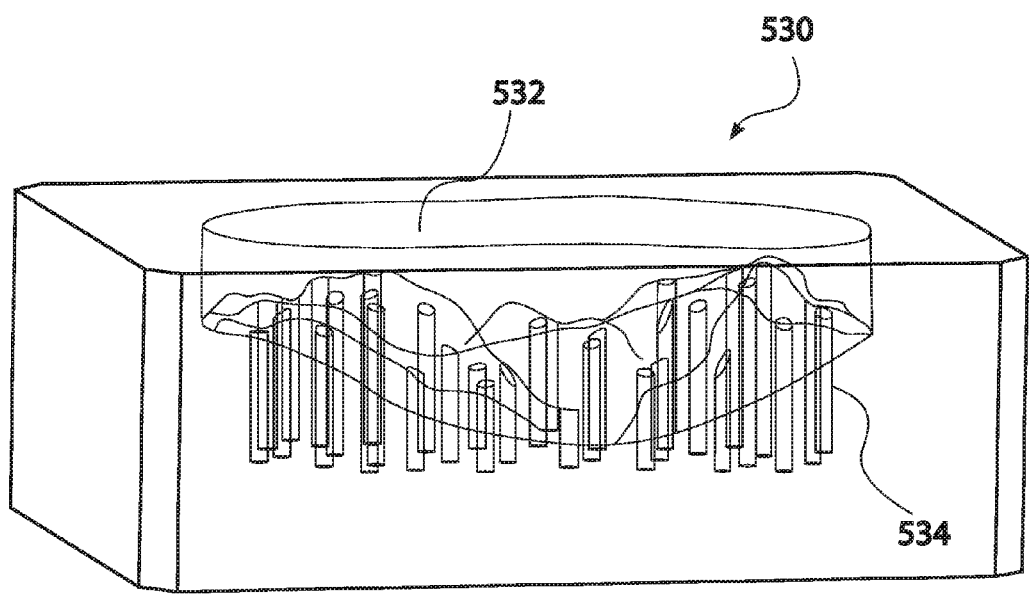
FIG. 60 is a perspective, transparent view of a mold for forming a portion of the wound of the upper arm assembly of FIG. 59 according to an embodiment of the present disclosure.
Figure 61:
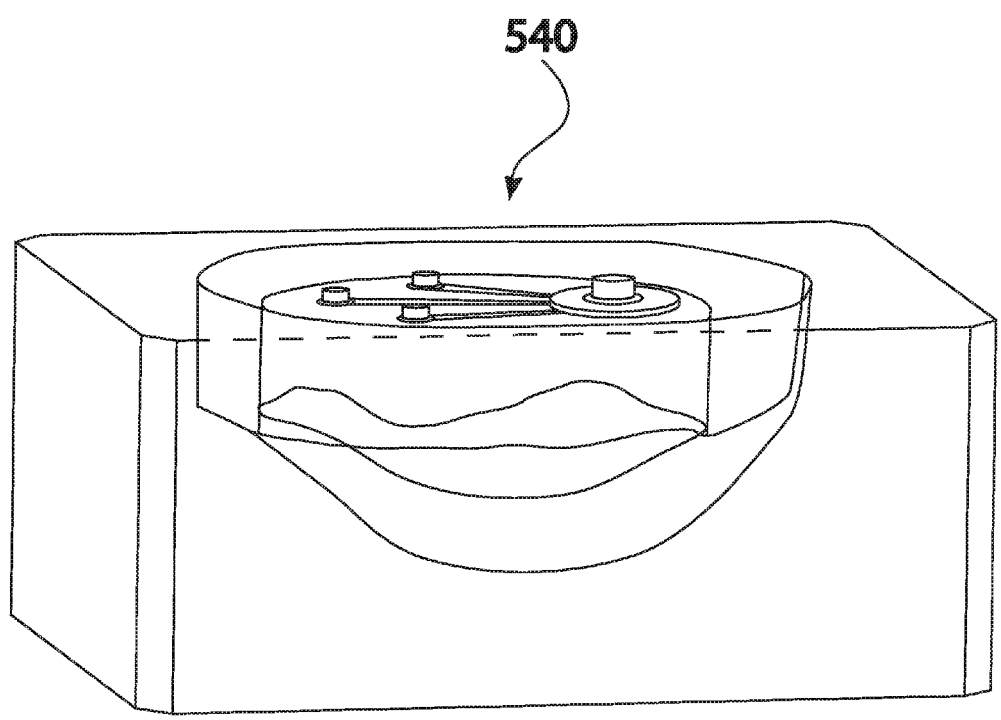
FIG. 61 is a perspective, transparent view of a mold for forming another portion of the wound of the upper arm assembly of FIG. 59 according to an embodiment of the present disclosure.
Figure 62:
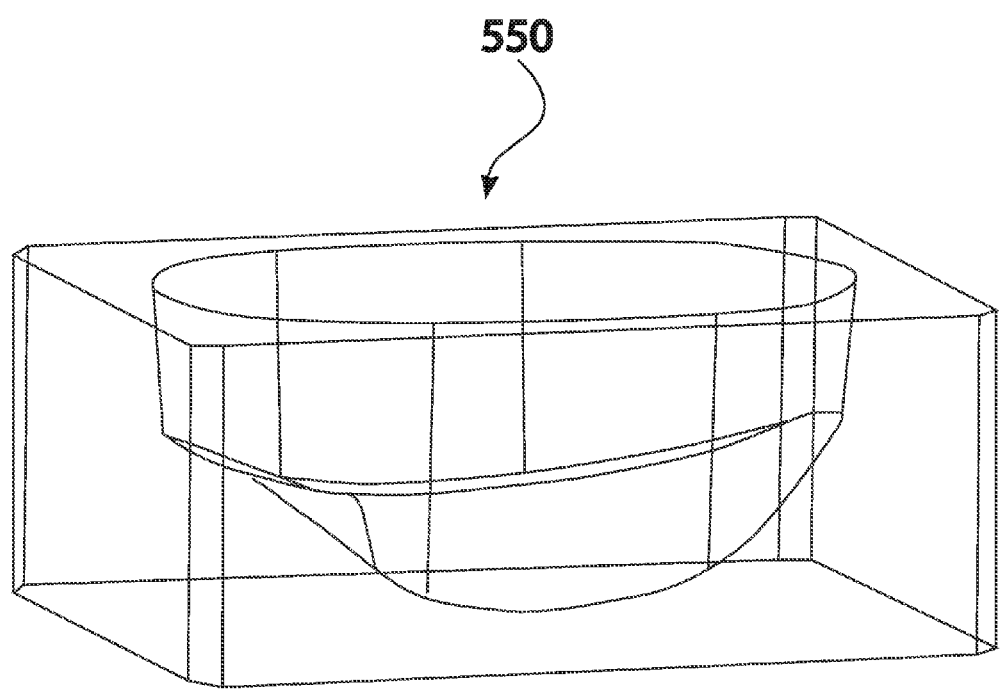
FIG. 62 is a perspective, transparent view of a mold for forming yet another portion of the wound of the upper arm assembly of FIG. 59 according to an embodiment of the present disclosure.
Figure 65:
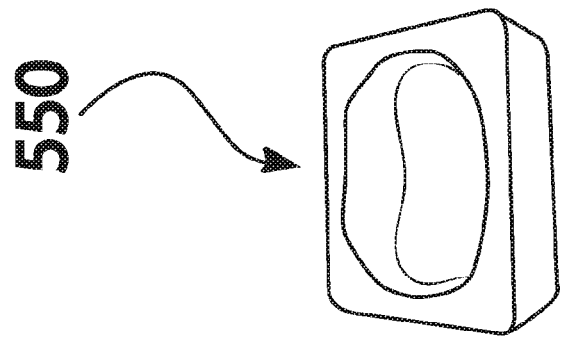
FIG. 65 is a top view of the mold of FIG. 62.
Figure 64:
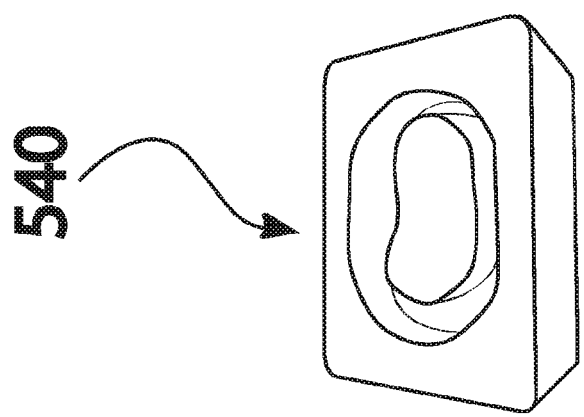
FIG. 64 is a top view of the mold of FIG. 61.
Figure 63:
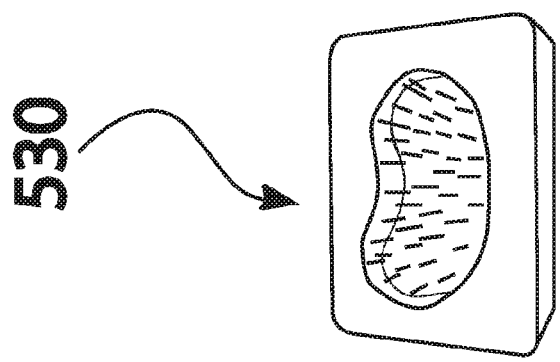
FIG. 63 is a top view of the mold of FIG. 60.

FIG. 59 is a side view of the upper arm assembly 350 attached to the torso 102 of the patient simulator having a wound 520 positioned within a recess of the arm assembly according to an embodiment of the present disclosure. To that end, FIGS. 60-65 illustrate aspects of mold systems for forming various arm wounds and/or arm blanks according to embodiments of the present disclosure. More specifically, FIG. 60 is a perspective, transparent view of a mold 530 for forming a portion of the wound of the upper arm assembly according to an embodiment of the present disclosure. As shown, the mold 530 includes a recess 532 configured to receive a material that is to form at least a portion of the wound and a plurality of members 534. The plurality of members 534 are configured to define passages through the resulting wound structure that can be utilized to pass fluid in a manner that simulates bleeding. FIG. 61 is a perspective, transparent view of a mold 540 for forming another wound and/or another portion of a wound of the upper arm assembly according to an embodiment of the present disclosure. Likewise, FIG. 62 is a perspective, transparent view of a mold 550 for forming yet another wound and/or another portion of the wound of the upper arm assembly according to an embodiment of the present disclosure. FIG. 63 is a top view of the mold 530 of FIG. 60; FIG. 64 is a top view of the mold 540 of FIG. 61; and FIG. 65 is a top view of the mold 550 of FIG. 62.

Figure 66:
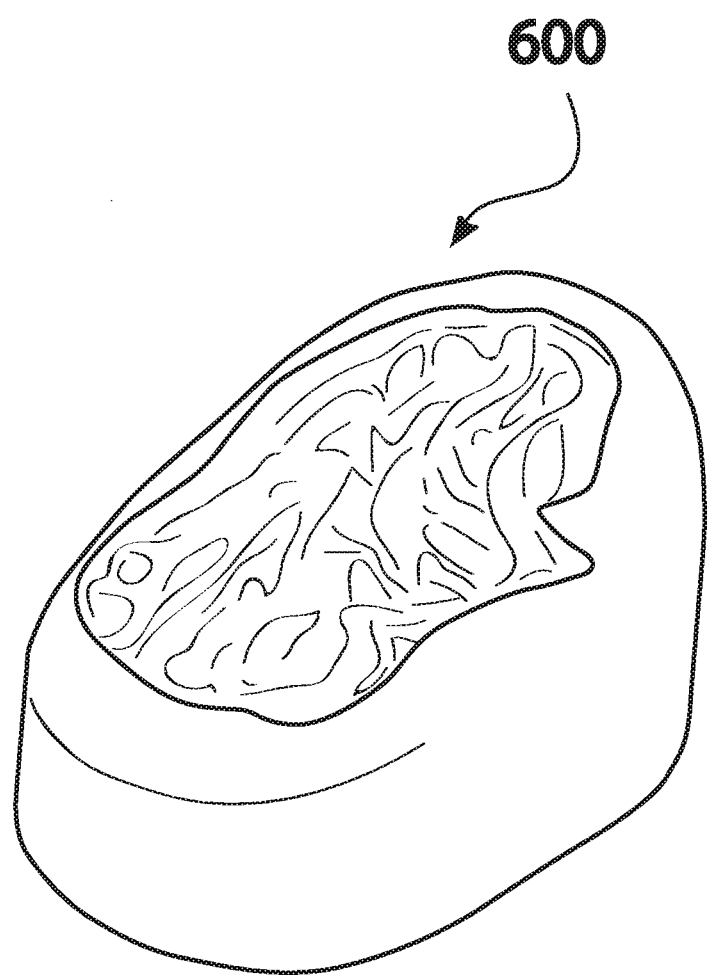
FIG. 66 is a perspective view of the structure of a wound created using the molds of FIGS. 60-65.
Figure 69:
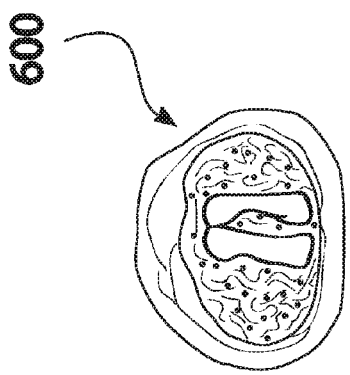
FIGS. 67-71 illustrate a series of steps to enhance the realism of the wound based on the wound structure of FIG. 66 created using the molds of FIGS. 60-65 according to an embodiment of the present disclosure.
Figure 68:
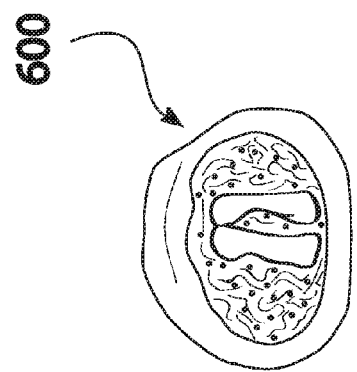
Figure 67:
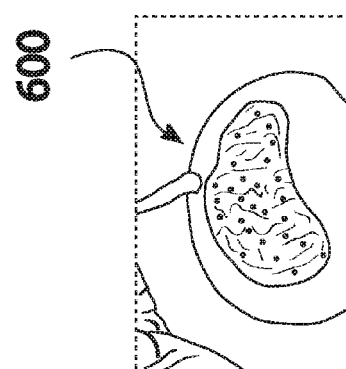
Figure 72:
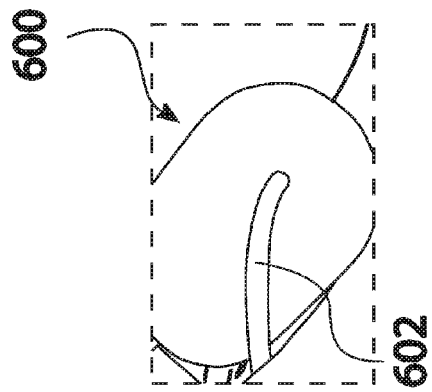
FIG. 72 illustrates the attachment of tubing to the wound structure of FIGS. 66-71 according to an embodiment of the present disclosure.
Figure 71:
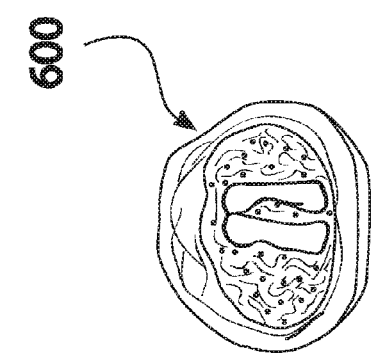
Figure 70:
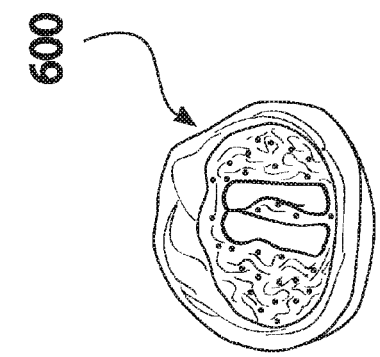

FIG. 66 is a perspective view of a wound structure 600 created using one or more of the molds of FIGS. 60-65. However, in some instances the realism of the wound is enhanced by providing surface treatments to the wound structure 600. To that end, FIGS. 67-71 illustrate a series of surface treatment steps to enhance the realism of the wound based on the wound structure 600 according to an embodiment of the present disclosure. Additional aspects of these exemplary features are described below. Further, FIG. 72 illustrates the attachment of tubing 602 to the wound structure 600 according to an embodiment of the present disclosure. In some instances, the tubing 602 is fluidly coupled to the pump and valve system described above in order to selectively provide simulated blood to the wound structure 600 to further enhance the realism of the wound.

Figure 73:
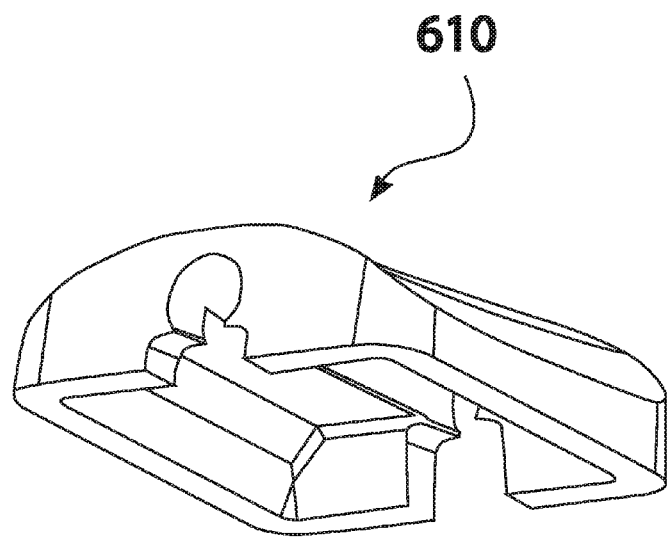
FIG. 73 is a perspective view of an arm tourniquet housing according to an embodiment of the present disclosure.
Figure 74:
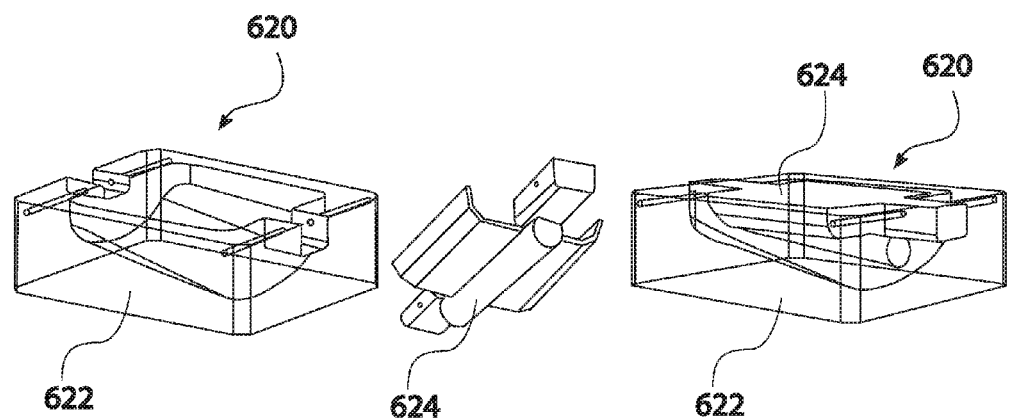
FIG. 74 is a perspective, exploded view of a mold system for forming the tourniquet housing of FIG. 73 according to an embodiment of the present disclosure.

FIG. 73 is a perspective view of an arm tourniquet housing 610 according to an embodiment of the present disclosure. To that end, in some implementations tubing (such as tubing 602) extending through the arm and/or leg of the patient simulator is positioned within tourniquet housing 610 such that upon proper application of a tourniquet around the arm/leg the flow of fluid through the tubing will be stopped. In particular, the compression of the tourniquet compresses the tubing, which prevents the flow of fluid through the tubing. FIG. 74 provides a perspective, exploded view and a perspective, assembled view of a mold system 620 for forming the tourniquet housing 610 according to an embodiment of the present disclosure. As shown, the mold system 620 includes a component 622 that is configured to receive an insert 624 to collectively define a space corresponding to the shape of the tourniquet housing 610.

Figure 75:
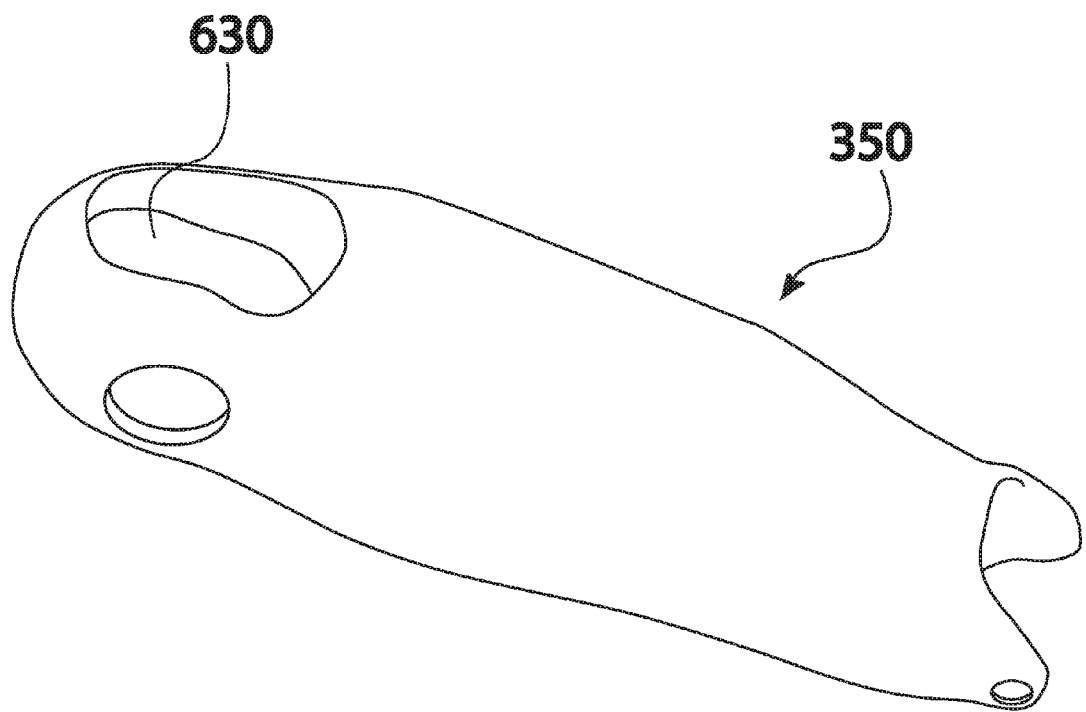
FIG. 75 is a perspective, side view of an upper leg assembly according to an embodiment of the present disclosure.
Figure 76:
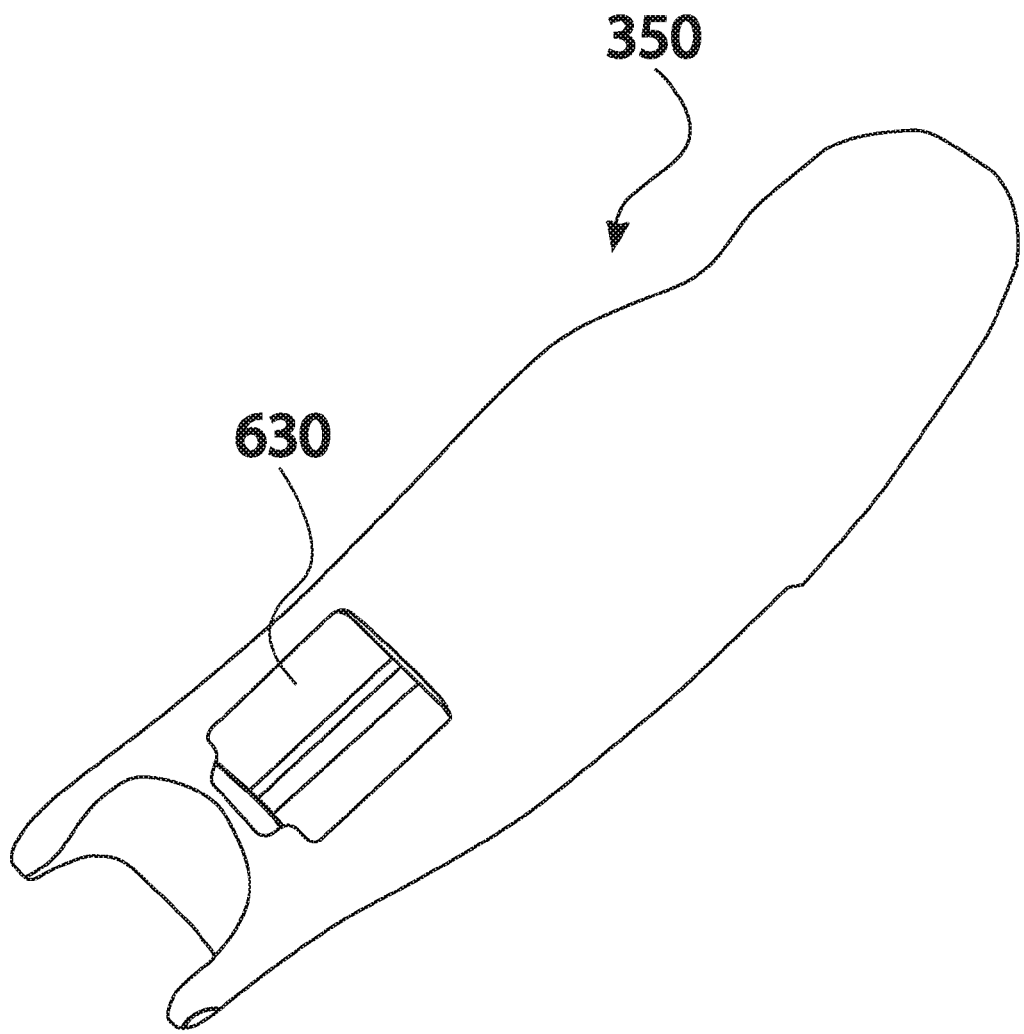
FIG. 76 is a perspective, bottom view of the upper leg assembly of FIG. 75.
Figure 79:
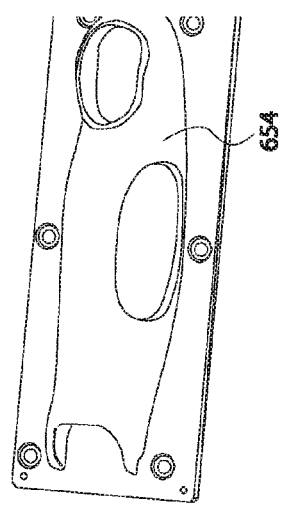
FIG. 79 is a perspective view of another mold of the mold system of FIG. 77 configured to mate with the mold of FIG. 78 according to an embodiment of the present disclosure.
Figure 78:
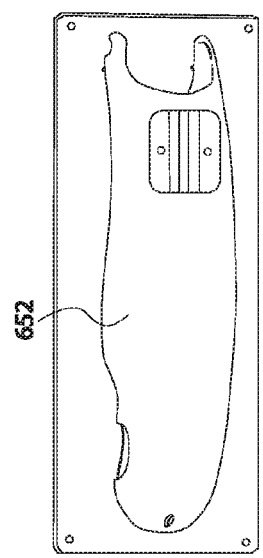
FIG. 78 is a perspective view of a mold of the mold system of FIG. 77 according to an embodiment of the present disclosure.
Figure 77:
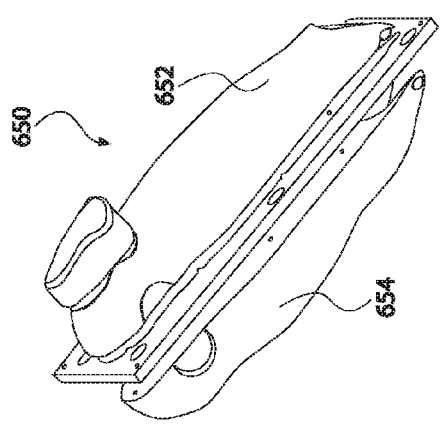
FIG. 77 is a perspective view of a mold system for forming the upper leg assembly of FIG. 76 according to an embodiment of the present disclosure.
Figure 80:
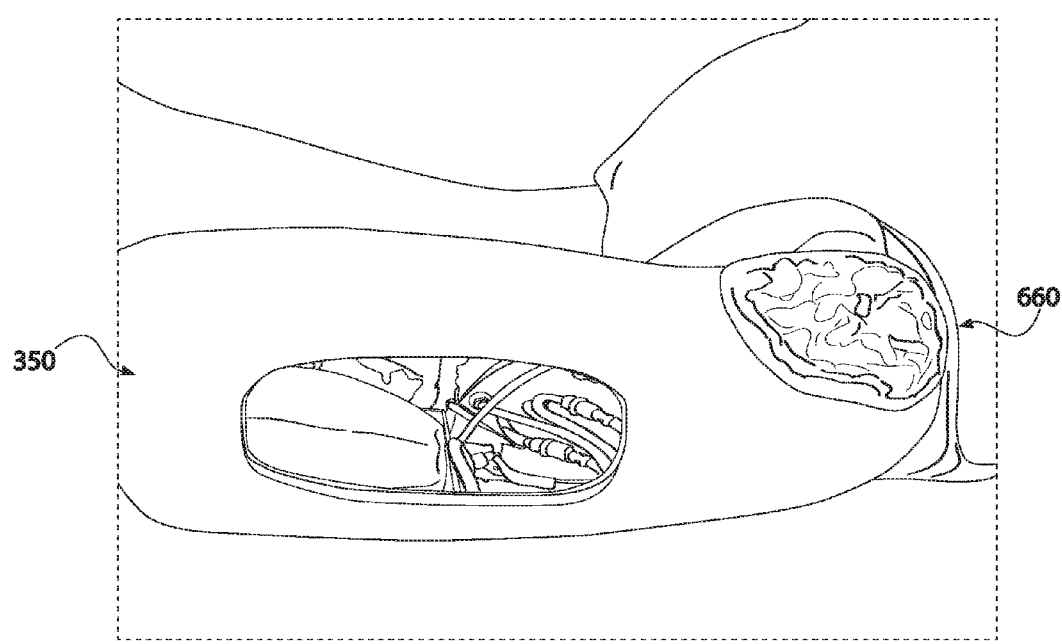
FIG. 80 is a perspective side view of an upper leg assembly manufactured using the mold system of FIGS. 77-79.

Referring now to FIGS. 75-104, shown therein are aspects of the upper leg assembly 350 and corresponding manufacturing components and techniques according to embodiments of the present disclosure. In that regard, FIG. 75 is a perspective, side view of the upper leg assembly 350 according to an embodiment of the present disclosure, while FIG. 76 is a perspective, bottom view of the upper leg assembly. As shown, the leg assembly 350 includes a recess 630 for receiving a wound and a recess 632 for receiving the tourniquet housing 610 described above. FIGS. 77-79 illustrate aspects of a mold system 650 for forming the upper leg assembly 350 according to an embodiment of the present disclosure. As shown, the mold system 650 includes an upper component 652 and a lower component 654 that mate with one another and/or a central plate. FIG. 80 is a perspective side view of the upper leg assembly 350 manufactured using the mold system 650 shown with a wound 660 received within the recess 630.

Figure 81:
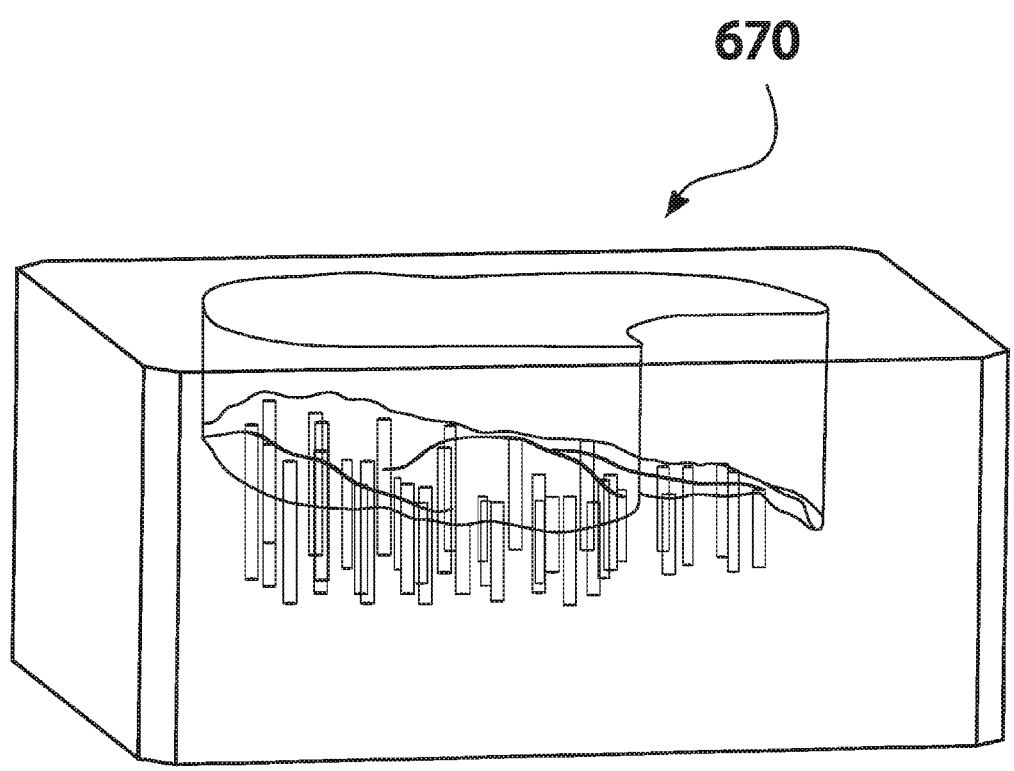
FIG. 81 is a perspective, transparent view of a mold for forming a portion of the wound of the upper leg assembly of FIG. 80 according to an embodiment of the present disclosure.
Figure 82:
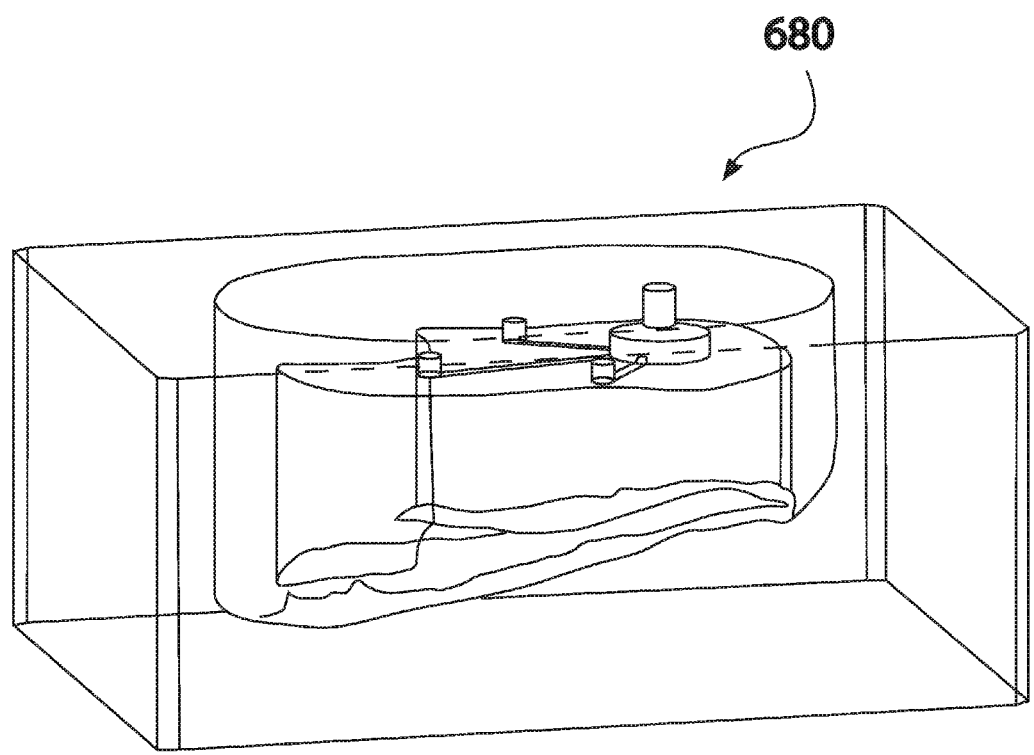
FIG. 82 is a perspective, transparent view of a mold for forming another portion of the wound of the upper leg assembly of FIG. 80 according to an embodiment of the present disclosure.
Figure 83:
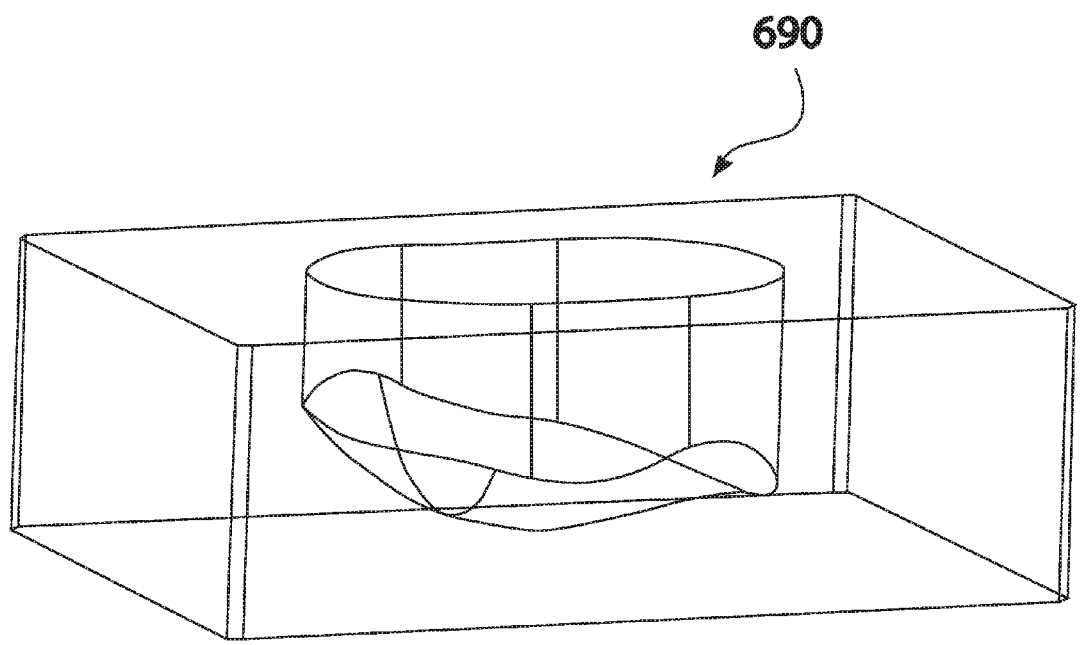
FIG. 83 is a perspective, transparent view of a mold for forming yet another portion of the wound of the upper leg assembly of FIG. 80 according to an embodiment of the present disclosure.
Figure 86:
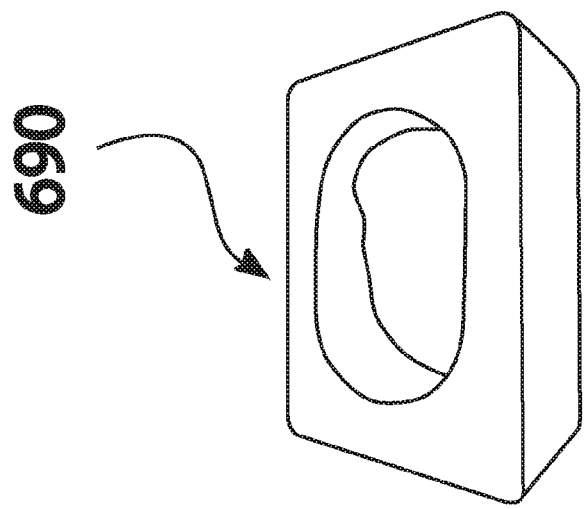
FIG. 86 is a top view of the mold of FIG. 83.
Figure 85:
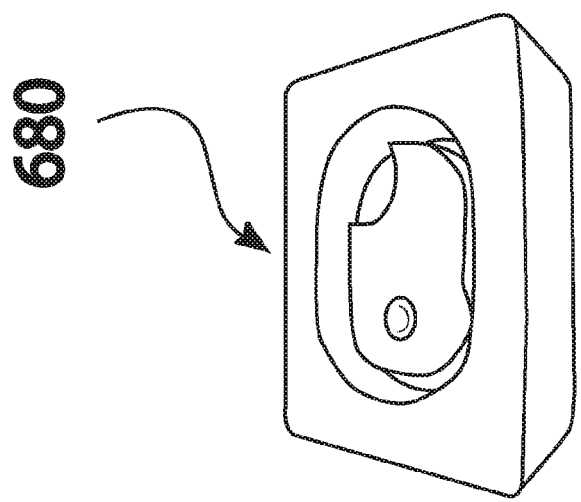
FIG. 85 is a top view of the mold of FIG. 82.
Figure 84:
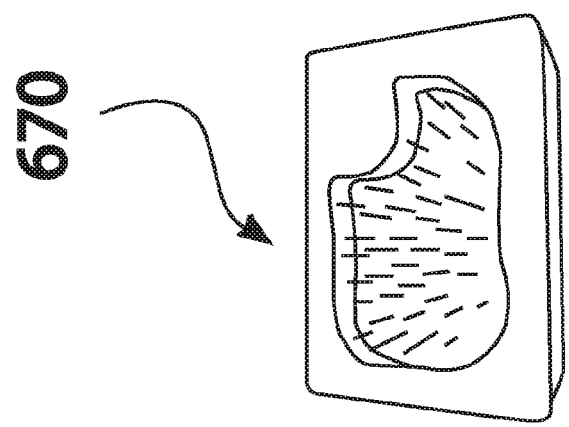
FIG. 84 is a top view of the mold of FIG. 81.
Figure 87:
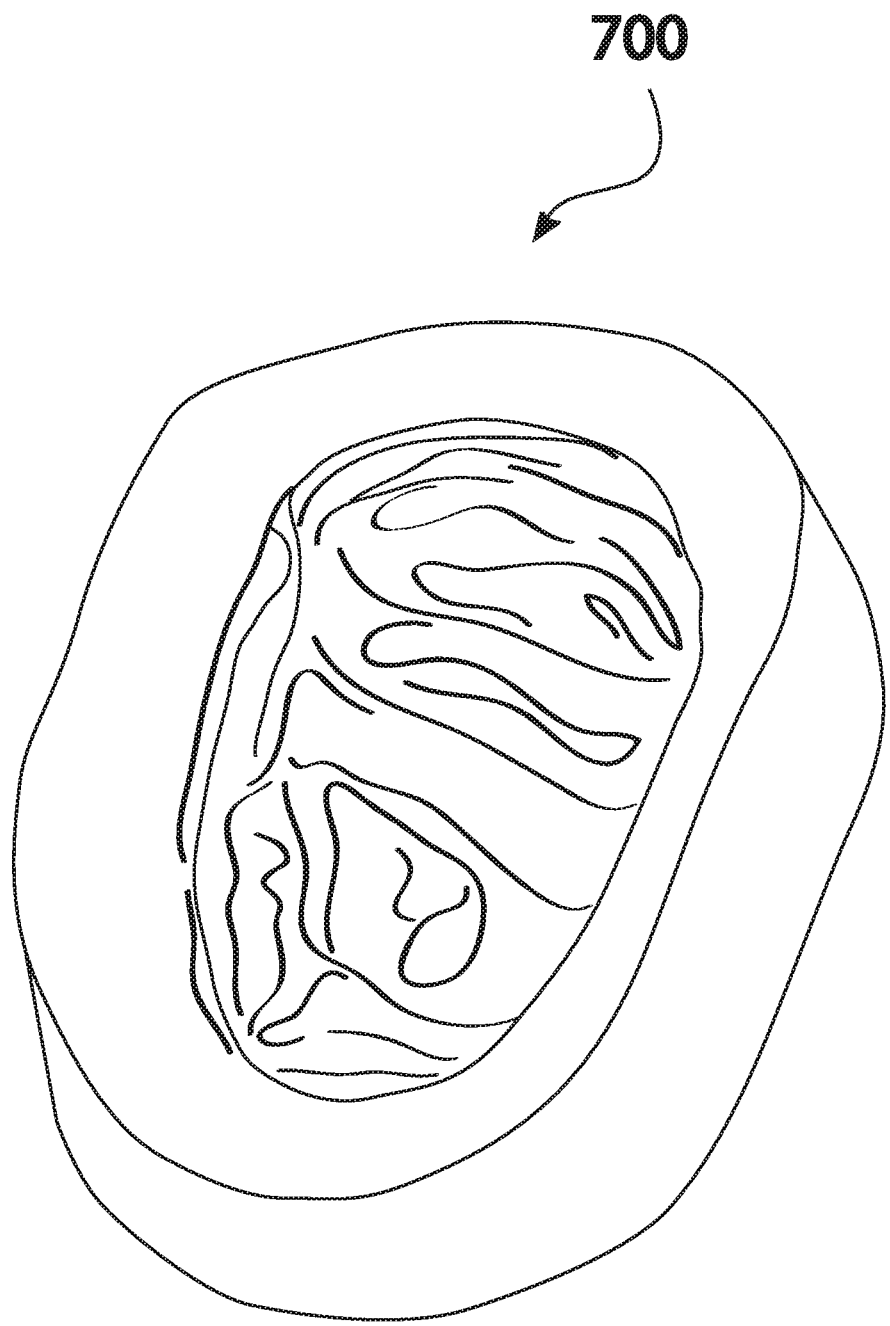
FIG. 87 is a perspective view of a wound structure created using the molds of FIGS. 81-86.
Figure 88:
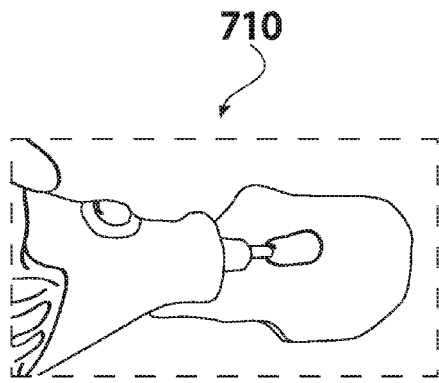
FIGS. 88-97 illustrate a series of steps to assemble a wound structure based on the components created using the molds of FIGS. 81-86 according to an embodiment of the present disclosure.
Figure 89:
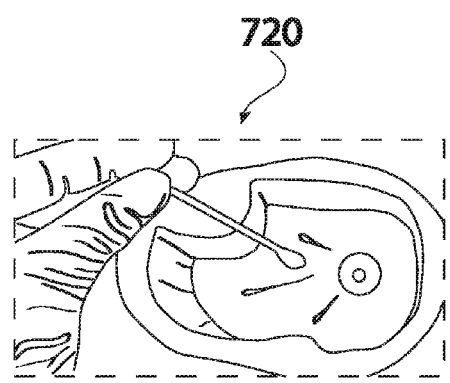
Figure 90:
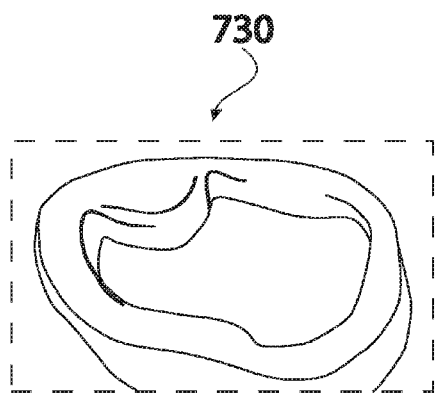
Figure 91:
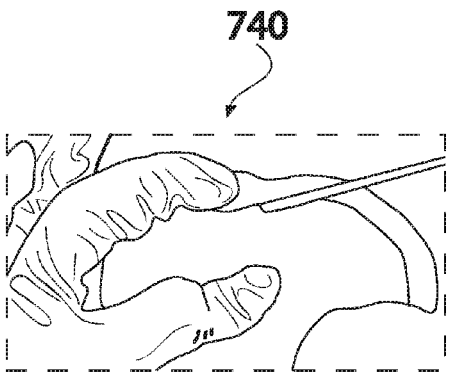
Figure 92:
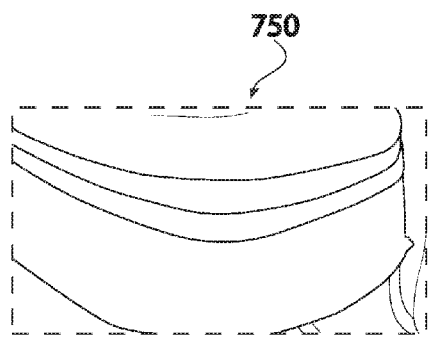
Figure 93:
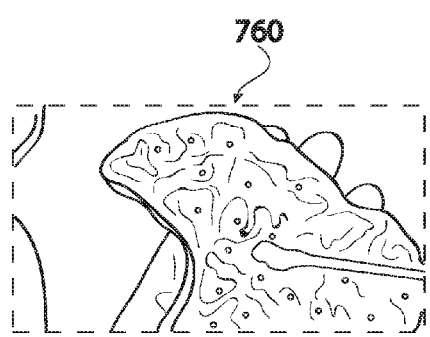
Figure 94:
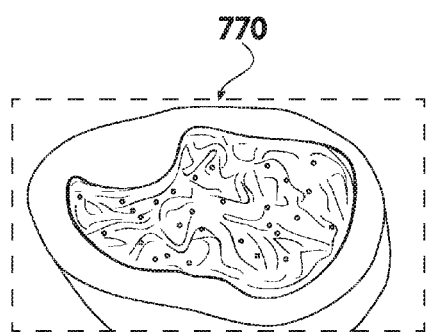
Figure 95:
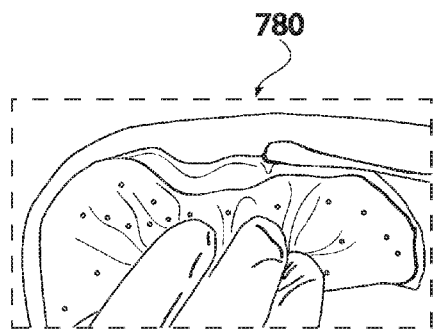
Figure 96:
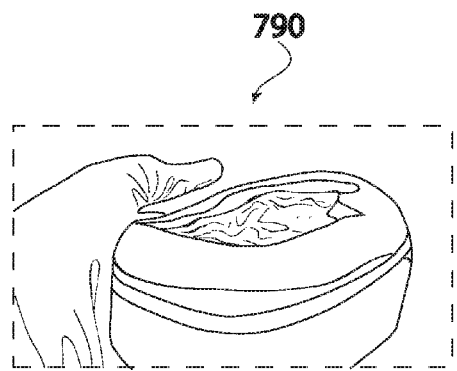
Figure 97:
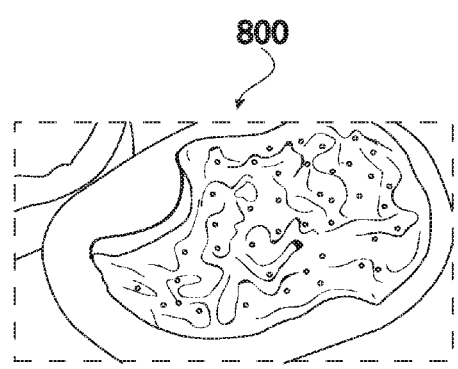
Figure 98:
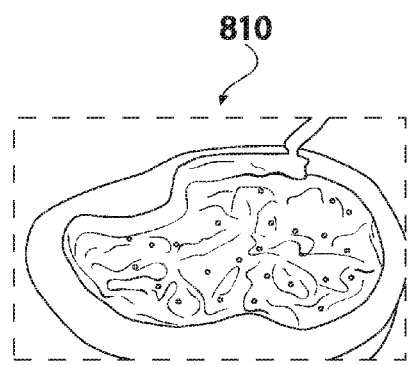
Figure 99:
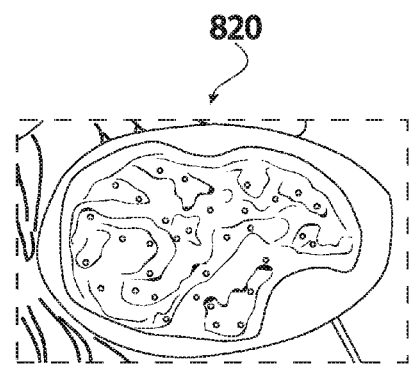

FIGS. 81-86 illustrate aspects of mold systems for forming various leg wounds and/or leg blanks according to embodiments of the present disclosure. More specifically, FIG. 81 is a perspective, transparent view of a mold 670 for forming a portion of the wound of the upper leg assembly 350 according to an embodiment of the present disclosure. As shown, the mold 670 includes a recess 672 configured to receive a material that is to form at least a portion of the wound and a plurality of members 674. The plurality of members 674 are configured to define passages through the resulting wound structure that can be utilized to pass fluid in a manner that simulates bleeding. FIG. 82 is a perspective, transparent view of a mold 680 for forming another wound and/or portion of the wound of the upper leg assembly according to an embodiment of the present disclosure. Similarly, FIG. 83 is a perspective, transparent view of a mold 690 for forming yet another wound and/or portion of the wound of the upper leg assembly according to an embodiment of the present disclosure. FIG. 84 is a top view of the mold 670 of FIG. 81; FIG. 85 is a top view of the mold 680 of FIG. 82; FIG. 86 is a top view of the mold 690 of FIG. 83. FIG. 87 is a perspective view of a wound structure 700 created using the molds of FIGS. 81-86.

FIGS. 88-97 illustrate a series of steps to assemble a wound structure according to an embodiment of the present disclosure, while FIGS. 98-103 illustrate a series of steps to enhance the realism of the wound structure according to an embodiment of the present disclosure. These steps are discussed in greater detail below with respect to the exemplary manufacturing techniques described herein. FIG. 104 illustrates the attachment of tubing to the wound structure according to an embodiment of the present disclosure.

The combat wounds and tourniquet site composition and assembly for the arm and the leg described herein will allow a pioneering, dynamic and interactive scenario simulating fatal hemorrhaging battle wounds that require immediate attention and adequate care. Combat wounds that go untreated or incompetently overseen can ultimately result in terminal consequences. Providing the proper care is a vital point in the healing process as well as the patient recovery, immediate cautious procedure such as packing the wound can cease the bleeding and allow the medical practitioner to focus in stabilizing the patient's vital signs. The user will be immersed in a realistic scenario produced from a combat patient experiencing deadly hemorrhaging where applying the proper packing pressure as well as, alternatively, implementing an adequate tourniquet at the suitable site can stop the wounds from further blood loss.

The combat wounds and tourniquet site composition and assembly's goal is to offer a realistic interpretation of a human experiencing lesions or laceration from similar nature caused by battle, combat, explosion or trauma with or without blood supply for added realism. Delivering combat wounds and tourniquet site relevant in anatomical size, organic shape, natural feel and adequate pigmentation medical recognition and familiarity can be obtained in order to successfully perform the procedures being it proper tourniquet or adequate wound packing as well as attain the skills of tactile and recognize the adequate amount of applied pressure and packing technique in a stress free environment apt for troubleshooting and trial and error learning approaches. The products outlined in this disclosure include the combat arm wound (A), combat leg wound (B), arm tourniquet site (C) and leg tourniquet site (D) for medical procedures resulting in hemorrhaging from but not limited to combat and/or accidental occurrences.

The combat wounds and the tourniquet site composition and its assembly properly adapts to the wound location as well as the tourniquet location for the patient simulator and simultaneously connects to its hi fidelity system in order to provide an accurate anatomical medical platform that works in harmony as an overall training mechanism.

The combat wounds and tourniquet sites consistency portrays a relatively soft feel representative of the common human tissue in the hardness range of 30 in the 00 scale and 10 in the A scale under the Rockwell hardness standard using platinum cured silicon as primary material as well as the appropriate life-like flesh pigmentation and geometry composition of a natural wound. For platinum cured silicone it is preferred but not strictly assigned to a 1:1 ratio of Ecoflex® 0030 and Dragon Skin® 10 Medium, Smooth-On, Inc., Easton, Pa. as the most successful for the use and construction of the uterine material due to its effective endurance to pressure, tear, needle puncture, cutting, and suture retention while maintaining relevant to a high degree of realism.

Alternatively, the inside wound composition is consistent and depict a softer feel characteristic of that found in the typical human flesh in the hardness range of 10 in the 00 scale and 10 in the A scale under the Rockwell hardness standard using platinum cured silicone as its material composition as well as the proper red pigmentation. The selected platinum cured silicone material but not limited to represent the inner flesh wound is Ecoflex® 0030, Smooth-On, Inc., Easton, Pa. as the most effective for the added softness in comparison to the wound and its consistency to the human tissue. For the blood makeup, the opted but not required platinum cured silicone material used in its composition is Dragon Skin® 30, Smooth-On, Inc., Easton, Pa. as the most efficient in order to compensate the fibroid hollow construction and the needed hardness to resemble those found in the human body. Additionally, selected featured hardness can be achieved with a mixture of different silicone hardness under the Rockwell hardness standards.

In essence the wounds are constructed from designed layers, starting with the outer wound housing the assembly, followed by open cell foam to allow blood-like fluid to enter, diffuse and disperse evenly throughout the cross-sectional area to ultimately enter the inner wounds pores and discharge out of the wound. Therefore, one wound will be conformed of three independent components and utilize 2 separate molds in its manufacturing.

Inner wounds are conformed of open pores that cover most of the top surface of the piece and go through to its bottom side allowing simulation of the hemorrhaging effect of an inflicted laceration. The pores are effectively achieved by the arrangement of permanent pins of approximately 1/16 inches within the mold assembly. The benefit of producing or forming the pores of the inner wounds directly from the mold versus that of punching or extruding its cut include adequate pore placement and higher tear strength resistance therefore sustaining a larger load before tearing. The following solid models further expose the mold and its pin organization for the inner wound of both, the arm and the leg.

Manufacturing Procedures

Cleaning and Prepping the Molds
  a. Lightly we cloth with isopropanol and wipe inside of mold cavity as well as exterior regions and mold core (for tourniquet molds only) in order to remove any dust particles and/or silicone residues from previous use.
  b. Use air hose gun to remove silicone residues from Inner Wound Molds blowing in between pins.
  c. Lightly coat mold cavity and core with mold release agent.

Materials and Utensils Setup
  a. Organize and collect all materials required for the manufacturing of Combat Hal's wounds, blanks and tourniquet site.
    i. Tubing No. 2 (Dimensions: ID 1/8", OD 1/4", wall thickness 1/16"; Excelon™ RNT Tubing)
    ii. Super Glue
    iii. Silicone Primer (Loctite 770)
    iv. Open Cell Foam cutouts of 0.50 and 0.25 inches wide
    v. Ecoflex® 30 Silicone Part A and B
    vi. Dragon Skin® 10 Silicone Part A and B
    vii. Slo-Jo® (Smooth-On)
    viii. Sil-Poxy® (Smooth-On)
    ix. Slic-Pig® (Smooth-On) "Old Blood"
    x. Slic-Pig® (Smooth-On) "Red"
    xi. Slic-Pig® (Smooth-On) "Blue"
    xii. Slic-Pig® (Smooth-On) "Black"
    xiii. Slic-Pig® (Smooth-On) "Off White"
    xiv. Slic-Pig® (Smooth-On) "Flesh"
  b. Organize and collect all utensils required for the manufacturing of Combat Hal's wounds, blanks and tourniquet site.
    i. Q-tips
    ii. Paintbrush
    iii. Rags for cleaning
    iv. Rubber bands
    v. Exacto
    vi. Tongue depressors
    vii. Mixing buckets Outer Wounds, Blanks and Tourniquet Sites of the Arm and Leg
  i. Dragon Skin 10 and Ecoflex 30 Mixing Ratio 1:1 (600 grams: 600 grams)
    Place clean mixing bucket on scale and pour:
      1. Ecoflex® 30 Part B 300 grams
      2. DragonSkin® 10 Part B 300 grams
      3. Slo-Jo® 12 grams
      4. Slic-Pig® "Flesh" 3.6 grams
  ii. Hand mix thoroughly for approximately 2 minutes and skin flesh tone is homogeneous throughout the material.
  iii. Place bucket at scale and pour:
    1. Ecoflex® 30 Part A 300 grams
    2. DragonSkin® 10 Part A 300 grains
  iv. Hand mix once more thoroughly for approximately 2 minutes and skin flesh tone is homogeneous throughout the material.
  v. Place bucket inside vacuum until pressure inside reaches approximately 27 psi and turn off vacuum, close valve and allow material to sit for approximately 3 minutes before valve is opened and air enters chamber.
  vi. Remove bucket from vacuum and pour into:
    1. Outer Leg Wound
    2. Outer Arm Wound
    3, Leg Blank
    4. Arm Blank
    5. Leg Tourniquet Site
    6. Arm Tourniquet Site
  vii. Pouring is to be made up to mold surface level avoiding any inner mold wall to be exposed.
  viii. Place poured molds in 66° C. oven to accelerate curing time for 45 minutes.
  ix. Retrieve molds from oven and allow cooling down for 30 minutes before de-molding.
  x. Once piece is de-molded, carefully use scissors to clip additional side flashing.

Inner Wounds
  i. Place clean mixing bucket on scale and pour:
    1. Ecoflex 30 Part B 100 grams
    2. Slic-Pig "Old Blood" 0.6 grams
  ii. Hand mix thoroughly for approximately 1 minutes and old blood tone is homogeneous throughout the material.
  iii. Place bucket at scale and pour:
    1. Ecoflex 30 Part A 100 grams
  iv. Hand mix once more thoroughly for approximately 1 minutes and old blood tone is homogeneous throughout the material.
  v. Place bucket inside vacuum until pressure inside reaches approximately 27 psi and turn off vacuum, close valve and allow material to sit for approximately 1 minute before valve is opened and air enters chamber.
  vi. Remove bucket from vacuum and pour into:
    1. Inner Leg Wound.
    2. Inner Arm Wound.

vii. Pouring is to be made up to mold surface level avoiding any inner mold wall to be exposed.
viii. Place poured molds in 66° C. oven to accelerate curing time for 20 minutes.
ix. Retrieve molds from oven and allow cooling down for 15 minutes before de-molding.
x. Once piece is de-molded use blow hose gun to blow from top of pores to allow flashing to be exposed and clip with finger tips.
xi. Carefully use scissors to clip additional side flashing.

Assembling the Leg and Arm Wounds i. Dremel shinny film from open-cell foam cut-outs off from both sides in order to open the flowing channel through foam. (See step 710 in FIG. 88)
ii. Prior to all use clean Sil-Poxy dispensing tip from dried or old silicone adhesive residues.
iii. Use Q-tip to spread Sil-Poxy on the inside bottom of the Leg/Arm Outer Wound piece. Avoid Sil-Poxy adhesive to enter the molds designed flowing channels and localized reservoirs. (See step 720 in FIG. 89)
iv. Place Leg/Arm corresponding open-cell foam cut-out inside Leg/Arm Outer wound piece and press firmly to enhance the surface adhesion. (See step 730 in FIG. 90)
v. Use Q-tip to spread Sil-Poxy in between foam wall and Mold inside wall to firmly fix foam in place and seal side gaps that will affect the function of the final product. (See step 740 in FIG. 91)
vi. Secure rubber band on the perimeter of the Leg/Arm Outer Wound at foam level, Use Q-tip to push in foam into edges to avoid any gaps that will create a reservoir and cause the fluid to create a damming pressure prior to entering the foam. (See step 750 in FIG. 92)
vii. Clean excess silicone adhesive with Q-tip.
viii. Place 200 gram weight on center of partially assembled wound and transfer system to 100° C. oven for 3-5 minutes.
ix. Remove system from oven and allow 1-2 minutes for cooling before rubber band is removed.
x. Use Q-tip to spread Sil-Poxy on the bottom and around the Leg/Arm Inner Wound piece pores. Avoid Sil-Poxy adhesive to enter any of the designed pore openings as this will block the fluid flow and disrupt the wound's function. (See step 760 in FIG. 93)
xi. Place Leg/Arm Inner Wound piece on top of foam and inside wound partial assembly and press firmly. (See step 770 in FIG. 94)
xii. Use Q-tip to spread Sil-Poxy in between Leg/Arm Inner Wound wall and Mold inside wall to firmly fix silicone parts together and seal side gaps. (See step 780 in FIG. 95)
xiii. Secure rubber band on the perimeter of the Leg/Arm Outer Wound at Leg/Arm Inner Wound level, Use Q-tip to push in Silicone inner wound into edges to avoid any gaps. (See step 790 in FIG. 96)
xiv. Clean excess silicone adhesive with Q-tip.
xv. Place 200 gram weight on center of partially assembled wound and transfer system to 100° C. oven for 3-5 minutes.
xvi. Remove system from oven and allow 1-2 minutes for cooling before rubber band is removed.
xvii. Semi-finished good is now available for final aesthetic manufacturing procedure. (See step 800 in FIG. 97)

Application of Pigmentation to the Leg Wound for Realism

For the application of pigmented silicone prefabricated mixture of Ecoflex 30 part B must be available. Using the materials specified three shades of red are created, one off white and one bluish black. Alternatively, Ecoflex 30 part A must be available. Note that in order to allow pigmented silicone to properly cure, equal amounts of Part A and B must be mixed together to allow the catalyzation process to take place. Ultimately, the bare model must look real as in the injury caused by an explosion where tissue is exposed and torn ligaments, dried blood as well as fresh bleeding blood is observed. Accordingly, in some instances, the following steps are utilized to enhance the realism of the leg wound(s).

i. Filling in the borders with "fresh blood" (See step 810 in FIG. 98)
  1. Mix in a plate a small amount consisting of:
  2. 1 part Old Blood pigmented Ecoflex 30 Part B
  3. 2 parts Red pigmented Ecoflex 30 Part B
  4. 3 parts Ecoflex 30 Part A
ii. Creating Injury depth (See step 820 in FIG. 99)
  1. Mix in the plate a small amount consisting of:
  2. 1 part Black pigmented Ecoflex 30 Part B
  3. 1 part Blue pigmented Ecoflex 30 Part B
  4. 2 parts Ecoflex 30 Part A
iii. Produce ligament simulation (See step 830 in FIG. 100)
  1. Mix in the plate a small amount consisting of:
  2. 1 part Off White Pigmented Ecoflex 30 Part B
  3. 1 part of Ecoflex 30 Part A
iv. Create blood layering and dulling (See step 840 in FIG. 101)
  1. Mix in the plate a small amount consisting of:
  2. 1 part old blood pigmented Ecoflex 30 Part B
  3. 1 part of unpigmented Ecoflex 30 Part B
  4. 2 parts of Ecoflex 30 Part A
v. Create illusion of fresh blood (See step 850 in FIG. 102)
  1. Mix in the plate a small amount consisting of:
  2. 1 part of red pigmented Ecoflex 30 Part B
  3. 1 part of Ecoflex 30 Part A
vi. Old Blood overtone (See step 860 in FIG. 103)
  1. Mix in the plate a small amount consisting of:
  2. 1 part old blood pigmented Ecoflex 30 Part B
  3. 1 part of unpigmented Ecoflex 30 Part B
  4. 2 parts of Ecoflex 30 Part A
vii. Assembling fluid tubing port (See step 870 in FIG. 104)
  1. Using an exacto, carefully make an "x" incision on the foam through the bottom opening.
  2. Brush primer generously on wound opening as well as the no. 2 tubing.
  3. Insert No. 2 tubing through hole and inside the foam at the "x" incision.
  4. Squeeze in "super glue" at sides in between the wound opening and the tube wall.
  5. Hold assembly in place to allow glue to set in and dry.

Application of Pigmentation to the Arm Wound for Realism

For the application of pigmented silicone prefabricated mixture of Ecoflex 30 part B must be available. Using the materials specified three shades of red are created, one off white and one bluish black. Alternatively, Ecoflex 30 part A must be available. Note that in order to allow pigmented silicone to properly cure, equal amounts of Part A and B must be mixed together to allow the catalyzation process to take place. Ultimately, the bare model must look real as in the injury caused by an explosion where tissue is exposed and torn ligaments, dried blood as well as fresh bleeding blood is observed. Accordingly, in some instances, the following steps are utilized to enhance the realism of the arm wound(s).

i. Filling in the borders with "fresh blood" (See FIG. 67)
   Mix in a plate a small amount consisting of:
   1. 1 part Old Blood pigmented Ecoflex 30 Part B
   2. 2 parts Red pigmented Ecoflex 30 Part B
   3. 3 parts Ecoflex 30 Part A
ii. Produce ligament simulation (See FIG. 68)
   Mix in the plate a small amount consisting of:
   1. 1 part Off White Pigmented. Ecoflex 30 Part B
   2. 1 part of Ecoflex 30 Part A
iii. Create illusion of fresh blood (See FIG. 69)
   Mix in the plate a small amount consisting of:
   1. 1 part of red pigmented Ecoflex 30 Part B
   2. 1 part of Ecoflex 30 Part A
iv. Creating Injury depth (See FIG. 70)
   Mix in the plate a small amount consisting of:
   1. 1 part Black pigmented Ecoflex 30 Part B
   2. 1 part Blue pigmented Ecoflex 30 Part B
   3. 2 parts Ecoflex 30 Part A
v. Create blood layering and dulling (See FIG. 71)
   Mix in the plate a small amount consisting of:
   1. 1 part old blood pigmented Ecoflex 30 Part B
   2. 1 part of unpigmented. Ecoflex 30 Part B
   3. 2 parts of Ecoflex 30 Part A
vi. Assembling fluid tubing port (See FIG. 67)
   1. Using an exacta, carefully make an "x" incision on the foam through the bottom opening.
   2. Brush primer generously on wound opening as well as the no. 2 tubing.
   3. Insert No. 2 tubing through hole and inside the foam at the "x" incision.
   4. Squeeze in "super glue" at sides in between the wound opening and the tube wall.
   5. Hold assembly in place to allow glue to set in and dry.

One or more of the features of the present disclosure can be combined into a patient simulator to help train combat medics who must quickly perform a few, very critical steps before the soldier is transported. In some embodiments, the patient simulator is sized and shaped to simulate an adult male. Further, in some embodiments, the patient simulator is operable without physical connection to an external device. In that regard, in some instances the patient simulator includes one or more devices configured to facilitate wireless communication with one or more other components. In some instances, the patient simulator is configured to communicate wireless over a distance of 300 meters or more. Wireless communication can include audio, video, sensor data, control signals, and/or any other information associated with the patient simulator. For example, in some implementations the patient simulator wireless communicates with a controller and/or control system configured to control one or more aspects of the patient simulator. To facilitate tetherless operation, the patient simulator includes an onboard power supply, such as a single battery or a plurality of batteries, that is configured to provide at least 6 hours of simulator operation on a single charge. Further, the patient simulator must be designed, assembled, and constructed in a manner to withstand the rigors associated with combat medic scenarios without adversely affecting performance of the patient simulator. In some instances, the patient simulator includes one or more wounds. In some instances, the patient simulator includes wounds that require proper tourniquet application to stop the wound from bleeding.

Further, in some instances the patient simulator includes a trachea device that allows training on proper tracheostomy procedures, including insertion of a trachea tube such as a Shiley tracheostomy tube, size 8. In that regard, the trachea device includes a surgical cricoid insert with anatomic landmarks. The surgical cricoid insert is formed of sufficiently durable materials to be repeatedly subjected to a tracheostomy hook. In that regard, in typical use the combat medic will make two incisions (one medial, one lateral) through the trachea skin cover over the surgical cricoid. Then the medic will insert the tracheostomy hook into the cricoid cartilage at the intersection of the incisions and lift upward. The tracheostomy hook is utilized to hold the trachea steady during the tracheostomy procedure. Once the opening has been created, the combat medic inserts a tracheostomy tube thru the cricoid cartilage such that oxygen can be provided to the wounded soldier. Further, the neck of the patient simulator provides the carotid pulse in some instances.

In some instances, the patient simulator includes device positioned where the sternum would be located that is configured to accept fluids, can be used multiple times without needing to replace the device, and provides for the infusion of medication. In some instances, the device is configured to be used with the FAST-1 intraosseous device. Further, the patient simulator breathes in accordance with a respiratory pattern. In that regard, the patient simulator has chest rise and fall corresponding to the respiratory pattern. To simulate some scenarios, one or both of the left and right lungs can be disabled to simulate pneumothorax. To that end, the patient simulator includes pneumothorax simulation components in some instances that allows training of pneumothorax procedures. In particular, in some instances the patient simulator facilitates training of needle chest decompressions using a 3¼ inch long and 14 gauge needle, or other suitable needles, at the 2nd intercostal space bilaterally. The skin of the patient is durable with respect to needle punctures such that these procedures can be performed multiple times without needing to change the skin of the patient simulator. Sensors detect the needle insertion and communicate the action to the controller or control system that controls the respiratory pattern of the patient simulator. Accordingly, the controller or control system adjusts the respiratory pattern based on the treatment administered to the patient simulator in some instances.

In some instances, an arm of the patient simulator includes a venous network to allow the start an IV drip. Further, a drain in the arm allows large volumes of fluid to be infused. Further, in some instances an arm simulates a severe wound, such as a partial limb loss. In one specific embodiment, half of the left forearm has been lost. The resulting wound looks realistic and bleeds as a function of blood pressure and heart rate. In that regard, use of a standard tourniquet, if applied correctly, will trigger a sensor that causes the bleeding to stop. Further, still, in some instances the shoulder connections of the arms are configured to provide natural motion/flexibility, yet provide strength and durability sufficient to allow the simulator to be dragged. In some embodiments, the shoulder connections include openings extending therethrough to allow passage of communication cables and/or tubing for introduction of fluids (e.g., simulated blood). Further, still, in some instances the should connections limits arm range of motion to a natural range (e.g., approximately 270 degrees), but prevents full rotation of the arm to prevent unwanted kinking and/or damage to the communication cables and/or tubing going through the shoulder connection and into the arm. In some embodiments, an arm of the patient simulator includes a large bleeding wound near axilla, inside of arm beneath bicep. The wound is configured to accept packing material and applying pressure to the wound stops the bleeding of the wound. In that regard, a sensor detects the application of pressure, which in turn causes the control system to stop sending blood to the wound. One or both of the arms of the patient simulator may include radial and brachial pulses that are controlled by the controller or control system.

In some instances, the patient simulator includes a groin wound and a sensor located at femoral location where pressure (usually Medic's knee) is applied to decrease bleeding at groin wound. Again, the sensor detects the application of pressure, which in turn causes the control system to stop sending blood to the wound. Similar to the arms, one or both of the legs may includes bleeding wounds that accept packing material and where application of pressure stops the bleeding of the wound. In that regard, the fluid reservoir housing the blood that is utilized to simulate the bleeding of the wounds is contained in one or both of the legs in some instances. In some instances, the reservoir contains 1.5 liters or more of simulated blood that is utilized to cause simulated bleeding of axilla wound, groin wound, amputation arm, and/amputation leg. In that regard, in some instances the patient simulator bleeds at a rate of approximately 0.25 liters per minute. Accordingly, in some instances a sensor is included to monitor the amount of blood within the reservoir so that a user or instructor can be aware when the simulator is running low on blood and replenish the reservoir as needed. Also, similar to the arms, an embedded sensor in the leg detects when a standard tourniquet is properly applied and can stop the flow of blood accordingly. In some instances, one of the legs contains a compressor that is utilized to control various pneumatic aspects of the patient simulator including, for example, portions of the respiratory and circulatory systems of the patient simulator.

The foregoing outlines features of several embodiments so that those skilled in the art may better understand the aspects of the present disclosure. Those skilled in the art should appreciate that they may readily use the present disclosure as a basis for other devices that simulate medical scenarios and situations, including those involving human tissue. Those skilled in the art should also realize that such equivalent constructions do not depart from the spirit and scope of the present disclosure, and that they may make various changes, substitutions, and alterations to the embodiments disclosed herein without departing from the spirit and scope of the present disclosure. Also, it will be fully appreciated that the above-disclosed features and functions, and variations thereof, may be combined into other methods, systems, apparatus, or applications.

What is claimed is:

1. A combat medical simulation system, comprising:
   a patient simulator including:
   a wound formed on a limb of the patient simulator, the wound comprising a foam layer;
   a fluid reservoir positioned within the patient simulator, the fluid reservoir in fluid communication with the foam layer of the wound via flexible tubing; and
   a pump system in communication with the fluid reservoir for selectively simulating bleeding of the wound by pumping fluid from the fluid reservoir to the wound through the flexible tubing;
   wherein proper application of a tourniquet around the limb of the patient simulator stops fluid flow through the flexible tubing to the wound.

2. The system of claim 1, wherein the patient simulator is operable without physical connection to an external device.

3. The system of claim 2, wherein the patient simulator is configured to wirelessly communicate with one or more external devices.

4. The system of claim 3, wherein the patient simulator receives control signals wirelessly from the one or more external devices.

5. The system of claim 2, wherein the patient simulator includes a rechargeable power supply.

6. The system of claim 1, wherein the wound is formed on an arm of the patient simulator.

7. The system of claim 1, wherein the wound is formed on a leg of the patient simulator.

8. The system of claim 1, wherein the wound is formed of a material having a hardness between 30 on the 00 scale and 10 on the A scale of the Rockwell hardness standard.

9. The system of claim 1, wherein the wound includes a porous layer adjacent to the foam layer to disperse fluid to simulate a hemorrhaging effect.

10. The system of claim 9, wherein the limb of the patient simulator has a cavity, in which the wound is housed, the wound further comprising a housing adjacent to the foam layer and opposite the porous layer, the housing being substantially non-porous so as to prevent or at least reduce fluid leakage into the limb of the patient simulator.

11. The system of claim 1, wherein proper application of a tourniquet around the limb of the patient simulator stops the flow of fluid through the flexible tubing to the wound by compressing the tubing to prevent fluid flow.

12. The system of claim 1, wherein proper application of a tourniquet around the limb of the patient simulator stops the flow of fluid through the flexible tubing to the wound by triggering a sensor that deactivates the pump.

13. The system of claim 1, wherein the wound is configured to accept packing material such that applying pressure to the wound with packing material stops the simulated bleeding of the wound.

14. The system of claim 13, further comprising a sensor that detects the application of pressure on the wound.

15. The system of claim 14, wherein the sensor sends a control signal to the pump to stop pumping fluid from the fluid reservoir to the wound when application of an appropriate amount of pressure is detected.

16. The system of claim 1, wherein, to simulate the bleeding of the wound, the fluid is pumped through the flexible tubing to the wound at a rate of approximately 0.25 liters per minute.

17. The system of claim 1, wherein the fluid reservoir is positioned within a leg of the patient simulator.

18. The system of claim 1, further comprising a sensor operably coupled to the fluid reservoir to monitor the amount of the fluid present in the fluid reservoir so that a user or instructor can replenish the fluid in the fluid reservoir as necessary.

19. The system of claim 18, wherein the sensor monitors the amount of the fluid present in the fluid reservoir by monitoring changes in weight and/or pressure imparted on the sensor by the fluid reservoir.

20. A combat medical simulation system, comprising:
   a patient simulator sized and shaped to simulate an adult male, the patient simulator including:
   a wound formed on a limb of the patient simulator;
   a fluid reservoir positioned within the patient simulator, the fluid reservoir in fluid communication with the wound via flexible tubing; and
   a pump system in communication with the fluid reservoir for selectively simulating bleeding of the wound by pumping fluid from the fluid reservoir to the wound through the flexible tubing; and wherein proper application of a tourniquet around the limb of the patient simulator stops the flow of fluid through the flexible tubing to the wound; and a pneumothorax simulation system positioned within a torso of the patient simulator, wherein the pneumothorax simulation system includes:
a moveable contact plate; and
a switch;
wherein a state of the switch is modified in response to movement of the contact plate resulting from a needle contacting the moveable contact plate.

21. The system of claim 20, wherein the moveable contact plate is pivotally mounted within the torso.

22. The system of claim 21, wherein a spring biases the movable contact plate towards an initial position.

23. The system of claim 20, wherein the pneumothorax simulation system is configured to selectively activate and deactivate a simulated left lung, a simulated right lung, or both simulated left and right lungs.

* * * * *